US011975916B2

(12) United States Patent
Dufresne

(10) Patent No.: US 11,975,916 B2
(45) Date of Patent: May 7, 2024

(54) ANCHOR ASSEMBLY FOR ANCHORING AN UNDERGROUND TANK

(71) Applicant: PULTRUSION TECHNIQUE INC., St-Bruno-De-Montarville (CA)

(72) Inventor: Robert Dufresne, Saint-Bruno-De-Montarville (CA)

(73) Assignee: PULTRUSION TECHNIQUE INC., Saint-Bruno-De-Montarville (CA)

( * ) Notice: Subject to any disclaimer, the term of this patent is extended or adjusted under 35 U.S.C. 154(b) by 0 days.

(21) Appl. No.: 18/014,812

(22) PCT Filed: Jul. 9, 2021

(86) PCT No.: PCT/CA2021/050947
§ 371 (c)(1),
(2) Date: Jan. 6, 2023

(87) PCT Pub. No.: WO2022/006680
PCT Pub. Date: Jan. 13, 2022

(65) Prior Publication Data
US 2023/0348179 A1    Nov. 2, 2023

Related U.S. Application Data

(60) Provisional application No. 63/053,857, filed on Jul. 20, 2020, provisional application No. 63/062,108, (Continued)

(51) Int. Cl.
*B65D 88/76* (2006.01)
*F16M 13/02* (2006.01)

(52) U.S. Cl.
CPC .............. *B65D 88/76* (2013.01); *F16M 13/02* (2013.01)

(58) Field of Classification Search
CPC ..... B65D 88/76; F16M 13/02; F16M 2200/08
(Continued)

(56) References Cited

U.S. PATENT DOCUMENTS 6,786,689 B2 * 9/2004 Dorris ................. B61D 45/003
410/47
7,028,967 B2 * 4/2006 Burwell ................ F16G 11/143
248/500

(Continued)

FOREIGN PATENT DOCUMENTS

WO    WO-2015143565 A1    10/2015

OTHER PUBLICATIONS

Written Opinion from corresponding PCT Application No. PCT/CA2021/050947 dated Oct. 26, 2021.
(Continued)

*Primary Examiner* — Todd M Epps
(74) *Attorney, Agent, or Firm* — Harness Dickey & Pierce P.L.C.

(57) ABSTRACT

An anchor assembly and related system for holding an underground tank below a ground level, including a lightweight anchor base defining a slot, and a retention mechanism that is locatable at multiple locations along the slot of the anchor base to securely maintain a strap assembly in place. The system can include the anchor assembly and the strap assembly, with the retention mechanism of the anchor assembly being movable along the slot of the anchor base to facilitate placement and adjustment of the strap assembly with respect to the anchor base.

20 Claims, 66 Drawing Sheets

Related U.S. Application Data filed on Aug. 6, 2020, provisional application No. 63/050,297, filed on Jul. 10, 2020.

(58) Field of Classification Search
USPC .......................................................... 248/146
See application file for complete search history.

(56) References Cited

U.S. PATENT DOCUMENTS

| | | | | |
|---|---|---|---|---|
| 8,348,563 | B2 * | 1/2013 | Buxton | B60P 7/12 |
| | | | | 410/50 |
| 8,807,512 | B2 * | 8/2014 | Watson | B65D 88/76 |
| | | | | 24/68 CD |
| 10,533,701 | B2 * | 1/2020 | Dufresne | F16M 13/02 |
| 10,781,968 | B2 * | 9/2020 | Dufresne | B65D 88/76 |

OTHER PUBLICATIONS

International Search Report from corresponding PCT Application No. PCT/CA2021/050947 dated Oct. 26, 2021.

* cited by examiner

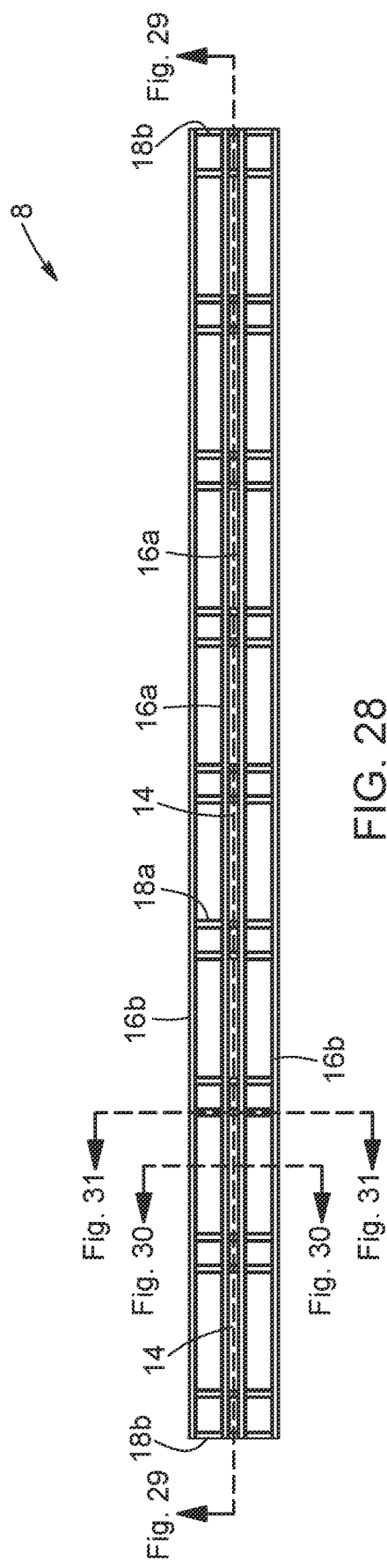

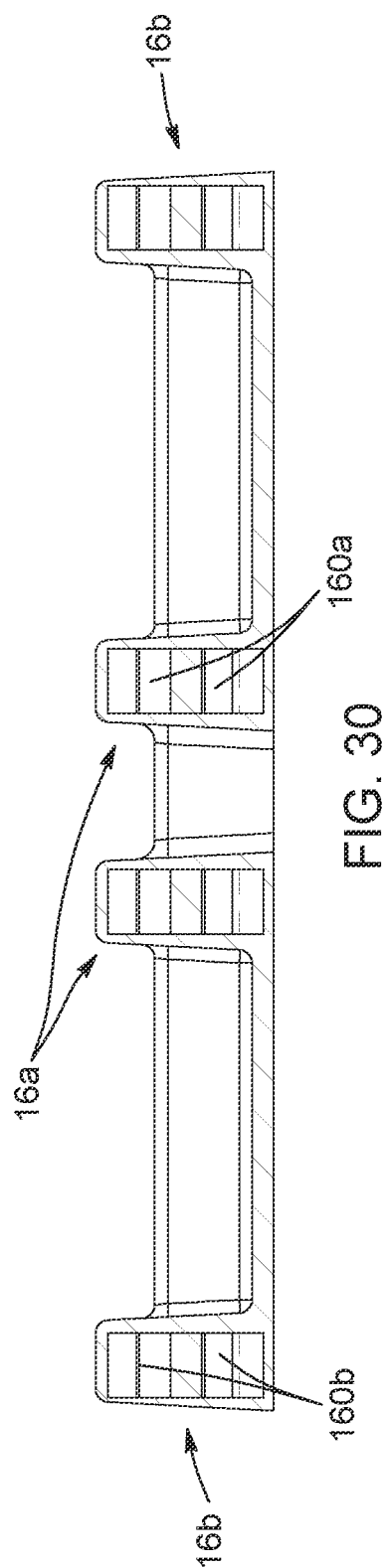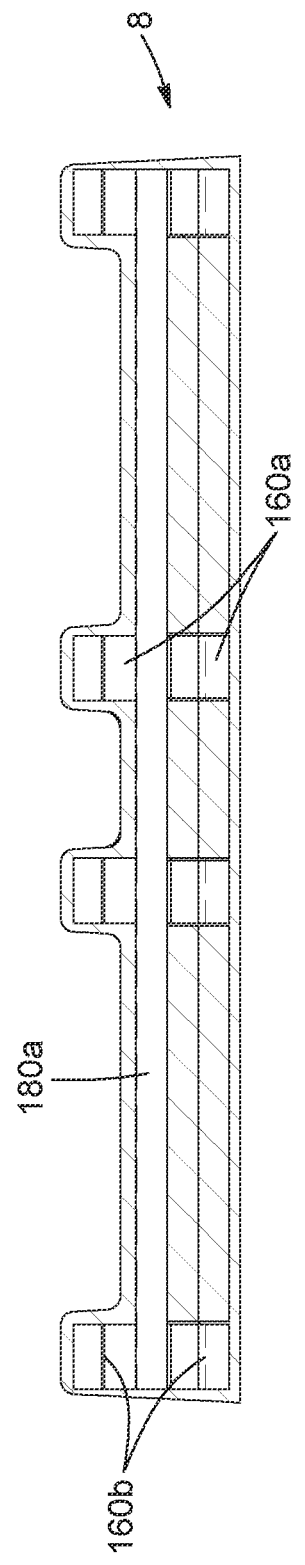

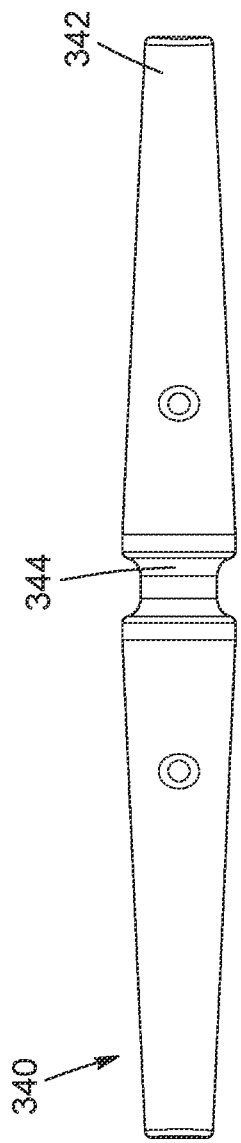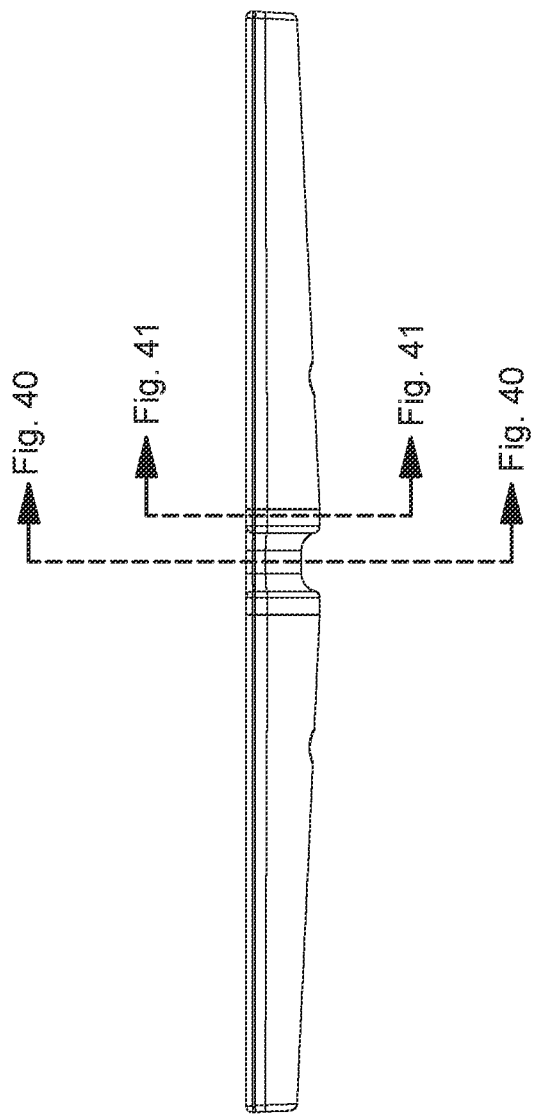
FIG. 38
FIG. 39

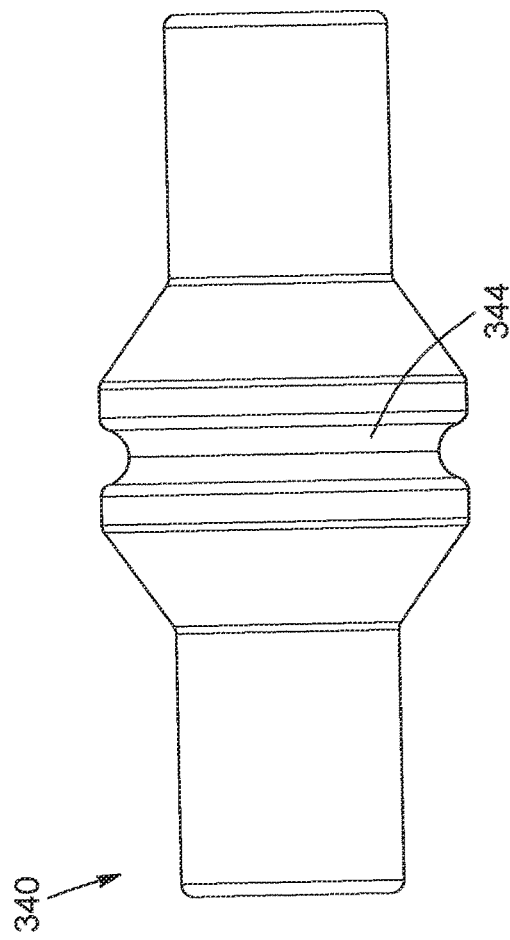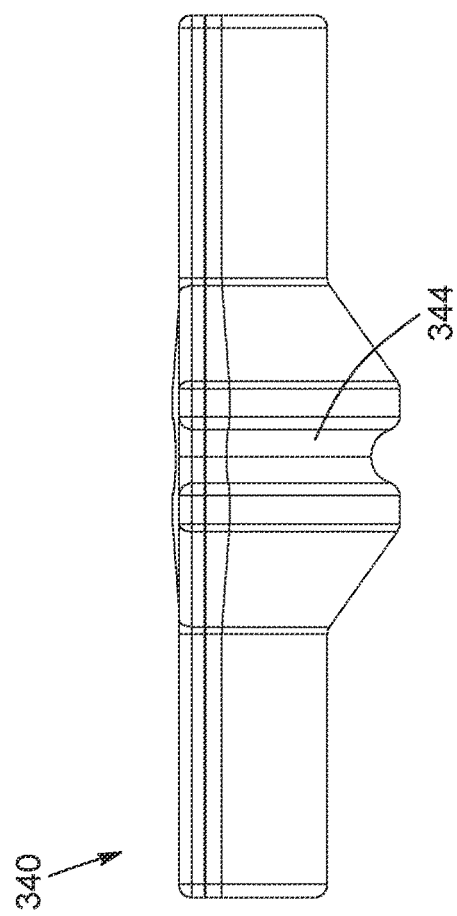

Fig. 57
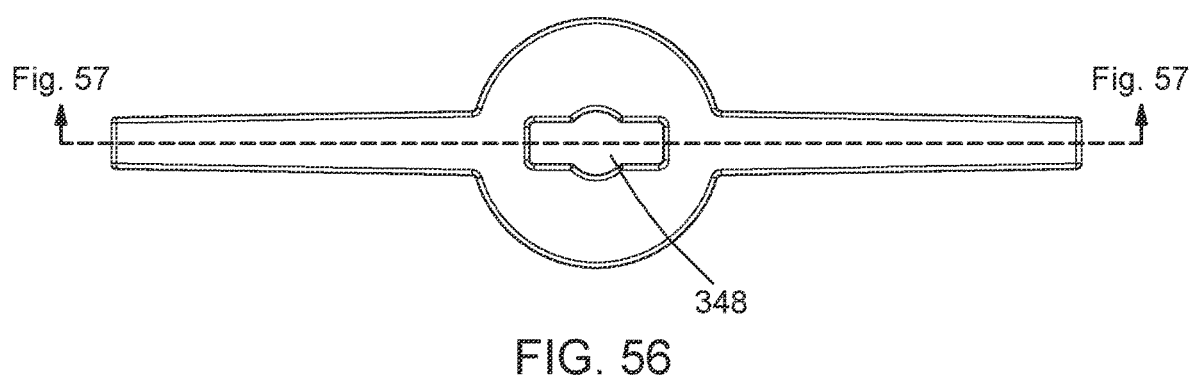
Fig. 57
FIG. 56
FIG. 57

ANCHOR ASSEMBLY FOR ANCHORING AN UNDERGROUND TANK

PRIORITY STATEMENT

This application is a national stage application under 35 U.S.C. § 371 of PCT International Application No. PCT/CA2021/050947, which has an international filing date of 9 Jul. 2021 and claims priority under 35 U.S.C. § 119 to U.S. Application No. 63/050,297 filed on 10 Jul. 2020, U.S. Application No. 63/053,857 filed on 20 Jul. 2020, and U.S. Application No. 63/062,108 filed on 6 Aug. 2020. The contents of each application recited above are incorporated herein by reference in their entirety.

TECHNICAL FIELD

The present techniques generally relate to maintaining underground tanks in place and, more particularly, to an anchor assembly for anchoring an underground tank.

BACKGROUND

Underground storage tanks, commonly referred to as USTs, are often used in storing fluids such as petroleum fluids, fuels, solvents, water or other fluid products.

Installation of USTs presents a number of challenges. Typically, anchoring structures commonly called "deadman anchors" are placed within an excavation pit beside the UST, straps are arranged to overly the UST along its length, and the straps are connected to the deadmen by various types of connectors that may include turnbuckles and hooks. For example, lowering a deadman into the pit and connecting the deadman to the hooks can be difficult and inefficient.

Various challenges related to construction and installation of deadman anchors remain to be overcome.

SUMMARY

Implementations of the anchor assembly, strap assembly, and related system described herein overcome at least some of the above-mentioned challenges by including a lightweight anchor base and a reliable retention mechanism that is locatable at multiple locations along the anchor base to securely maintain a holding strap in place.

In one aspect there is provided an anchor assembly for anchoring an underground tank below the ground in cooperation with a strap assembly including an elongated strap member and a proximal connection component provided at one end of the elongated strap member. The anchor assembly includes an anchor base and a retention mechanism. The anchor base includes a main body defining a slot that is oriented in a longitudinal direction of the anchor base, and that is accessible to the proximal connection component of the strap assembly. The retention mechanism is movable with respect to the anchor base along the slot for securing the strap to the anchor base via the proximal connection component. The retention mechanism comprises a transverse component that is positionable in a transverse direction of the anchor base in abutment with a surface of the anchor base and generally across the slot.

The transverse component can be slidable along a lower surface of the anchor base to guide the proximal connection component of the strap assembly along and within the slot. For example, the transverse component is a transverse pin.

In some implementations, the transverse component can have a narrowing central portion defining a groove that is adapted to retain the proximal connection component. Optionally, the groove is sized and shaped to maintain the proximal connection component snug within the groove defined by the narrowing portion.

In some implementations, the transverse component can include a secondary slot being designed to cooperate with a pin-type hook portion of the proximal connection component. For example, the secondary slot is defined in a central portion of the transverse component.

In some implementations, the retention mechanism can include a C-hook portion extending upwardly from the transverse component and through the slot to engage the proximal connection component of the strap assembly. For example, the C-hook portion has an elongated neck that is sized according to a height of the anchor base to put a C-hook region thereof generally above the slot of the anchor base.

The retention mechanism can further include a locking component to prevent the proximal connection component from being released from the retention mechanism once attached thereto. For example, the locking component can include an elongated fastener insertable in a channel of the proximal connection component and surrounding the transverse component. For example, the locking component can include a pair of locking protrusions extending downwardly from a lower surface of the transverse component thereby defining a recess that maintains the proximal connection component engaged to the transverse component. For example, the locking component can include a locking bracket being complementary shaped to at least a portion of the distal end of the proximal connection component and the transverse component to maintain the proximal connection component and the transverse component together. For example, the locking component can include a fastener that is insertable in a channel defined in the distal end of the proximal connection component. Optionally, the fastener can be a bolt and nut assembly. For example, the locking component can include an abutment rod extending outwardly from a side of the transverse component.

In some implementations, the anchor base can further include at least one reinforcing component embedded in the anchor base. The at least one reinforcing component can be a reinforcing rebar that is oriented in the longitudinal direction or the transverse direction of the anchor base. Optionally, the at least one reinforcing component can include a plurality of reinforcing rebars that are embedded in the anchor base to define a pair of central reinforced longitudinal walls and a plurality of reinforced transverse walls extending upwardly from a main upper surface of the anchor base. For example, the slot of the anchor base can be surrounded by two opposed reinforced longitudinal walls and two opposed reinforced transverse walls.

In some implementations, the anchor base can include a plurality of slots provided along a longitudinal direction of the anchor base to offer multiple available locations for inserting the proximal connection component of multiple strap assemblies.

In another aspect, there is provided a system for holding a tank below a ground level, the system comprising:
   an anchor assembly as defined herein, the anchor assembly being positionable at opposed sides of the tank; and
   at least one strap assembly comprising an elongated strap component and a proximal connection component provided at one end of the elongated strap component.

The proximal connection component can have a hooking portion that is operatively connected to the retention mechanism of the anchor assembly. In some implementations, the transverse component can be passed through the hooking portion. For example, the hooking portion of the proximal connection component can be a C-hook portion or a D-hook portion. For example, the proximal connection component can be a turnbuckle, and the turnbuckle is further connected to an intermediate connection component securing the elongated strap component. In other implementations, the hooking portion is a pin-type hook that is inserted within the slot, and a distal end of the hooking portion is fastened to the transverse component. In other implementations, the hooking portion is a pin-type hook that is inserted within the slot, and a distal component of the hooking portion is abutted to a lower surface of the transverse component.

The hooking portion can optionally define a channel being complementary the locking component of the anchor assembly to prevent the proximal connection component from being released from the retention mechanism.

The anchor assembly as defined herein can be a first anchor assembly, and the system further comprises a second anchor assembly as defined herein, and positioned in an opposed direction of the first anchor assembly with respect to the tank.

In some implementations, the system can further include at least one spacing bar having an end portion attached to each of the first and second anchor bases via a fastening mechanism. The fastening mechanism can includes a transverse component abutting a surface of the anchor base in the transverse direction, and a fastener securing the end portion of the spacing bar to the transverse component. The fastener can include an elongated bolt secured to the transverse component and passing through the slot of the anchor base to reach the end portion of the spacing bar.

In some implementations, each anchor assembly includes a plurality of retention mechanisms, and the system includes a plurality of strap assemblies, wherein a first portion of the plurality of strap assemblies is secured to respective retention mechanisms of the first anchor assembly, and a second portion of the plurality of strap assemblies is secured to respective retention mechanisms of the second anchor assembly.

In another aspect, there is provided a strap assembly for connection to an anchor assembly including an anchor base and a retention mechanism, the strap assembly comprising:
an elongated strap component being sized to surround at least a portion of an upper surface of a tank,
a proximal connection component provided at one end of the elongated strap component, the proximal connection component having a pin-type hook portion.

In some implementations, the pin-type hook portion can have a distal end that is insertable through a slot of the anchor base and fastenable to a transverse component of the retention mechanism that is provided in the transverse direction of the anchor base and below the anchor base.

In some implementations, the pin-type hook portion can include a distal component that is insertable through a slot of the anchor base, and the distal component being abuttable to a lower surface of the transverse component of the retention mechanism that is provided in a transverse direction of the anchor base and below the anchor base.

In another aspect, there is provided another anchor assembly for anchoring an underground tank, the anchor assembly comprising:
an anchor base having a longitudinal slot that is accessible from a bottom surface and from a top surface of the anchor base;
a strap including an elongated strap component and a proximal connection component provided at a proximal end of the elongated strap component, the proximal connection component including:
a main portion being connectable to the proximal end of the elongated strap component, and
a hooking portion extending from the main portion; and
a retention mechanism including a transverse component that is positionable in a transverse direction with respect to the longitudinal slot and that is configured to engage the hooking portion of the proximal connection component for holding the strap into the longitudinal slot.

In another aspect, there is provided a kit for an anchor assembly for anchoring an underground tank, the kit comprising at least the anchor base, the strap and the retention mechanism as described herein in a non-assembled configuration.

In some implementations, the anchor base can include a base core and a base hull surrounding the base core. Optionally, transverse and longitudinal reinforcing rebars are embedded in the anchor base so as to define a pair of central reinforced longitudinal walls and a plurality of reinforced transverse walls extending upwardly from a main upper surface of the anchor base. Further optionally, each slot of the anchor base is surrounded by two opposed reinforced longitudinal walls and two opposed reinforced transverse walls.

In some implementations, the hooking portion of the proximal connection component can define a loop through which the transverse component can be inserted. Optionally, the hooking portion can be a D-shaped hook or a C-shaped hook.

In some implementations, the hooking portion of the proximal connection component can be a pin hook having a distal end that can be inserted into a slot of the transverse component. Optionally, the distal end can have various shape and size which are complementary to the shape and size of the slot of the transverse component.

In some implementations, the transverse component can be a grooved pin including a narrowing portion defining a groove for nesting the hooking portion of the proximal connection component.

In some implementations, the transverse component can be a slotted pin including a slot defining a channel for allowing passage of the distal end of the pin hook.

In some implementations, the transverse component can be a transverse C-hook component comprising a transverse pin portion positionable in a transverse direction of the anchor base, and a C-hook portion extending upwardly from a central region of the transverse pin portion to be accessible to engage a hooking portion of the proximal connection component of the strap.

In some implementations, the transverse component of the retention mechanism can abut a bottom surface of the anchor base so as to be positioned generally under the longitudinal slot.

In some implementations, the retention mechanism of the anchor assembly or kit for the anchor assembly can further include a locking component for locking the proximal connection component of the strap to the transverse component, thereby anchoring the proximal connection component within the slot of the anchor base. Optionally, the locking component is a tie wrap, cable or rope. Optionally, the locking component is a pair of locking protrusions extending from a bottom surface of the transverse component. Optionally, the locking component is a fastener than can be received in a distal end of the hooking portion of the proximal connection component. Optionally, the locking component is a locking bracket for sandwiching the distal end of the proximal connection component with the transverse component. Optionally, the locking component is a pair of locking rods outwardly protruding from the transverse component. Further optionally, the retention mechanism can include one or more of the locking components described herein. Further optionally, the retention mechanism can include an abutment pin extending outwardly from at least one side of the C-hook portion of the transverse C-hook component. Further optionally, the retention mechanism can include a ring protruding outwardly from an edge of the C-hook portion of the transverse C-hook component.

In some implementations, the retention mechanism of the anchor assembly or kit for the anchor assembly can further include a secondary locking component that is insertable within or through a proximal end of the proximal connection component and securable to a top surface of the anchor base so as to prevent displacement of the proximal connection component along the slot of the anchor base.

In some implementations, the strap further includes a distal connection component provided at a distal end of the elongated strap component, the distal end connection component being configured to be anchored to a top surface of the tank or to another distal connection component of a facing anchor assembly provided at an opposed side of the tank.

In some implementations, there is provided a joining assembly for joining two opposed distal connection components at the top surface of the tank.

In some implementations, the anchor assembly or kit for anchor assembly can further include a fastening mechanism, and spacing bars that are connectable to the anchor base via the fastening mechanism, wherein the fastening mechanism includes an upper transverse component that can abut a surface of the anchor base in the transverse direction.

In another aspect, there is provided a system, the system including:
- a tank receivable in a ground excavation;
- a pair of anchor assemblies, each anchor assembly including at least one of the features described herein and being positionable along and apart from each side of the tank; and
- a joining assembly for joining the two anchor assemblies at a top surface of the tank, the joining assembly including at least one of the features described herein.

BRIEF DESCRIPTION OF THE DRAWINGS

Implementations of the anchor assembly, strap assembly and related system/kit are represented in and will be further understood in connection with the following figures.

FIG. 28 is a top view of the anchor base of FIG. 27.

FIG. 29 is a cross-sectional view of the anchor base of FIG. 28 along horizontal dotted line.

FIG. 30 is a cross-sectional view of the anchor base of FIG. 28 along left vertical dotted line.

FIG. 31 is a cross-sectional view of the anchor base of FIG. 28 along right vertical dotted line.

Figures 33, 34:
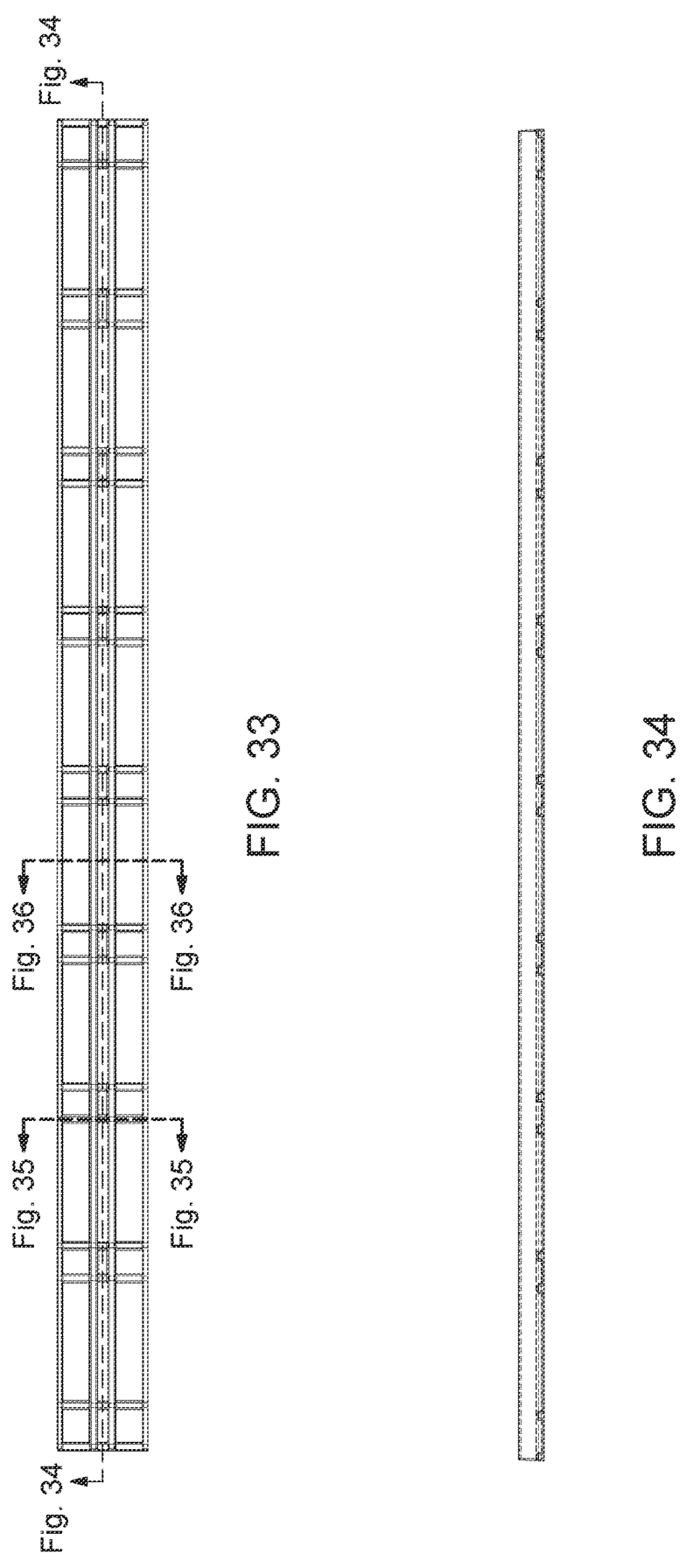

FIG. 33 is a top view of the anchor base of FIG. 32.

FIG. 34 is a cross-sectional view of the anchor base of FIG. 33 along horizontal dotted line.

FIG. 38 is a bottom view of the transverse component of FIG. 37.

FIG. 39 is a side view of the transverse component of FIG. 37.

FIG. 46 is a bottom view of the transverse component of FIG. 45.

FIG. 47 is a side view of the transverse component of FIG. 45.

FIG. 56 is a bottom view of the transverse component of FIG. 55.

FIG. 57 is a cross-sectional view of the transverse component of FIG. 56 along line AA.

While the invention will be described in conjunction with example embodiments, it will be understood that it is not intended to limit the scope of the invention to these embodiments.

DETAILED DESCRIPTION

It should be noted that the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only. Therefore, the descriptions, examples, methods and materials presented herein are not to be construed as limiting but rather as illustrative only.

In the present description, an embodiment is an example or implementation of the invention. The various appearances of "one embodiment," "an embodiment", "some embodiments" or "some implementations" do not necessarily all refer to the same implementation. Although various features of the invention may be described in the context of a single embodiment, the features may also be provided separately or in any suitable combination. Conversely, although the invention may be described herein in the context of separate implementations for clarity, the invention may also be implemented in a single embodiment.

Figure 1:
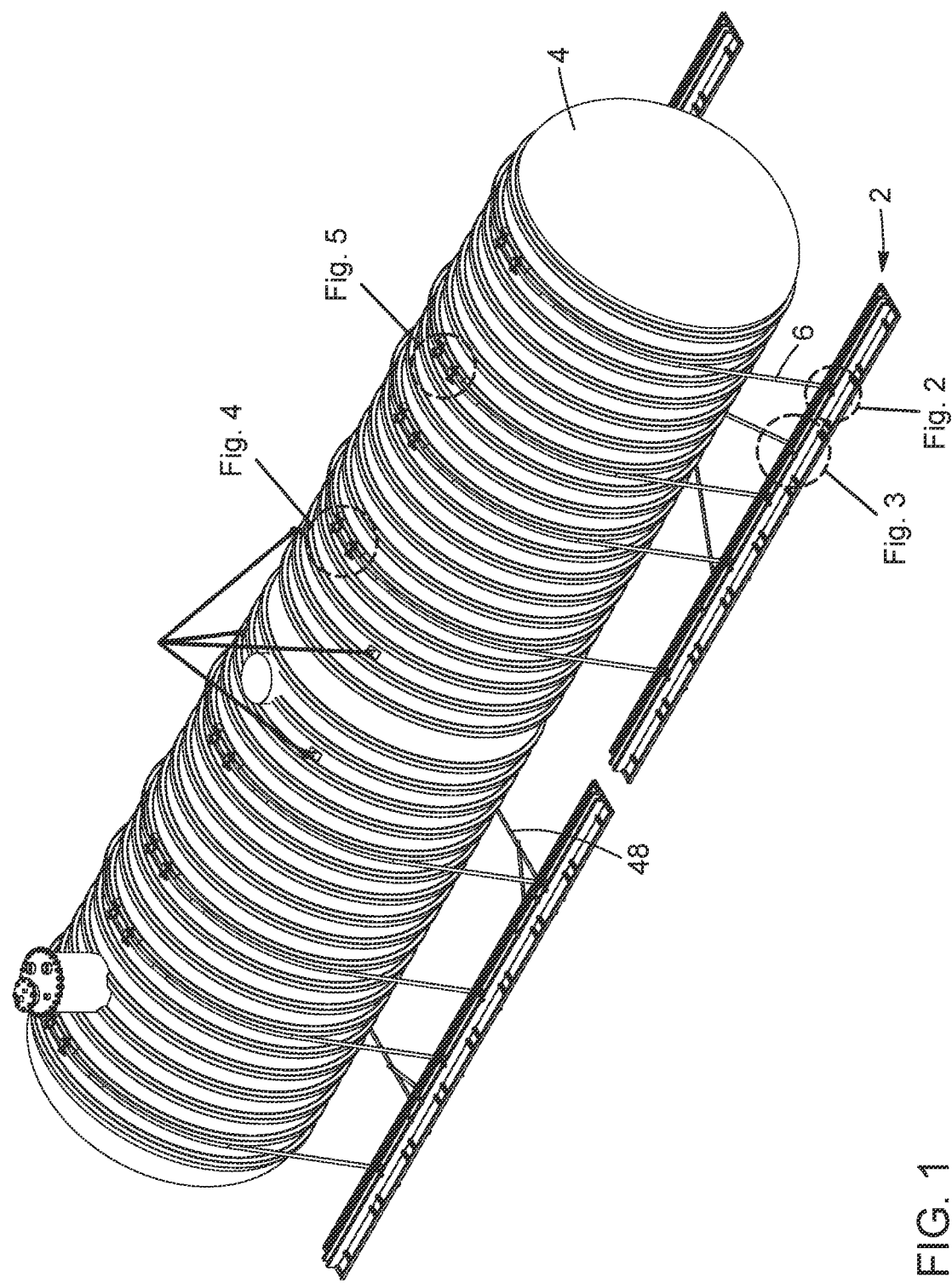
FIG. 1 is a top perspective view of an UST anchored to four anchor assemblies, each anchor assembly including multiple straps and spacing bars.
Figure 4:
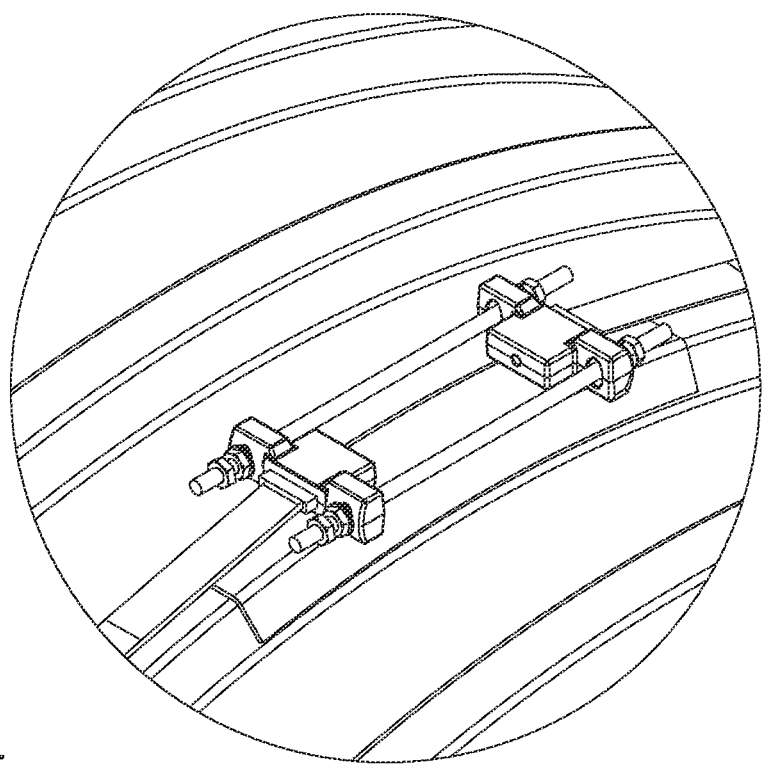
FIG. 4 is a top perspective view of a zoomed portion K of FIG. 1.
Figure 5:
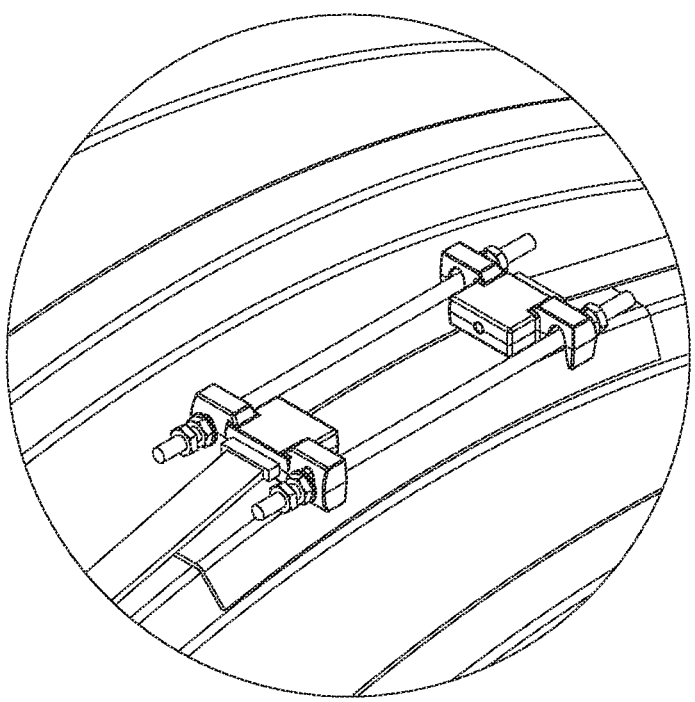
FIG. 5 is a top perspective view of a zoomed portion L of FIG. 1.
Figure 6:
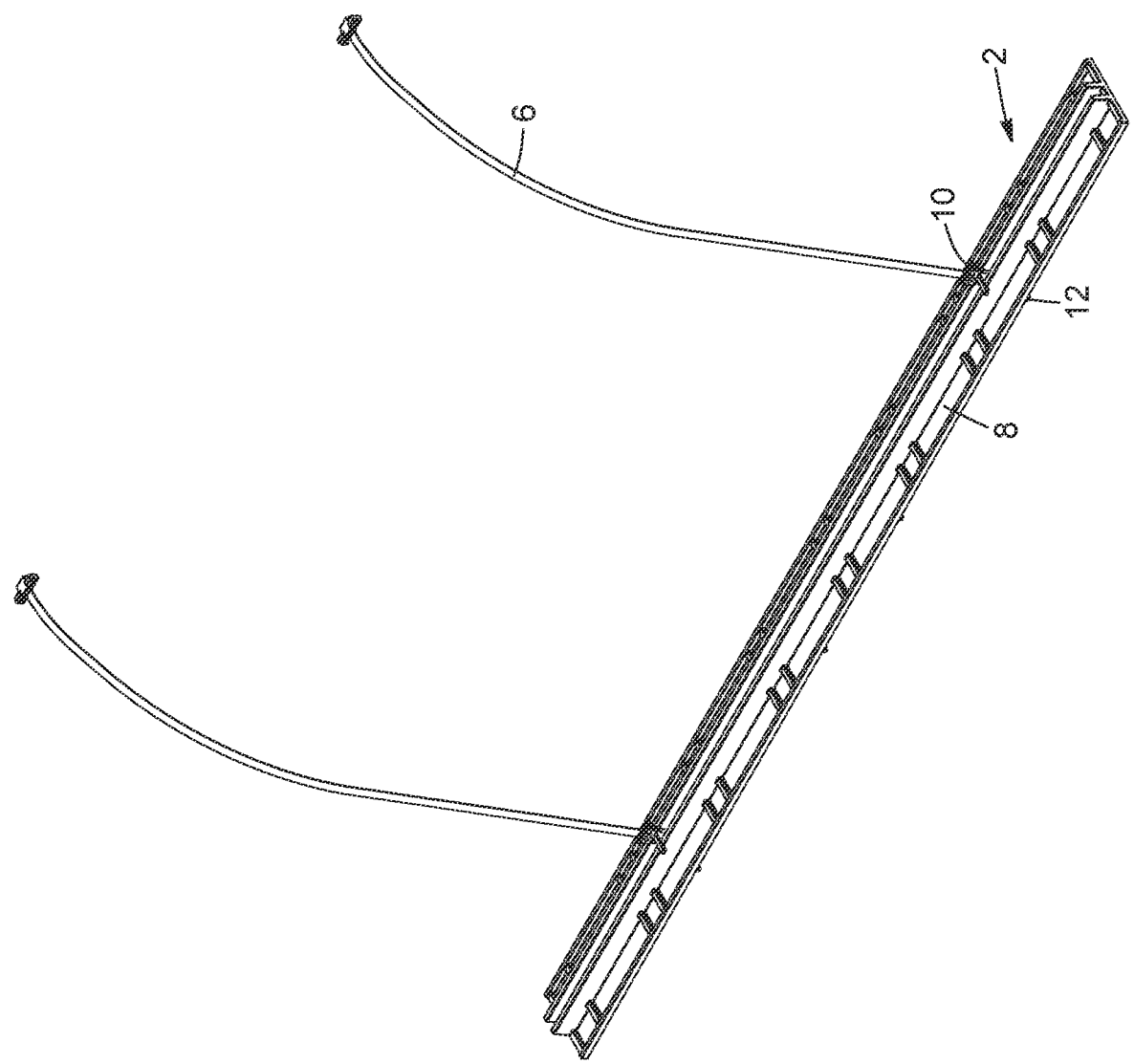
FIG. 6 is a top perspective view of an anchor assembly including two straps.
Figure 100:
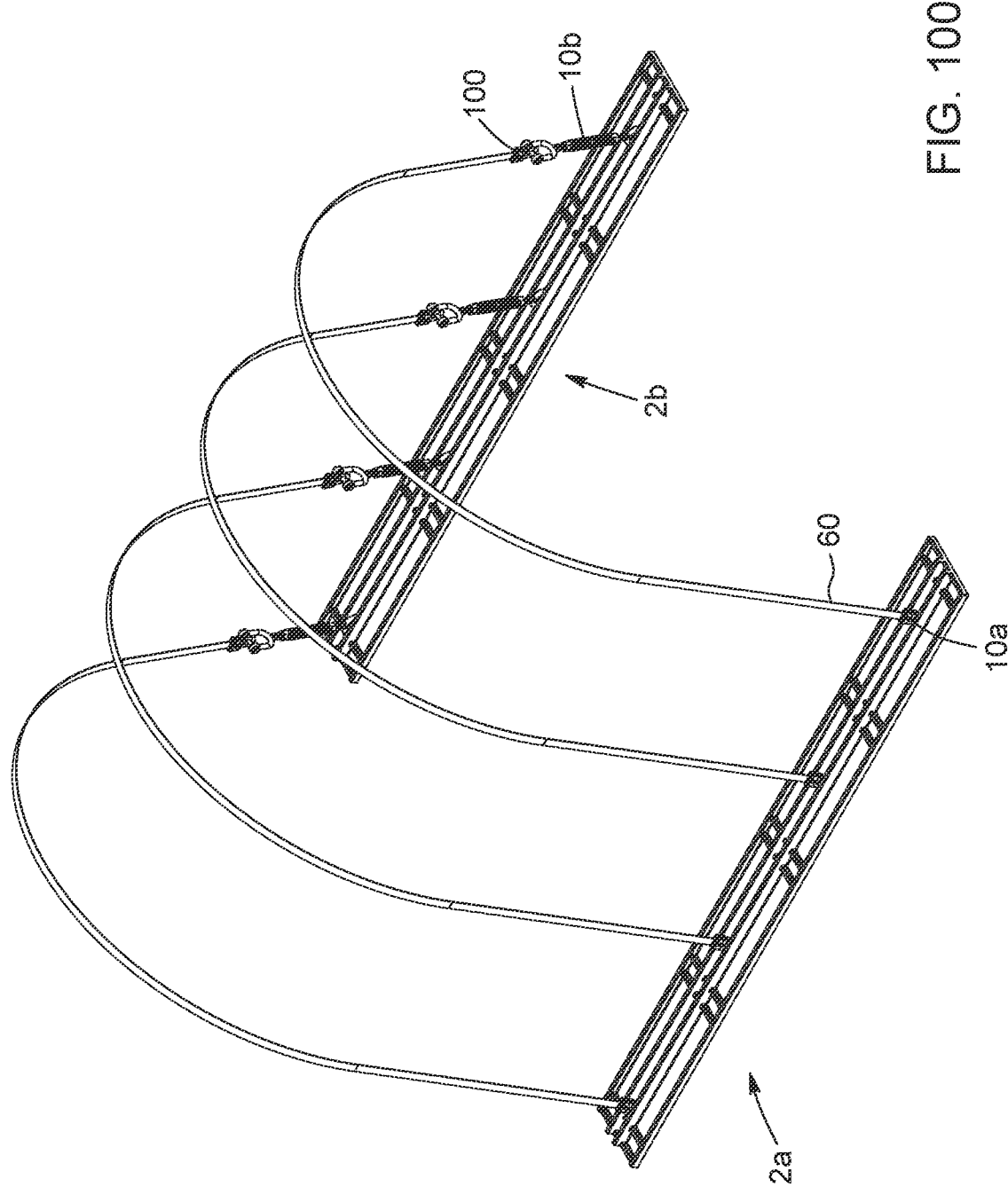
FIG. 100 is a top perspective view of a system including two anchor assemblies, each anchor assembly including multiple retention mechanisms, and the system further including multiple strap assemblies, each strap assembly comprising a single elongated strap component and two connection components, one connection component being a D-hook directly secured to the strap component and the other connection component being a turnbuckle secured to another D-hook.
Figure 101:
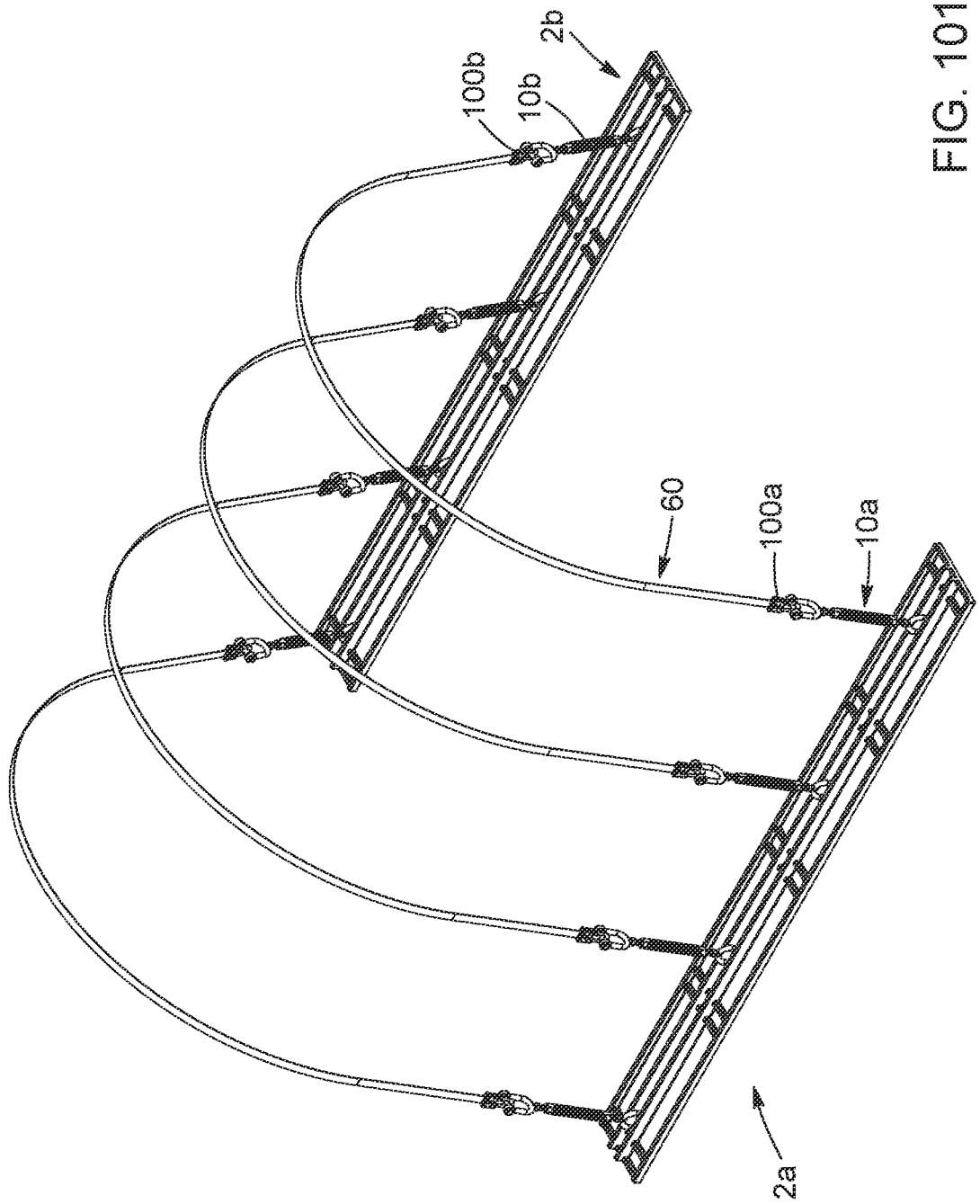
FIG. 101 is a top perspective view of a system including two anchor assemblies, each anchor assembly including multiple retention mechanisms, and the system further including multiple strap assemblies, each strap assembly comprising a single elongated strap component and two connection components, each connection component a turnbuckle secured to another D-hook that is provided at each end of the elongated strap component.

There is provided an anchor assembly that is configured to maintain a tank in place below ground level. Referring to FIG. 1, at least one anchor assembly 2 is provided at each side of the tank 4 to offer anchorage to the tank 4 via two straps 6 joining at a top surface of the tank 4. Referring to FIG. 6, the anchor assembly 2 includes an anchor base 8 and a retention mechanism 12 which cooperate for retaining a connection component 10 (such as a hook or a turnbuckle) that is provided at or near a proximal end of an elongated strap component 6. A distal end of the elongated strap component can be secured to a top of the tank as seen in FIG. 4 or to another opposite anchor assembly provided at the other side of the tank as seen in FIG. 100. Referring to FIG. 100, two anchor assemblies (2a, 2b) can be provided on each side of the tank (not shown) to offer anchorage to each end of a single strap 60. Anchorage can be performed directly by anchoring a single connection component 10a (e.g. D-hook) of the strap 60 to one anchor assembly 2a, or indirectly by anchoring one proximal connection component 10b (e.g. turnbuckle) to the opposite anchor assembly 2b that is attached to the strap 60 via an intermediate connection component 100 secured to the turnbuckle 10b. Referring to the implementation of FIG. 101, two turnbuckles (10a, 10b) can be provided as opposite proximal connection components, such that one turnbuckle is connected to each anchor assembly (2a, 2b) and can be used to further secure intermediate connection components (100a, 100b) of the single strap 60. For clarity, the connection component that is directly secured to the anchor base is referred to herein as the proximal connection component, and an additional connection component that is used to secure an elongated strap component to the proximal connection component. The combination of the proximal connection component 10 and the intermediate connection component 100, can be referred to as a connection assembly.

The present anchor assembly, in addition to being lightweight, allow for a reduced number of steps during installation thereof from a transport truck or directly below the ground in the excavated pit.

Anchor Base

The anchor base of the present anchor assembly is designed to be lightweight (e.g. about 64 kg), and allows easier manutention than typical Portland cement anchor bases that can weight 680 kg, for example. The straps required to hold the tank can be anchored to the anchor base, directly in a transport truck or in the ground excavation, via manual operations and without requiring heavy lifting equipment.

The anchor base can be generally of square or rectangular footprint and has a given base thickness. The anchor can have a flat bottom surface and can include protrusions extending upwardly from a main upper surface as will be seen in more details. Other configurations can also be designed.

Figure 10:
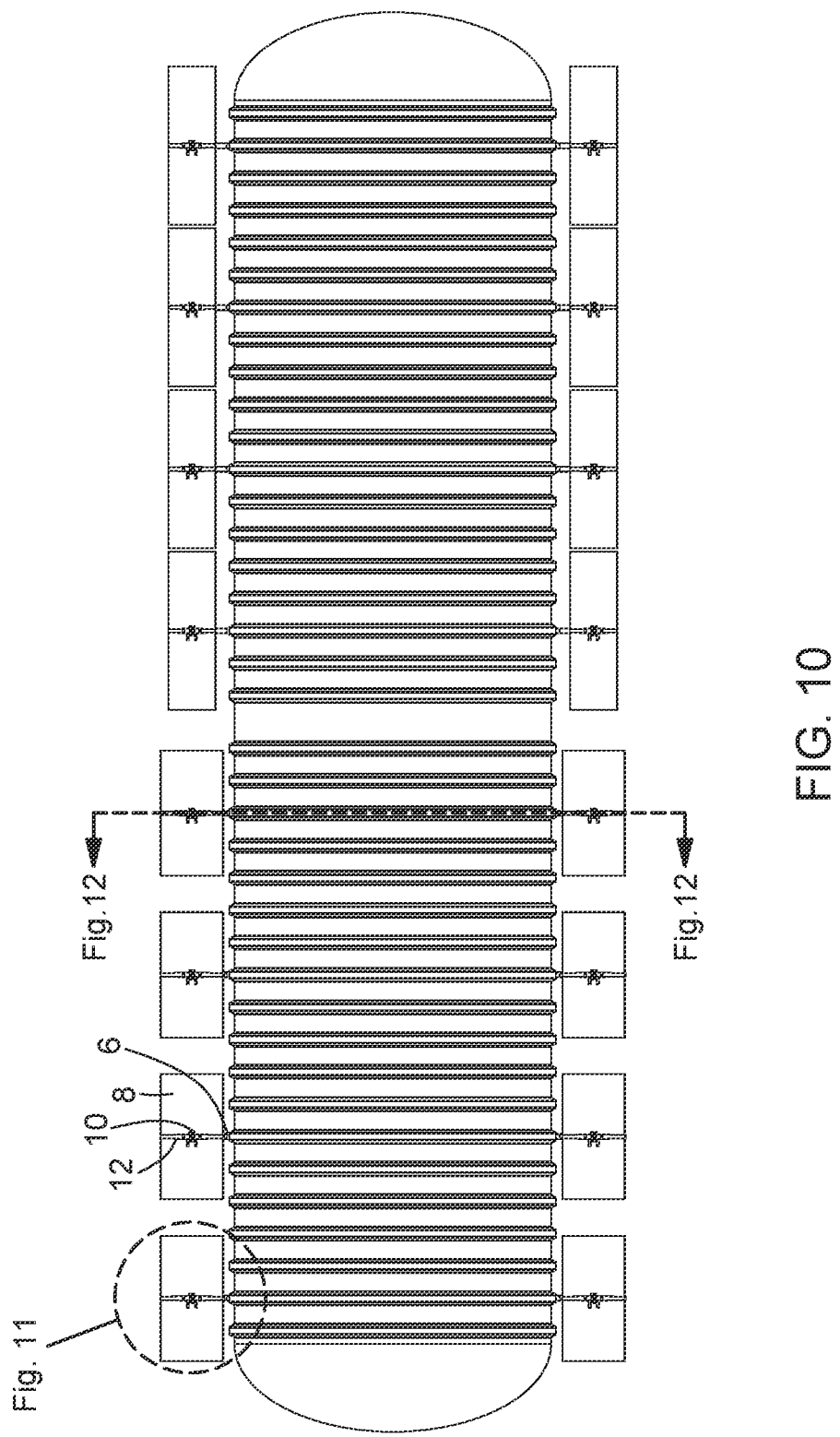
FIG. 10 is a bottom view of an UST anchored to a plurality of anchor assemblies, each anchor assembly including one strap.
Figure 14:
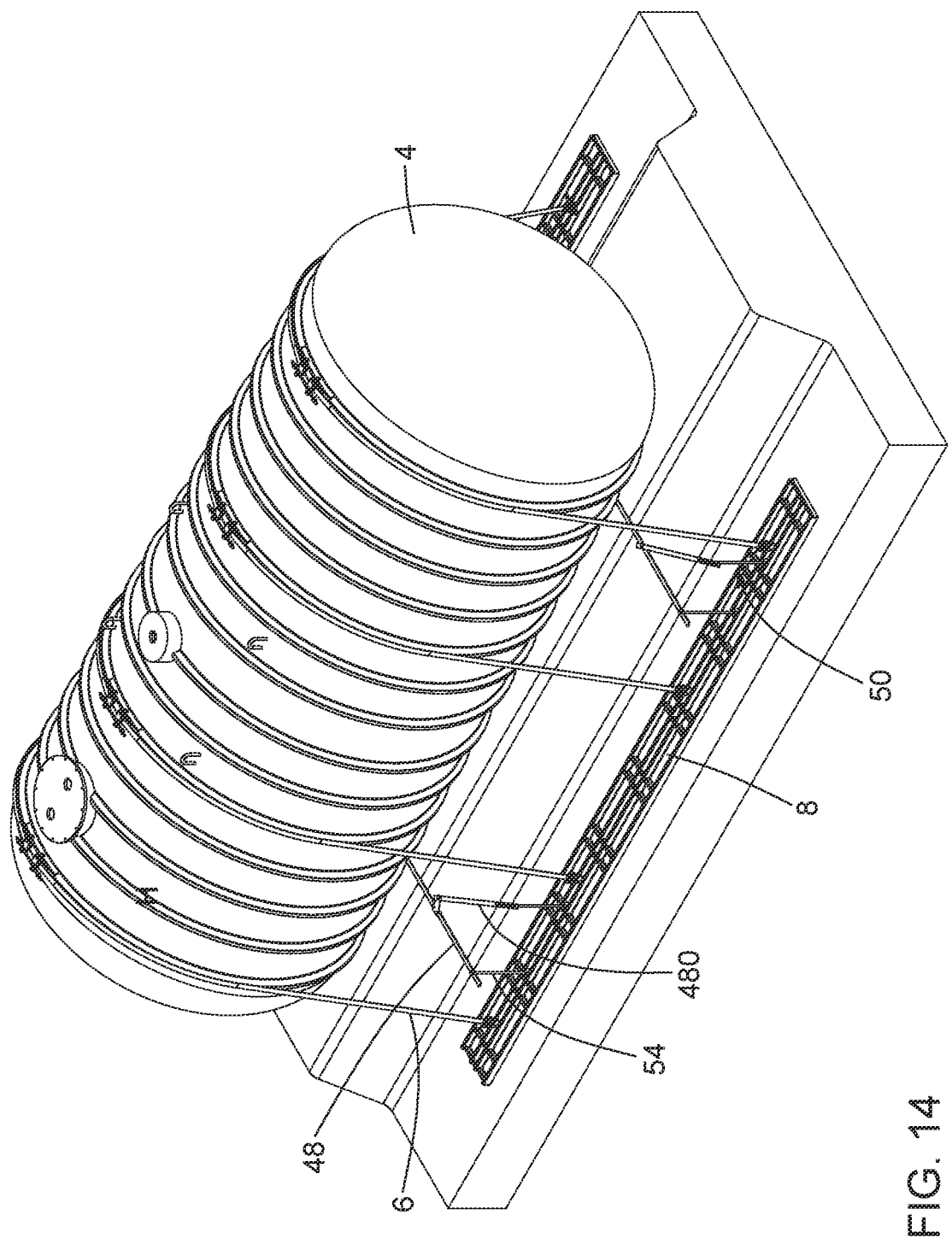
FIG. 14 is a top perspective view of an UST anchored to two anchor assemblies, each anchor assembly including multiple straps and spacing bars.
Figure 15:
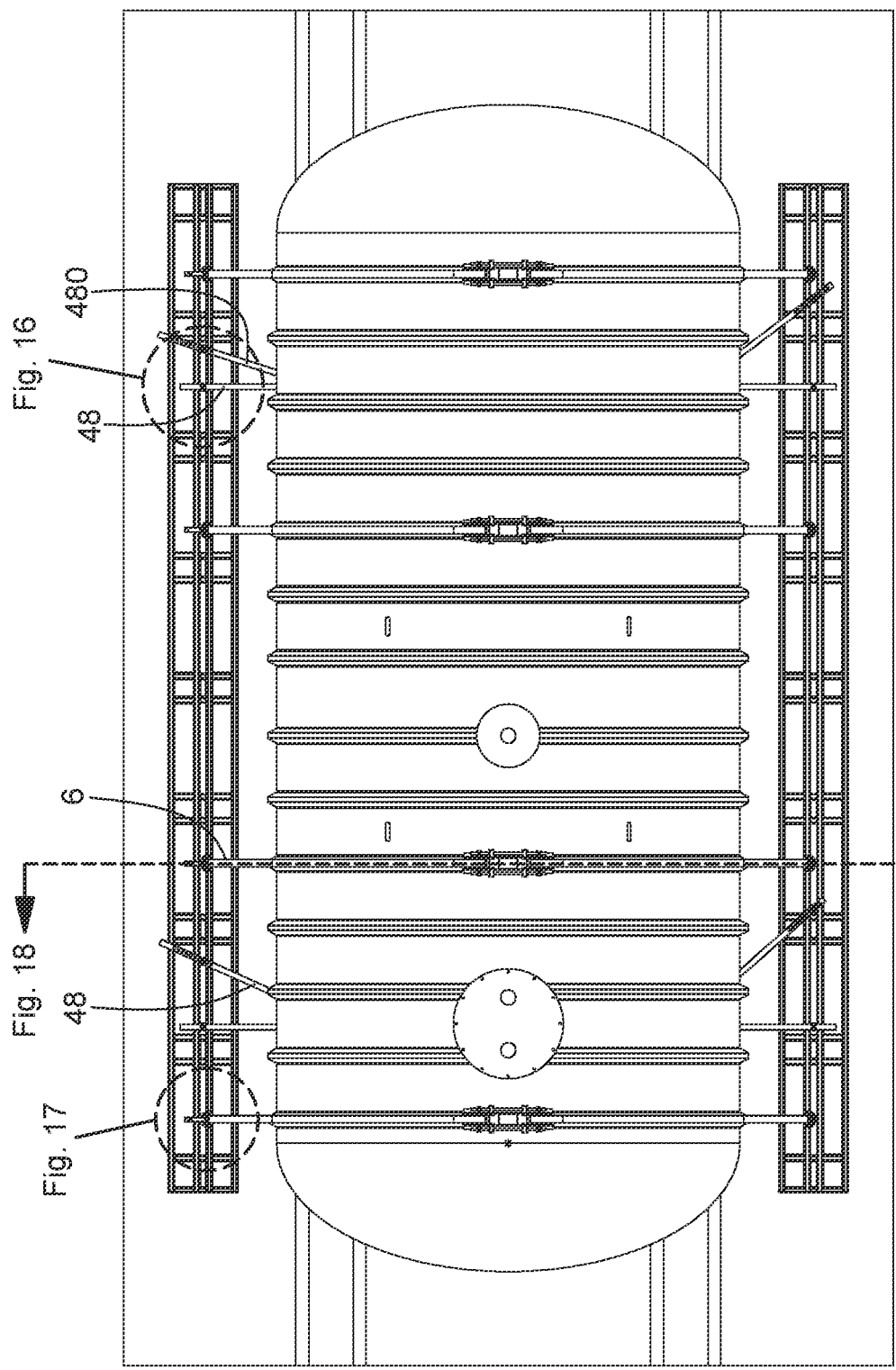
FIG. 15 is a top view of the UST and anchor assemblies of FIG. 14.
Figure 35:
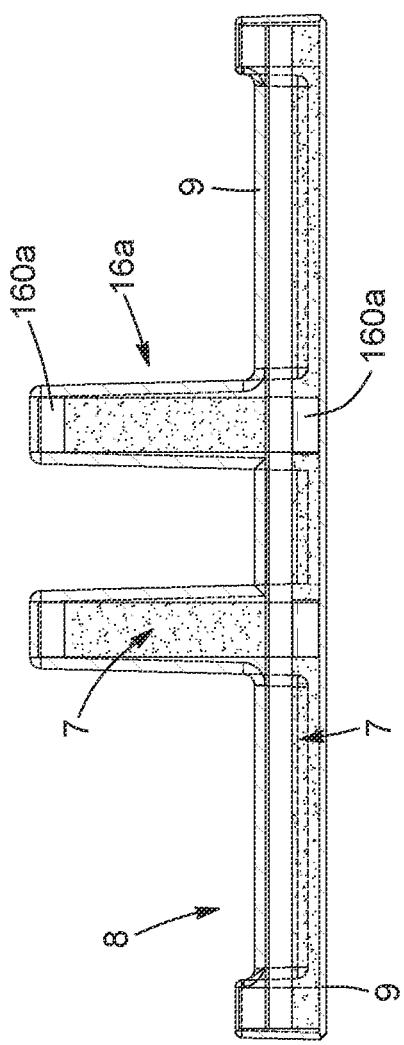
FIG. 35 is a cross-sectional view of the anchor base of FIG. 33 along left vertical dotted line.
Figure 36:
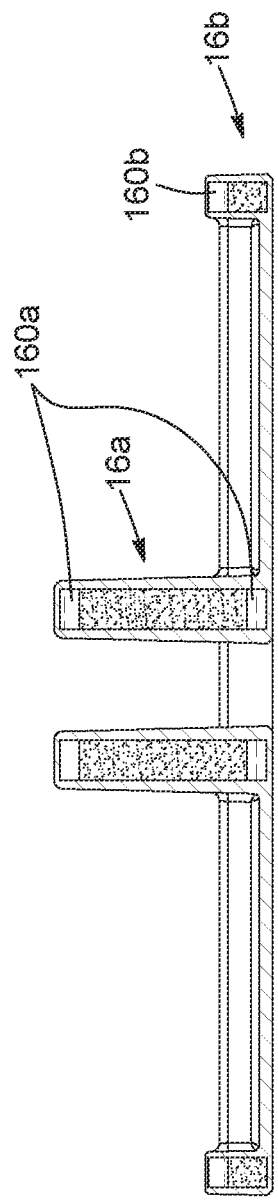
FIG. 36 is a cross-sectional view of the anchor base of FIG. 33 along right vertical dotted line.
Figure 37:
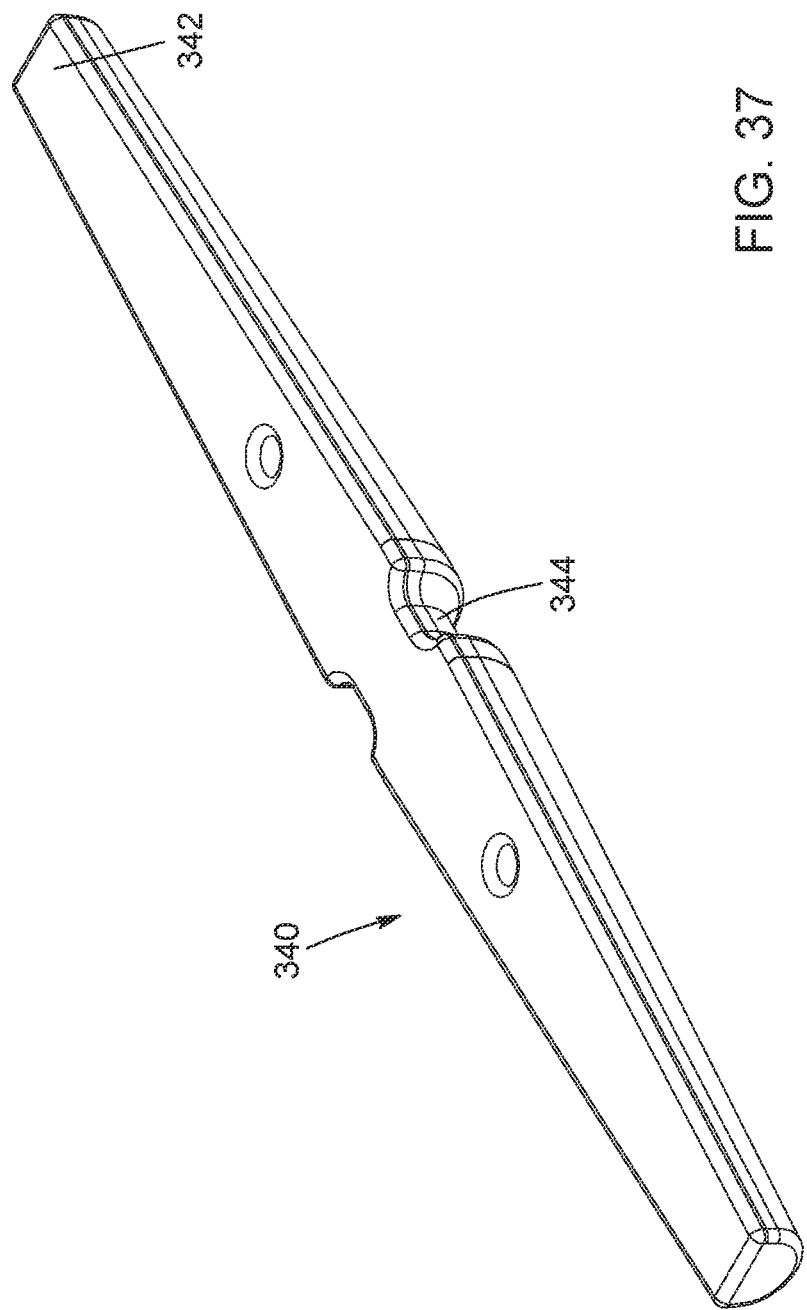
FIG. 37 is a top perspective view of a transverse component of a retention mechanism of the anchor assembly.

The anchor base can be made of a solid and dense material, such as concrete or polymer concrete. In some implementations, the anchor base can include a base core, optionally made of concrete or polymer concrete, and a base hull, optionally made of a fiberglass-based material. Referring to FIG. 35, the base hull 9 can fully surround the base core 7 for protection thereof. The anchor base 8 can be used as a single block for connecting one strap 6 as seen in FIG. 10, or as an elongated beam for connecting a plurality of straps 6, as seen in FIGS. 1 and 14. A plurality of anchor bases as described herein can be distributed along and apart from each side of the tank to be retained. FIGS. 14 and 15 illustrate a specific configuration where the anchor base 8 is used as an elongated beam having substantially the same length as the tank 4.

Figure 7:
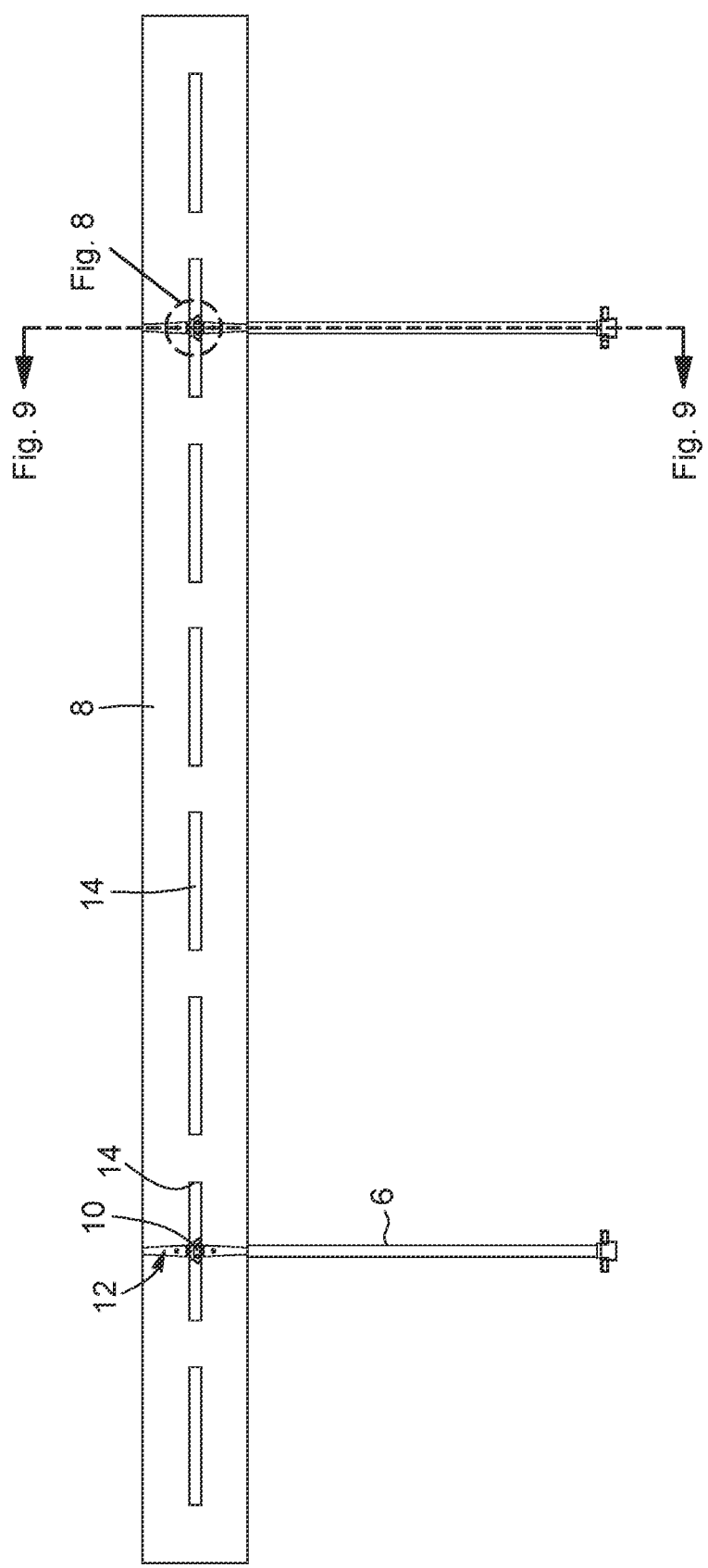
FIG. 7 is a bottom view of the anchor assembly of FIG. 6.
Figure 8:
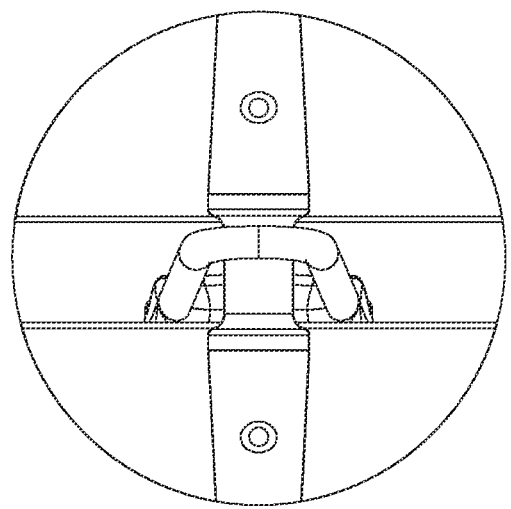
FIG. 8 is a zoomed view of portion H of FIG. 7.
Figure 11:
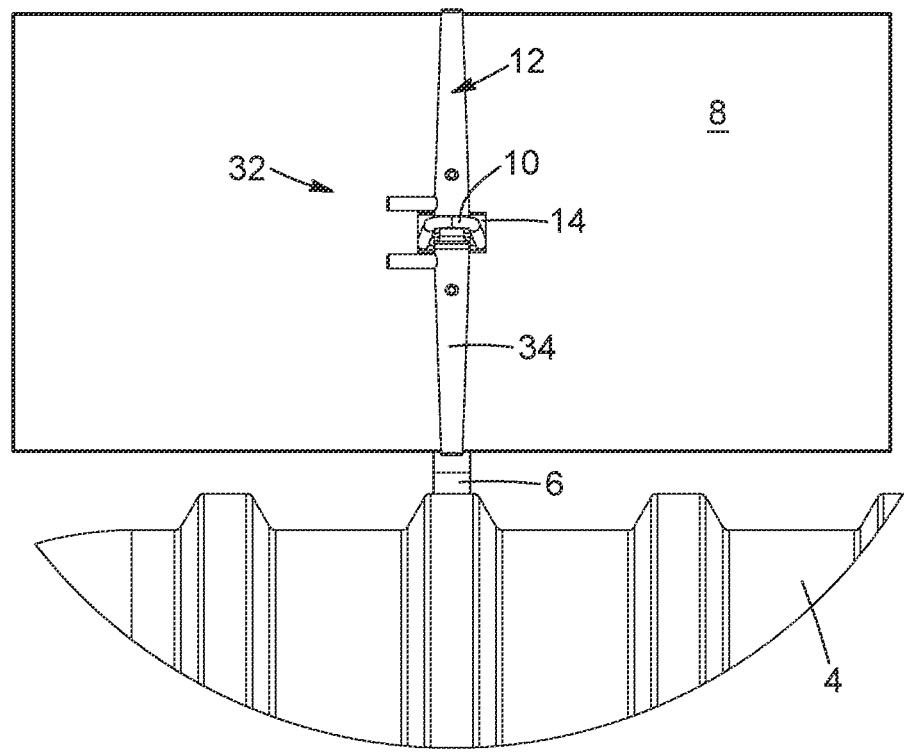
FIG. 11 is a zoomed view of portion B of FIG. 10.
Figure 12:
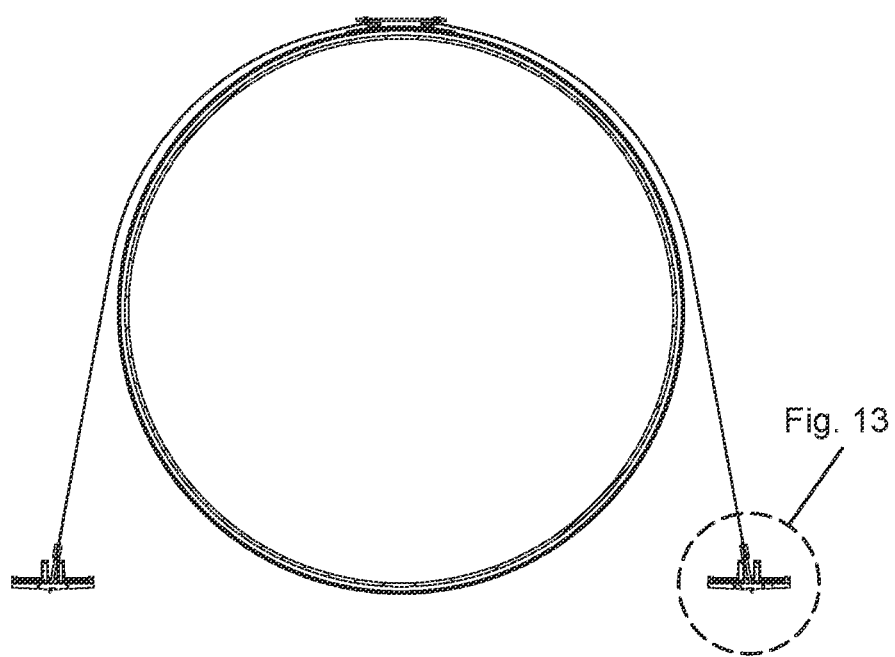
FIG. 12 is a cross-sectional view of the anchor assemblies and UST of FIG. 10 along the dotted line.

The anchor base is designed to include a slot that is accessible from a bottom surface and from a top surface of the anchor base. The slot is shaped and sized to allow insertion of at least a portion of the proximal connection component of the strap into the slot. Referring to the implementation illustrated in FIGS. 10 and 11, the anchor base 8 can be sized to include a single slot 14 receiving a portion of a D-hook (connection component 10) that is retained therein by the retention mechanism 12. The slot 14 defines an aperture across the base thickness of the anchor base 8. FIG. 11 particularly shows a tip of the D-hook 10 protruding from a bottom surface of the anchor base 8 across the slot 14. In another implementation, as illustrated in FIG. 7, multiple slots 14 can be defined across and along the anchor base 8 to offer multiple available locations for inserting one or more connection component(s) 10. For each inserted connection component 10, there is provided one retention mechanism 12 to retain the corresponding strap 6 to the anchor base 8. Referring to the implementation of FIG. 102, the slot 14 of the anchor base 8 is designed to receive a portion of the turnbuckle 10 (e.g., a 90-degree D-hook), serving to indirectly connect the intermediate connection component 100 of the strap 60. The 90-degree D-hook of the turnbuckle is seen protruding from a bottom surface of the anchor base 8 through the slot 14.

Optionally, each slot can be defined in a central portion of the anchor base and extends along a longitudinal axis of the anchor base (lengthwise). Further optionally, when multiple slots are provided within a single anchor base, the slots can be distributed symmetrically about the longitudinal axis and about a transverse axis (perpendicular to the longitudinal axis and along a width of the anchor base), as seen in FIG. 7.

The implementations illustrated in the Figures show an anchor base having one or more rectangular slot(s). It should be noted that the shape and size of the slots can differ from what is illustrated herein, depending on the shape, size and number of the connection component(s) and design of the anchor base. For example, the anchor base could have a slot defining a circular aperture in a central portion of the anchor base. However, elongated and rectangular slots can facilitate placement and alignment of multiple straps along sides of the tank.

In some implementations, the anchor base can be further designed to include reinforcing rebars that are embedded in the anchor base and that are positioned to provide structural strength to the anchor base. Optionally, the reinforcing rebars can be positioned between the base core or the base hull. Further optionally, the reinforcing rebars can be embedded in the base hull. Further optionally, the rebars can be embedded in the base core.

A first set of longitudinal reinforcing rebars can be oriented along a length of the anchor base (as per the longitudinal axis) and a second set of transverse reinforcing rebars can be oriented along a width of the anchor base (as per the transverse axis). Some of the longitudinal and transverse reinforcing rebars can be positioned so as to reinforce edges of each slot of the anchor base, and other longitudinal and transverse reinforcing rebars can be positioned so as to reinforce edges of the anchor base. It should be noted that certain embedded reinforcing rebars can be positioned such that at least a portion thereof is protruding from a main upper surface of the base core, so as to define longitudinal and transverse reinforced upward walls (or studs). FIGS. 15 and 27 to 36 show different implementations of such reinforced anchor base 8.

Figure 32:
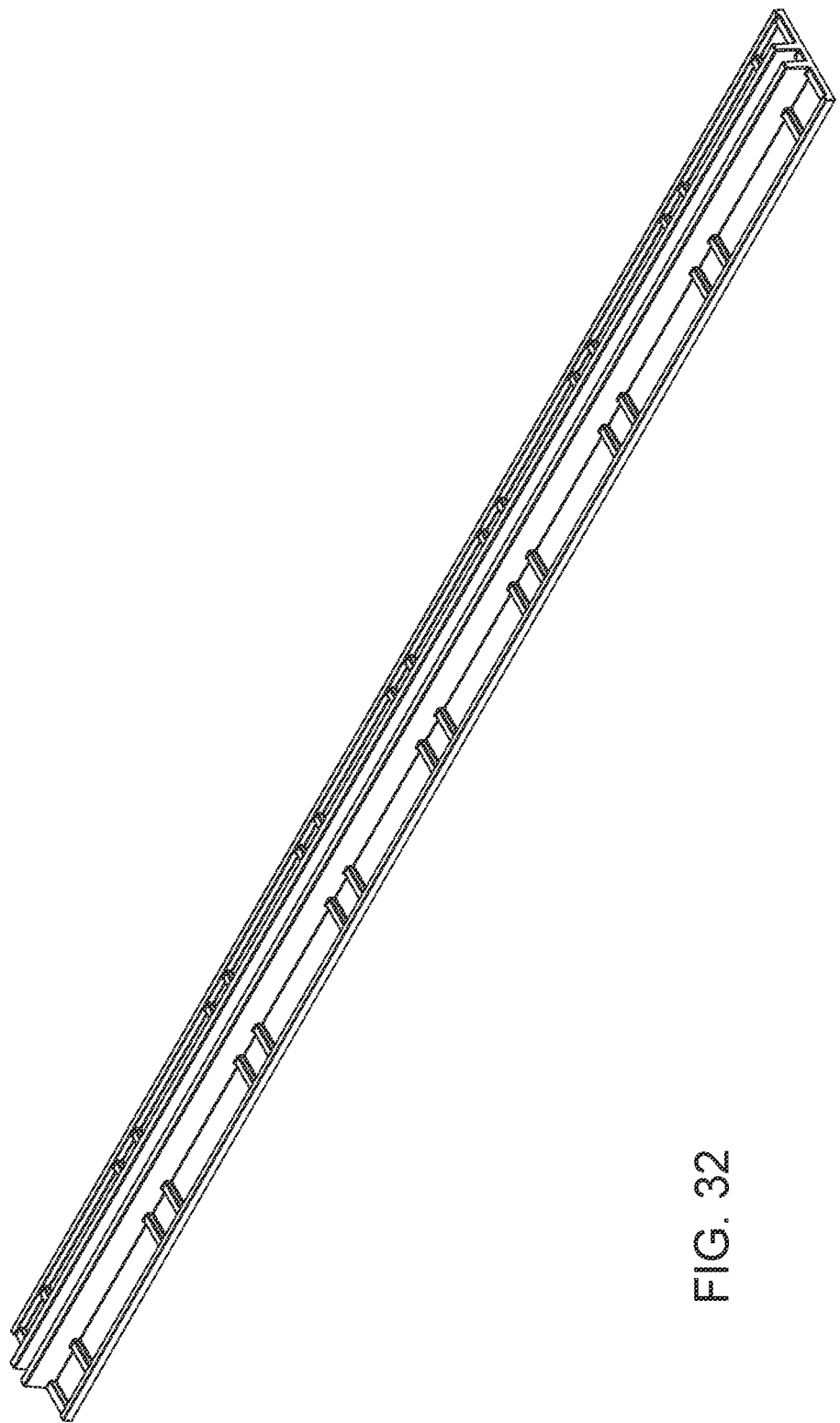
FIG. 32 is a top perspective view of another implementation of an anchor base from an anchor assembly.

Referring to FIG. 28, a pair of central reinforced longitudinal walls 16a extend along a central portion of the anchor base 8 so as to be substantially aligned with opposite edges of each slot 14 of the anchor base. A pair of side reinforced longitudinal walls 16b extend along opposite edges of the anchor base 8. Referring to FIGS. 30 and 31, two reinforcing longitudinal rebars 160a can be aligned and superposed to define one of the central reinforced longitudinal walls 16a, in an I-beam configuration. The two superposed reinforcing longitudinal rebars 160a can have a portion of base core in between. One can vary a vertical distance between the two reinforcing longitudinal rebars 160a so as to vary a height of the central reinforced longitudinal walls 16a. For example, FIG. 32 shows central reinforced longitudinal walls 16a that are higher than the central reinforced longitudinal walls 16a shown in FIG. 27. The cross-section of the central reinforced longitudinal walls 16a shown in FIG. 35 reveals that the two longitudinal reinforcing rebars 160a embedded in each central reinforced longitudinal wall 16a are further apart than those shown in FIG. 30.

In the implementation shown in FIGS. 27 to 31, the side reinforced longitudinal walls 16b are of substantially the same height as the central reinforced longitudinal walls 16a. Optionally, the side reinforced longitudinal walls 16b can also be constructed in the same way as the central reinforced longitudinal walls 16a, i.e. via superposition of a pair of longitudinal reinforcing rebars 160b. In the implementation shown in FIGS. 32 to 36, the side reinforced longitudinal walls 16b are of different height, for example lower, than the central reinforced longitudinal walls 16a. Optionally, the side reinforced longitudinal walls 16b can also be constructed in a different way than the central reinforced longitudinal walls 16a, i.e. via embedding a single longitudinal reinforcing rebar 160b. Optionally, two or more longitudinal reinforcing rebars can be superposed to form a reinforced longitudinal wall in a central portion of the anchor base and/or on the side edges of the anchor base. Further optionally, each longitudinal rebar can extend the entire length of the anchor base to enhance the structural strength of the anchor base. One can readily understand that the configuration and the construction of the anchor base can differ form what is illustrated in FIGS. 27 to 36 without departing from the scope of the present anchor assembly.

Figure 27:
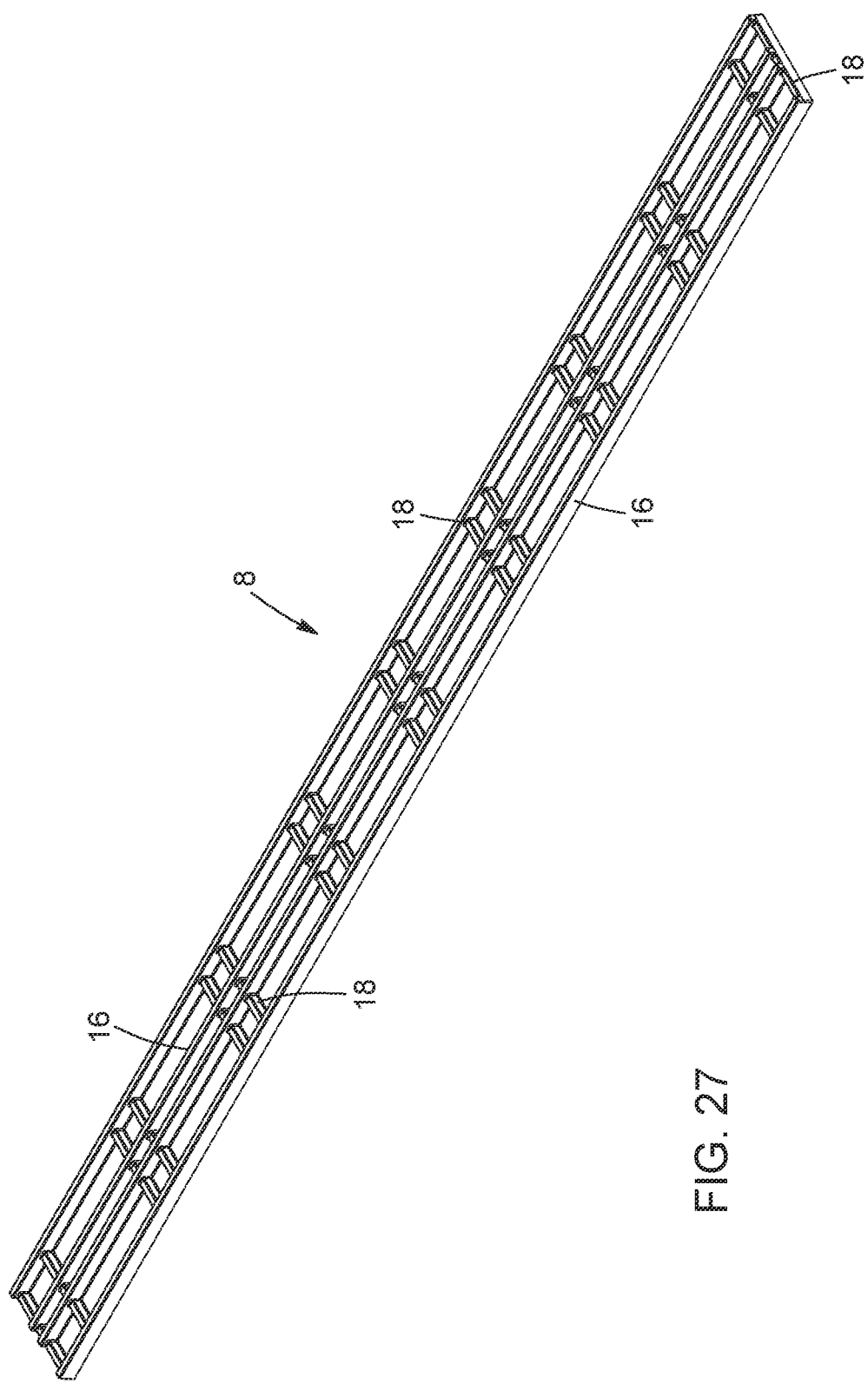
FIG. 27 is a top perspective view of an anchor base from an anchor assembly.

As seen in FIG. 27 for example, in addition to the multiple reinforced longitudinal walls 16, multiple reinforced transverse walls 18 can protrude from a main upper surface of the anchor base 8. As mentioned above, the reinforced transverse walls 18 result from embedding transverse reinforcing rebars (not shown in FIG. 27) that are provided to strengthen the anchor base 8. More specifically, as better seen in FIG. 28, at opposed transverse sides of each slot 14, one reinforced transverse wall 18a can be positioned. Referring to FIG. 31, a transverse reinforcing rebar 180a can be sandwiched between the central longitudinal reinforcing rebars 160a to further strengthen the whole anchor base. Each transverse reinforcing rebar 180a can extend the entire width of the anchor base 8 and can be further sandwiched between the side longitudinal reinforcing rebars 160b. Although, other configurations are possible with, for example, a transverse reinforcing rebar 180a being below the lowest side longitudinal reinforcing rebar 160b and above the polymer concrete core. It should be noted that transverse sides of the anchor base are reinforced in the same way with a transverse reinforcing rebar extending the entire width of the anchor base 8 (not shown) to define side transverse reinforced walls 18b, as seen in FIG. 28.

It should further be noted that the implementations of the anchor base are not limited to those illustrated in the Figures, and the anchor base can include additional reinforcing rebars distributed longitudinally, transversely, or any other directions to further strengthen a main portion of the anchor base, and not only the upward walls. The thickness, type of material, and positioning of reinforcing elements of the main body can be selected to modify the moment of inertia of the anchor base.

In some implementations, the reinforcing rebars can be pultruded fiberglass rebars. Further optionally, the reinforcing rebars can have a substantially flat surface. Further optionally, the rebars can have a cross-section being shaped as a square, a rectangle, a round, an hexagon or an octagon.

Strap Assembly

The strap assembly is generally referred to herein as a "strap" and includes an elongated strap component and a connection component provided at one proximal end of the elongated strap component, thereby being referred to as a proximal connection component. The proximal connection component is configured to be anchored to the anchor base via a retention mechanism that will be further detailed below.

Figure 2:
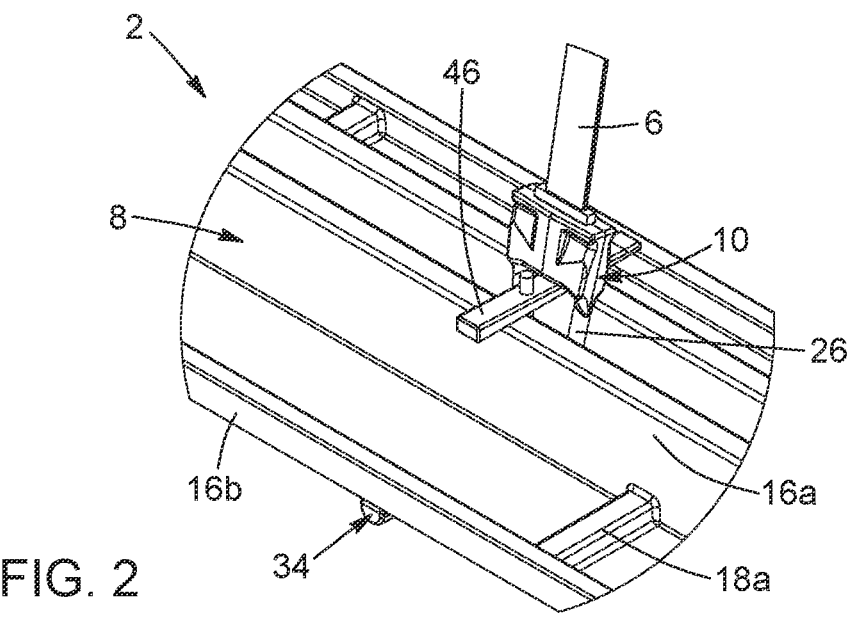
FIG. 2 is a top perspective view of a zoomed portion H of FIG. 1.

The proximal connection component is secured directly or indirectly to the elongated strap component. Several ways of operatively connecting the elongated strap component to the proximal connection component are thus available. For example, as seen in FIG. 2, the elongated strap component 6 can be inserted in a slot of the proximal connection component 10 that is a D-hook. In another example, referring to FIG. 102, the elongated strap component 60 can be inserted in a slot of an intermediate connection component 100 that is a D-hook. The intermediate connection component 100 is secured to the proximal connection component 10 that can be a turnbuckle, and the turnbuckle 10 being engaged to the anchor base 8 via the retention mechanism 34. Other ways of securing the elongated strap component to the proximal connection component are as readily known by one skilled in the art.

The elongated strap component can optionally be made of pultruded fiberglass-based material or be made of synthetic fibers, that can include nylon, polyester, polyether, Kevlar, aramide, cisal, polyether ether ketone (PEEK), polyphenylene ether homopolymer (PEH), polypropylene (PP), polyethylene, or a combination thereof.

Figure 77:
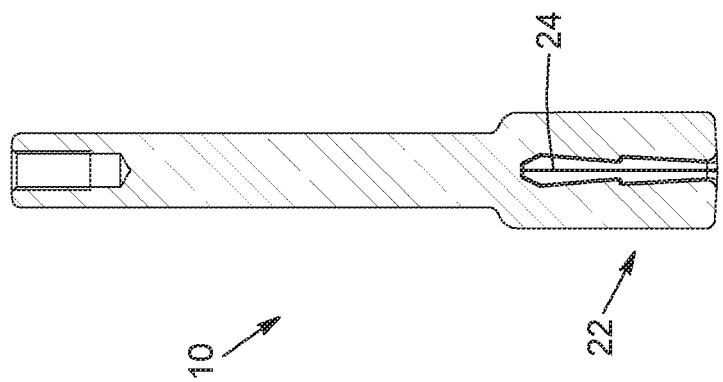
FIG. 77 is a cross-sectional view of the pin hook of FIG. 76 along line AA.

Various implementations of the proximal connection component as encompassed herein are represented for example in FIGS. 48, 50, 61, 68, 69, 75, 82, and 102. In some implementations, referring to FIG. 62 for example, the proximal connection component 10 includes a main portion 22 having a strap slot 24 for receiving the proximal end of the elongated strap component (not shown in FIG. 61). It should be noted that the securing of the elongated strap component within the strap slot of the proximal connection component is performed according to available techniques in the art. For example, the elongated strap component can be inserted and chemically fixed (via a resin for example) into the strap slot of the main portion. As further seen in FIGS. 77 and 84, the strap slot 24 of the proximal connection component 10 can have a dovetail shape which advantageously contributes to the strength of the connection between the main portion 22 and the elongated strap component.

Figure 48:
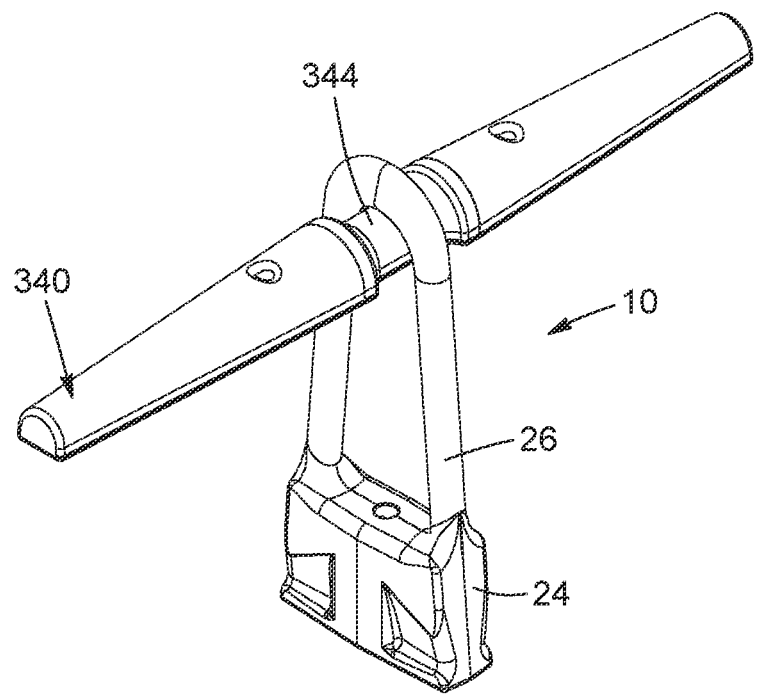
FIG. 48 is a top perspective view of a transverse component inserted into long D-shaped hooking portion of a connection component of the anchor assembly.
Figure 49:
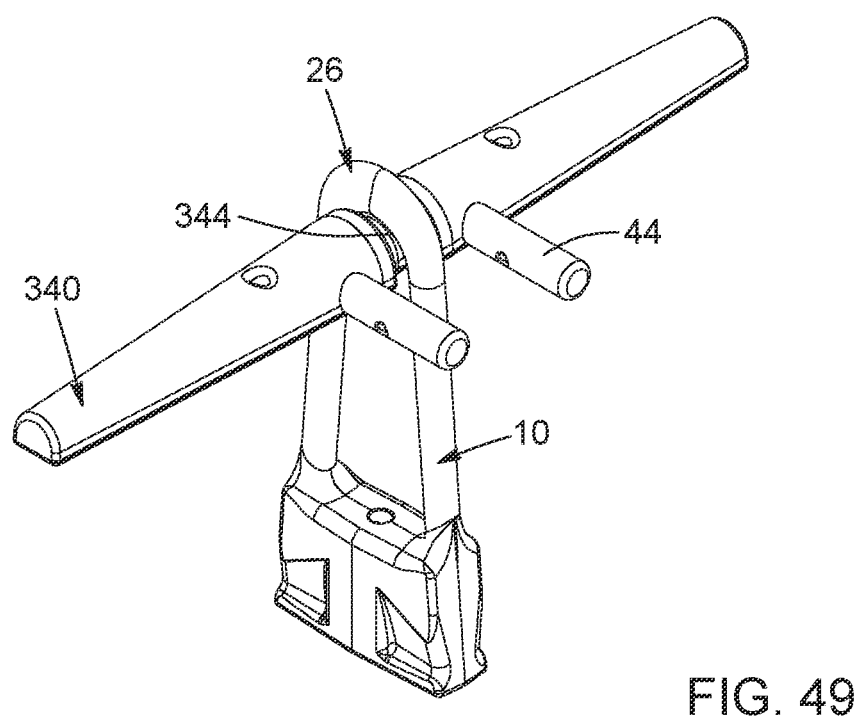
FIG. 49 is a top perspective view of another implementation of a transverse component inserted into long D-shaped hooking portion of a connection component of the anchor assembly.
Figure 102:
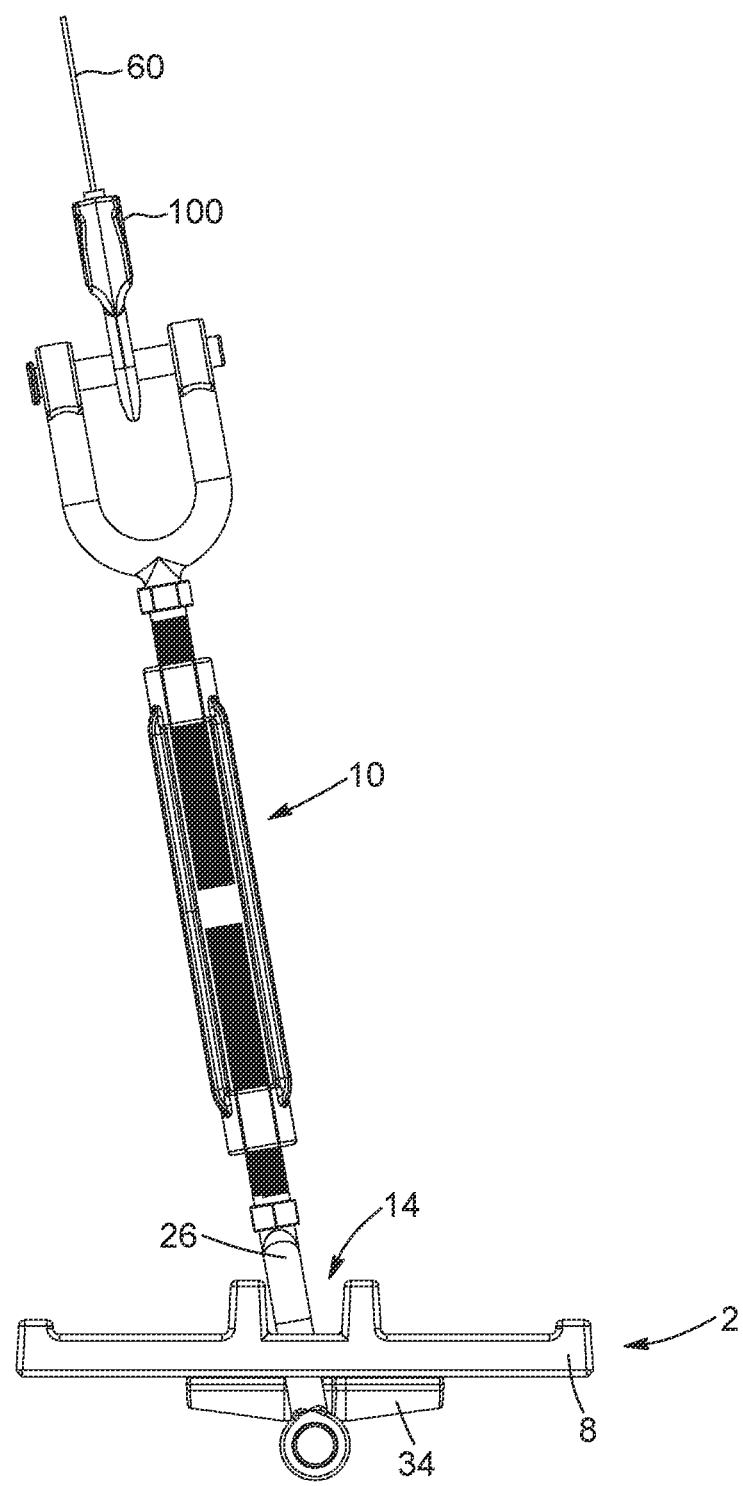
FIG. 102 is a side view of a zoomed portion of FIG. 101 showing the turnbuckle engaged with a transverse component of a retention mechanism of one anchor assembly.

The proximal connection component further includes a hooking portion designed to cooperate with the retention mechanism of the anchor assembly. Referring to FIGS. 48 and 49, the hooking portion 26 of the proximal connection component 10 can define a loop through which an element can be inserted. For example, the proximal connection component can be a D-shaped hook as seen in FIG. 48, or a C-shaped hook. FIGS. 48 and 49 illustrate a D-shaped hook having a longer hooking portion 26 than the shorter D-shaped hook illustrated in FIGS. 50 and 51. FIG. 102 illustrates a 90-degree D-shaped hook that is the hooking portion 26 of the turnbuckle 10. The size of the hooking portion 26 can thus be adapted to the height of the central reinforced longitudinal walls between which the proximal connection component is to be inserted.

Figure 61:
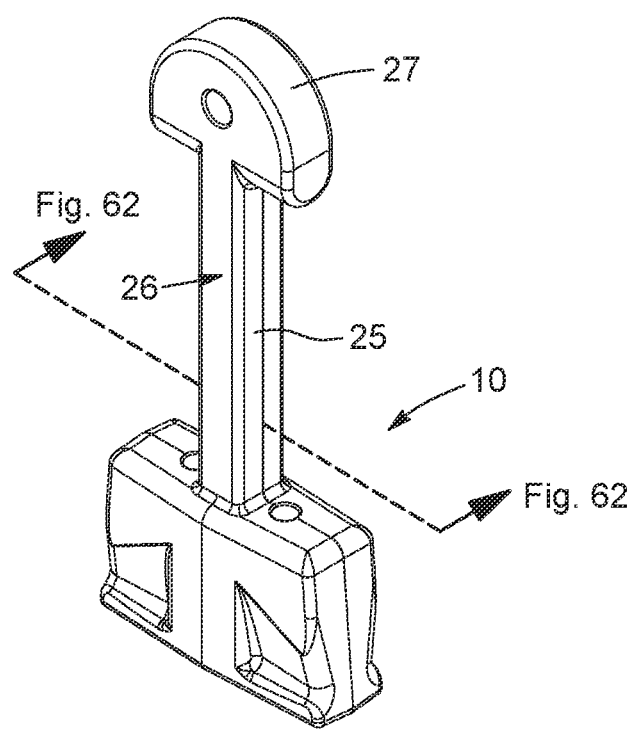
FIG. 61 is a top perspective view of a connection component of the anchor assembly.
Figure 62:
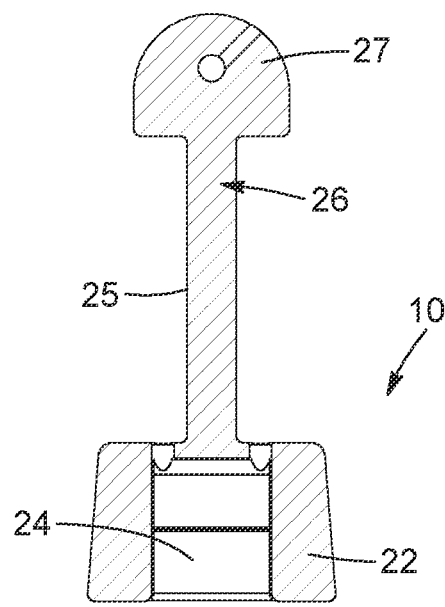
FIG. 62 is a vertical cross-sectional view of the connection component of FIG. 61.
Figure 75:
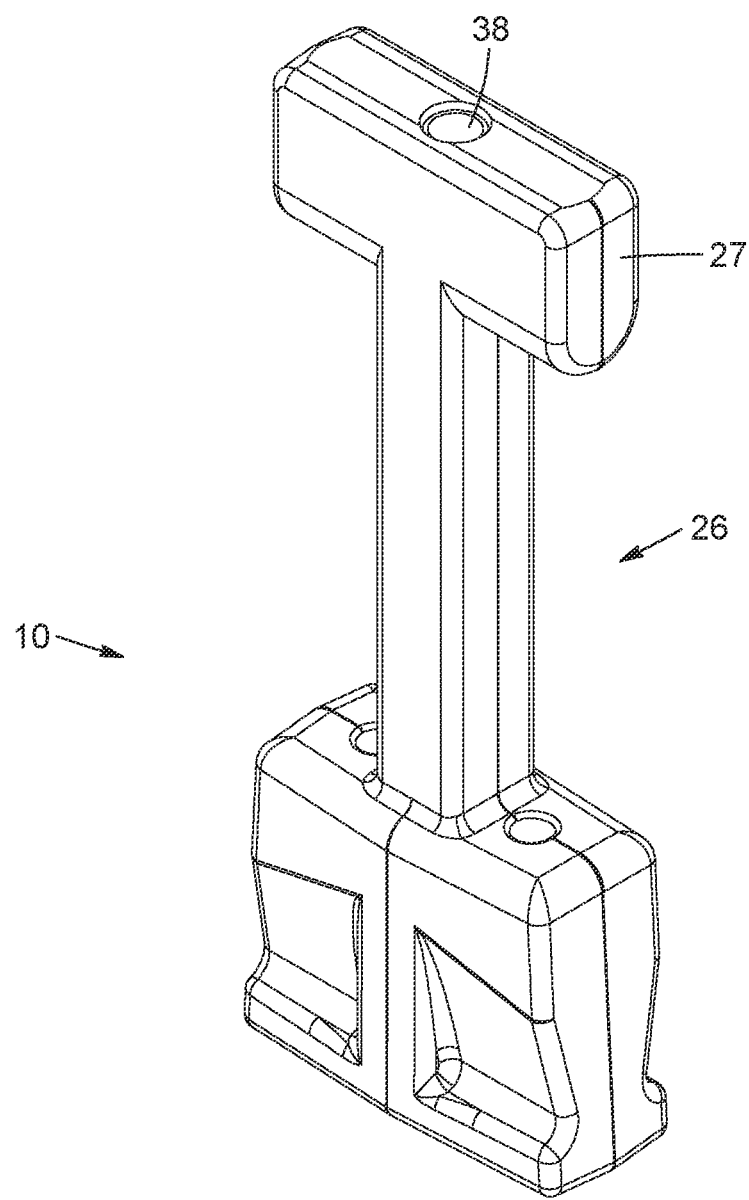
FIG. 75 is a bottom perspective view of another implementation of a pin hook of the anchor assembly.
Figure 76:
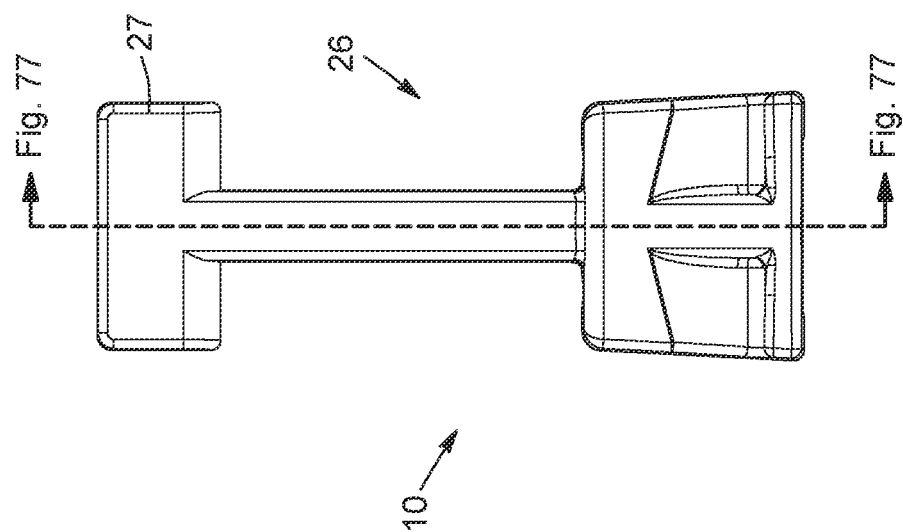
FIG. 76 is a front view of the pin hook of FIG. 75.
Figure 78:
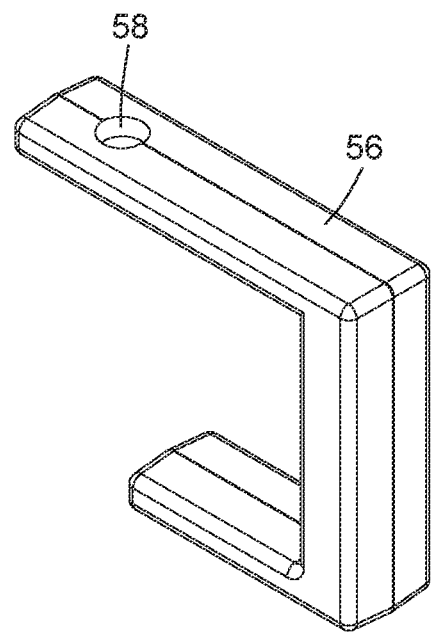
FIG. 78 is a bottom perspective view of a locking bracket of a retention mechanism of the anchor assembly.
Figure 79:
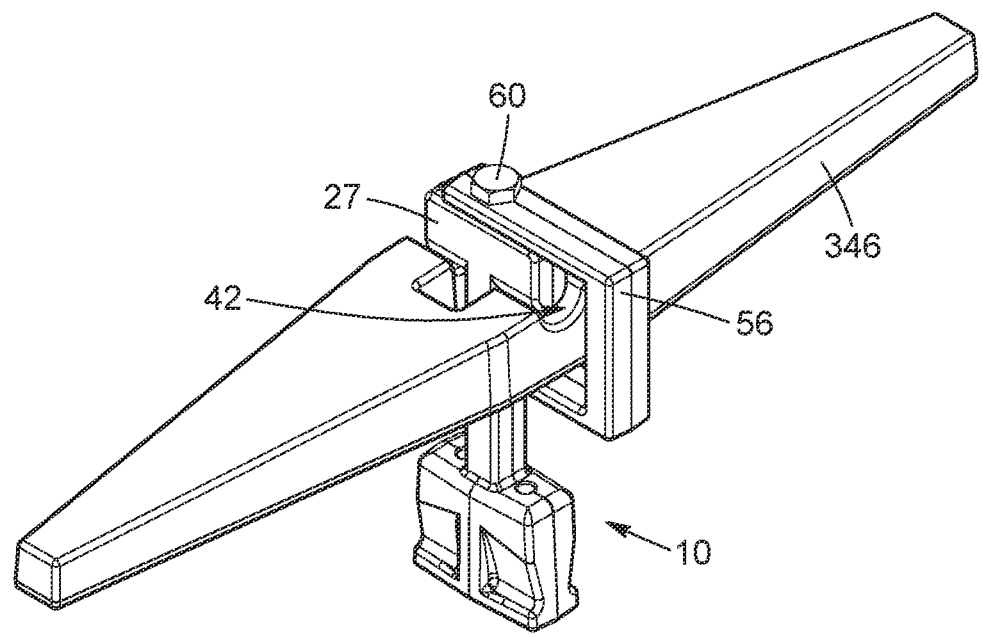
FIG. 79 is a bottom perspective view of the locking bracket of FIG. 78 engaged with a transverse component and a pin hook of the anchor assembly.
Figure 80:
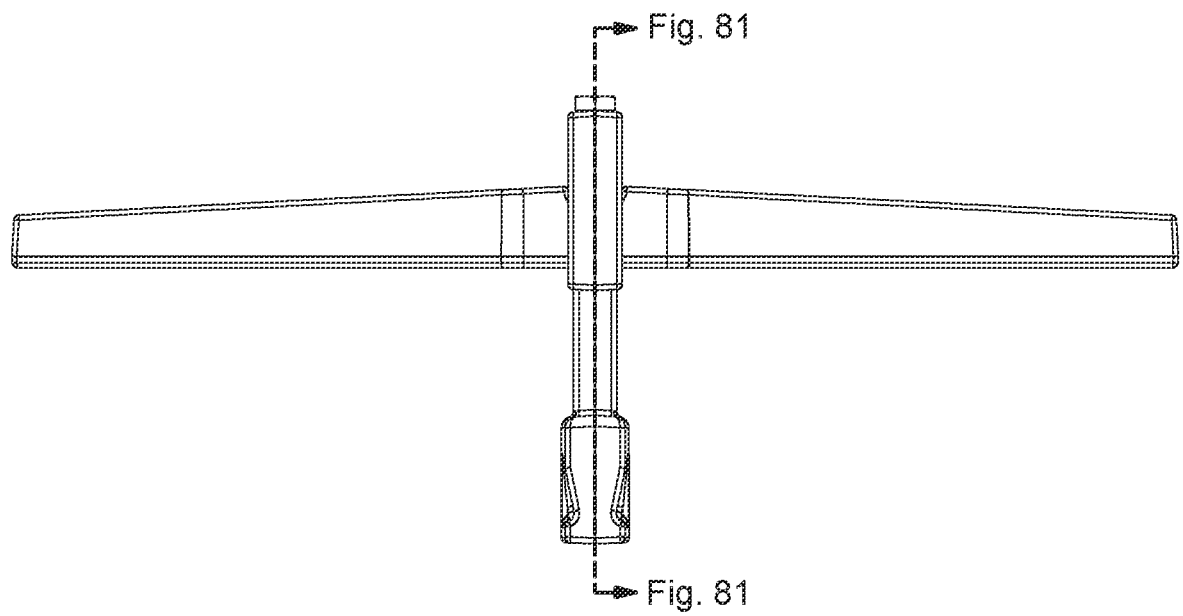
FIG. 80 is a front view of the assembly of FIG. 79.
Figure 82:
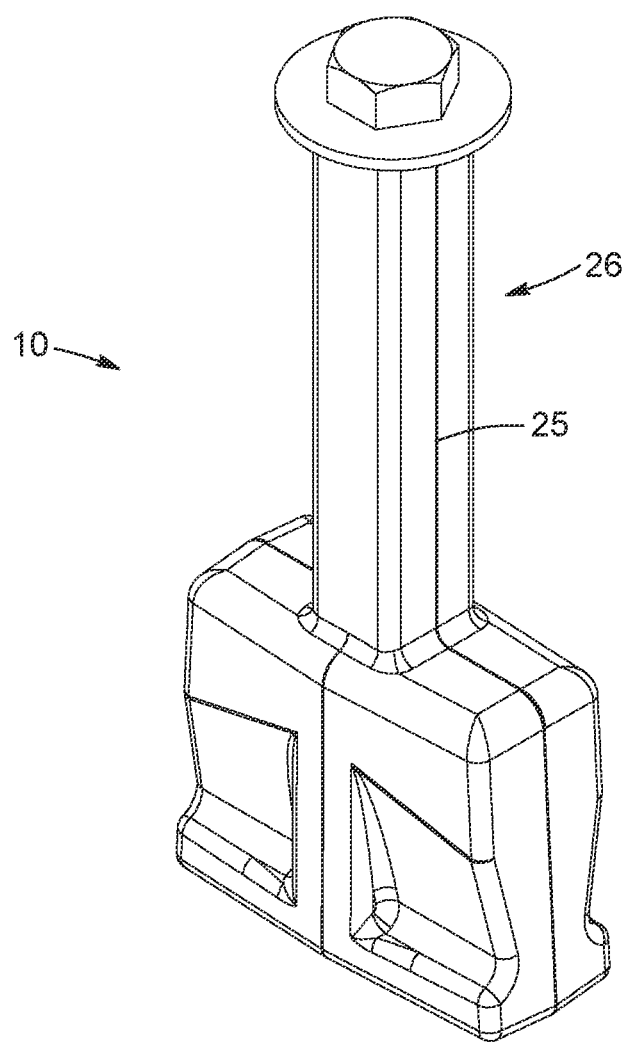
FIG. 82 is a bottom perspective view of another implementation of a pin hook of the anchor assembly.
Figure 83:
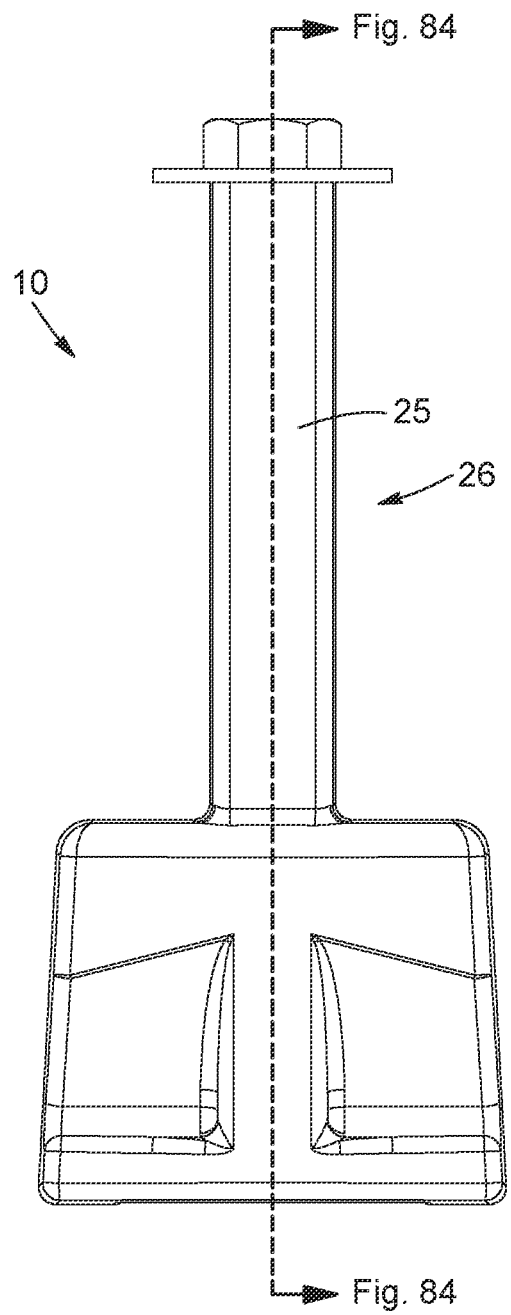
FIG. 83 is a front view of the pin hook of FIG. 82.
Figure 84:
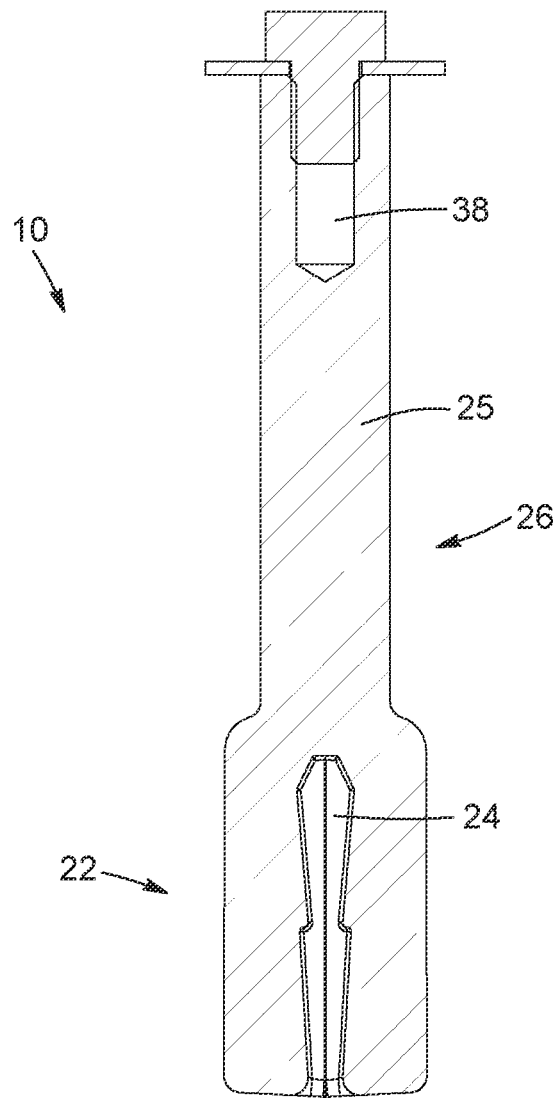
FIG. 84 is a cross-sectional view of the pin hook of FIG. 83 along line AA.

In other implementations, the proximal connection component can be a pin hook. Examples of a pin hook as encompassed herein are illustrated in FIGS. 61, 75 and 82, the pin hook having a hooking portion 26 of varying design. Referring to FIGS. 61 and 75, the proximal connection component 10 can be a pin hook having a hooking portion 26 designed to cooperate with the retention mechanism illustrated in FIGS. 42, 52, 55, 58 and 69. Referring to FIGS. 61 and 62, the hooking portion 26 can include a semi-circular distal end 27 extending from a rod-shaped central portion 25. FIGS. 75 and 76 show an alternative implementation wherein the distal end 27 of the hooking portion 26 is shaped as a rectangle. Referring to FIGS. 82 to 84, the hooking portion 26 of the pin hook 10 can simply be formed by a rod 25 that can cooperate with the retention mechanism illustrated in FIGS. 85 and 86.

In all implementations of the pin hook, the hooking portion of the pin hook can further include an aperture or channel (38 in FIGS. 65, 75 and 84) that can receive a locking component of the retention mechanism as will be described below in further details.

It should be noted that the proximal connection component can differ from what is illustrated in the Figures as long as it includes a hooking portion that can be inserted in the slot of the anchor base and be retained in such slot by the retention mechanism described herein.

Optionally, the strap assembly can further include another connection component provided at a distal end of the elongated strap component, and thereby referred to as the distal connection component. Such distal connection component is connectable to another strap assembly located at the opposed side of the tank such that two strap assemblies can surround an upper surface the tank. FIGS. 4, 5, and 20 to 26 provide examples of two distal connection components 28 that are joined and secured together at the top of the tank 4 via a joining assembly 30, so as to retain each side of the tank 4 to a corresponding anchor base (not shown). Alternatively, a same elongated strap component can serve to surround the upper surface of the tank such that the connection component provided at each end of the elongated strap component can serve as a proximal connection component or as an intermediate connection component as defined herein.

Figure 20:
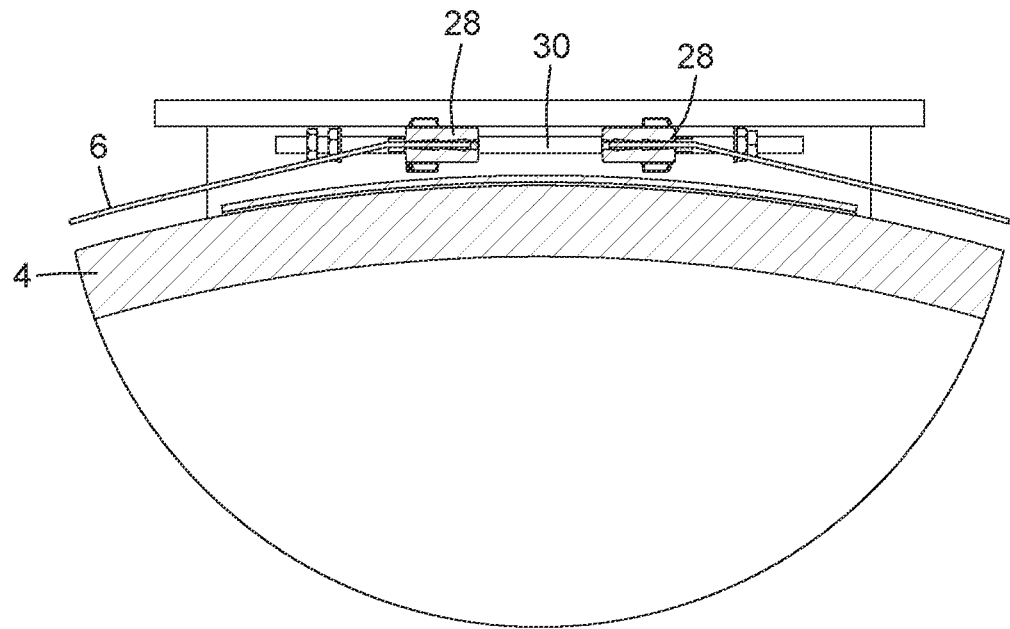
FIG. 20 is a zoomed view of portion K of FIG. 18.
Figure 21:
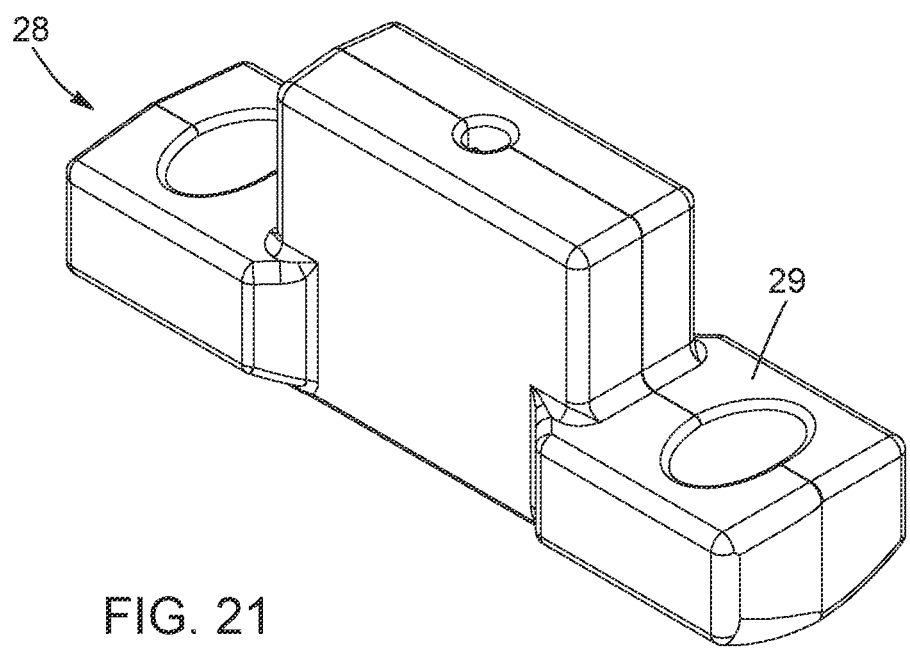
FIG. 21 is top perspective view of an implementation of a distal connection component of a strap of the anchor assembly.
Figure 22:
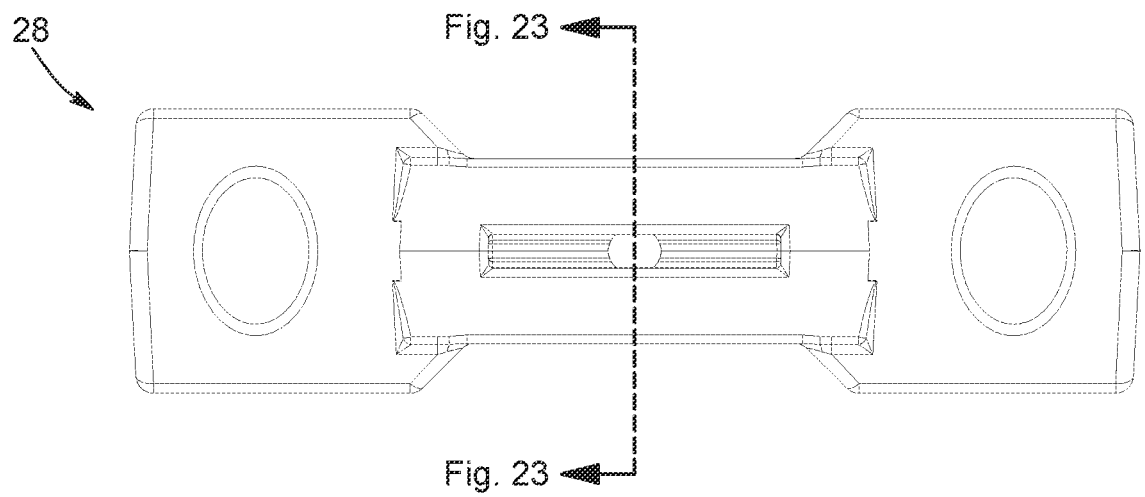
FIG. 22 is a bottom view of the distal connection component of FIG. 21.
Figure 23:
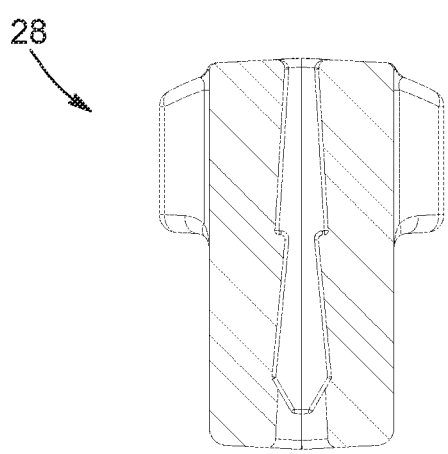
FIG. 23 is a cross-sectional view of the distal connection component of FIG. 22 along the dotted line.
Figure 24:
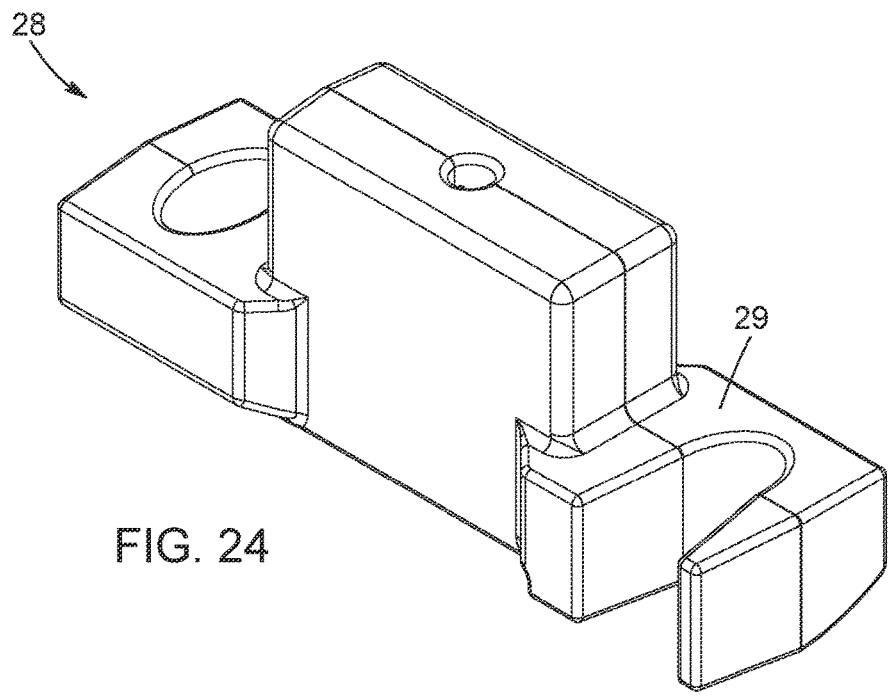
FIG. 24 is top perspective view of another implementation of a distal connection component of a strap of the anchor assembly.
Figure 25:
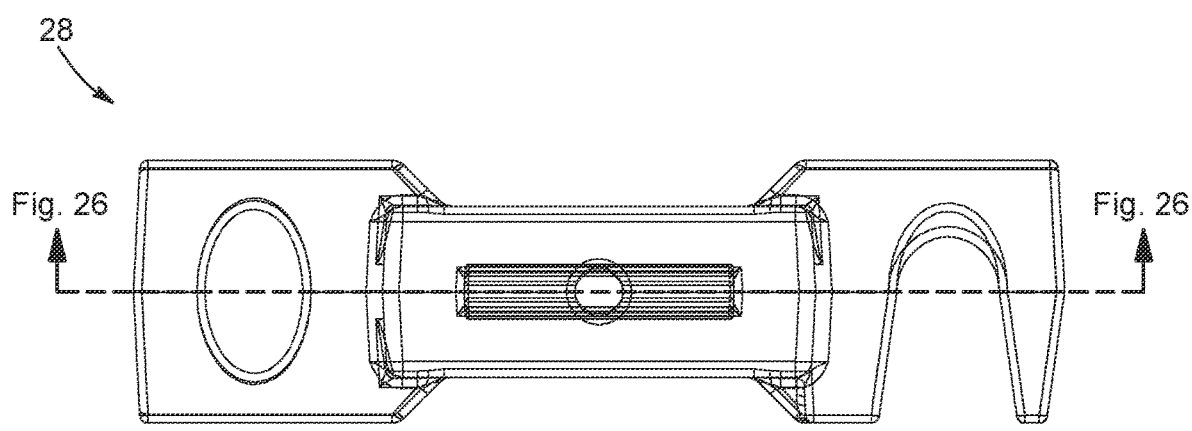
FIG. 25 is a top view of the distal connection component of FIG. 24.
Figure 26:
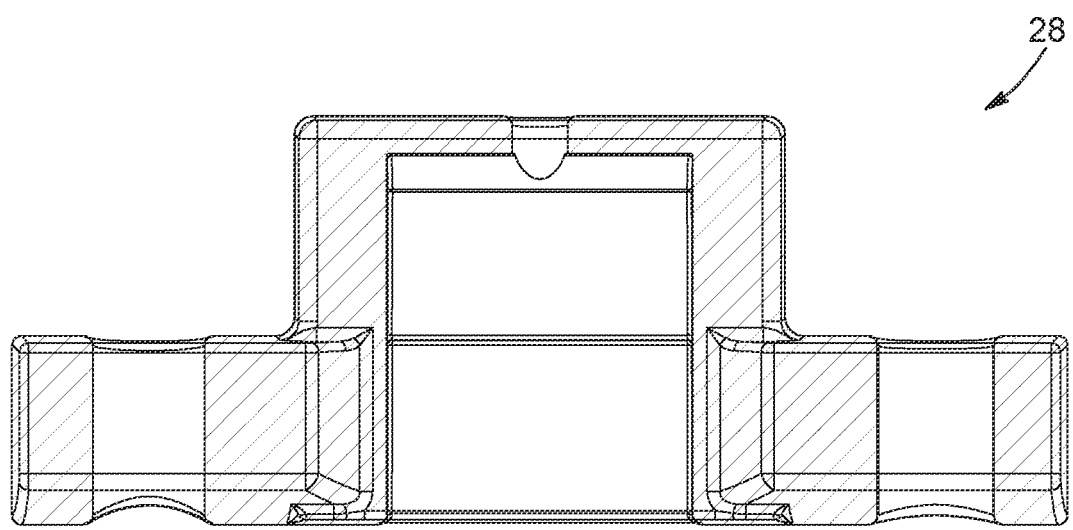
FIG. 26 is a cross-sectional view of the distal connection component of FIG. 25 along dotted line.

In some implementations, the distal connection component can be a hook, such as a D-shaped hook or a C-shaped hook. In other implementations, the distal connection component can be similar to the main portion of the proximal connection component. In another example, referring to FIGS. 21 and 24, the distal connection component can include two opposed outwardly extending protrusions 29 that can be configured similarly as seen in FIG. 21 or differently as seen in FIG. 24. Each protrusion 29 is shaped to define a channel that can be closed (FIG. 21) or open (FIG. 24, and that can receive a bolt or an elongated element of the joining assembly 30, as seen in FIG. 20. Various designs of joining assemblies are encompassed herein as long as the joining assembly can securely join two distal connection components of facing anchor assemblies provided along opposed side of the tank.

Advantageously, the use of the presently described proximal connection component implementations in combination with the anchor base described herein avoids the use of typical additional strap components, such as turnbuckles. However, the present anchor assembly design still allows the use of turnbuckles according to the needs of the operator.

Retention Mechanism

The anchor assembly described herein further includes at least one retention mechanism that is provided for each strap assembly that is needed to secure the tank below ground level. The retention mechanism is designed to retain the proximal connection component of the strap assembly within the slot of the anchor base.

FIGS. 37 to 60, 63 to 74, 79 to 81 and 85 to 98 show various implementations of the retention mechanism alone or in combination with the proximal connection component of the strap assembly. The retention mechanism includes a transverse component that is positionable in the transverse direction of the anchor base in abutment with a lower surface of the anchor base and generally under the slot.

Figure 13:
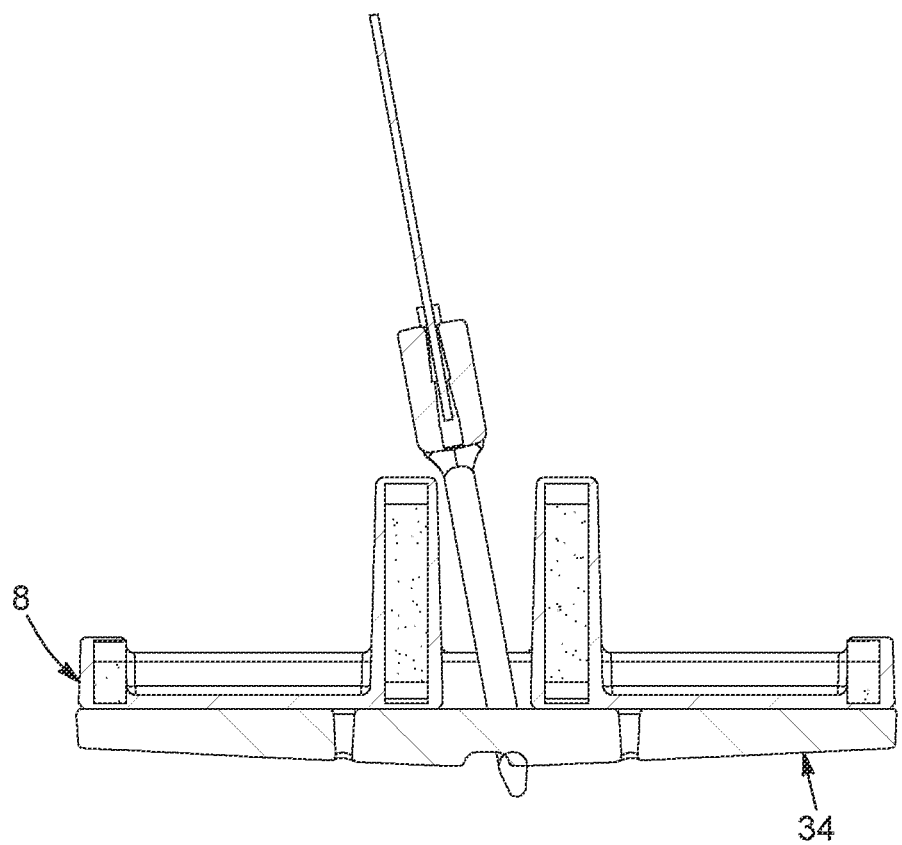
FIG. 13 is a zoomed view of portion J of FIG. 12.

Referring to FIG. 11, the transverse component 34 of the retention mechanism 32 is shown abutting a lower surface of the anchor base 8 and inserted in the hooking portion of the connection component 10, such that the hooking portion of the proximal connection component 10 is retained within the slot 14. In the implementation of FIG. 11 or 13, the transverse component 34 is sized according to a width of the anchor base 8 such that the transverse component 34 does not extend beyond side edges of the anchor base 8. In other implementations, the transverse component can be sized to extend beyond a width of the anchor base. In further implementations, the transverse component can be made shorter than a width of the anchor base as long as it can be prevented from sliding into the slot of the anchor base.

In some implementations, the transverse component of the retention mechanism can be secured to the proximal connection component of the strap but is movable along the lower surface of the anchor base. The strap can thus be displaced along and within the slot of the anchor base to allow for adjustments in the positioning of the straps with respect to the anchor base during installation of the anchor assembly to the tank or other manutention operations.

Optionally, the transverse component can be made of a metallic material, a composite material (such as carbon fiber embedded in thermoset resin), a fiberglass-based material (such as pultruded fiberglass), a wood-based material (such as wood or plywood), a plastic-based material (such as a thermoplastic), although other materials could be used to make a transverse component able to sustain the force imposed by the stretched strap. When a metallic material is used, such as iron or steel, an appropriate anti-rusting protection could be used, as found in stainless steel or hot dip galvanized steel or cast iron.

Figure 40:
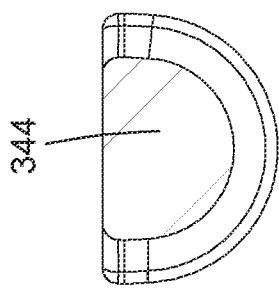
FIG. 40 is a cross-sectional view of the transverse component of FIG. 39 along line CC.
Figure 41:
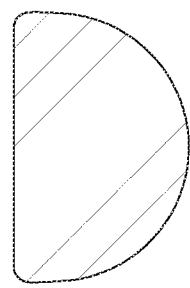
FIG. 41 is a cross-sectional view of the transverse component of FIG. 39 along line DD.
Figure 42:
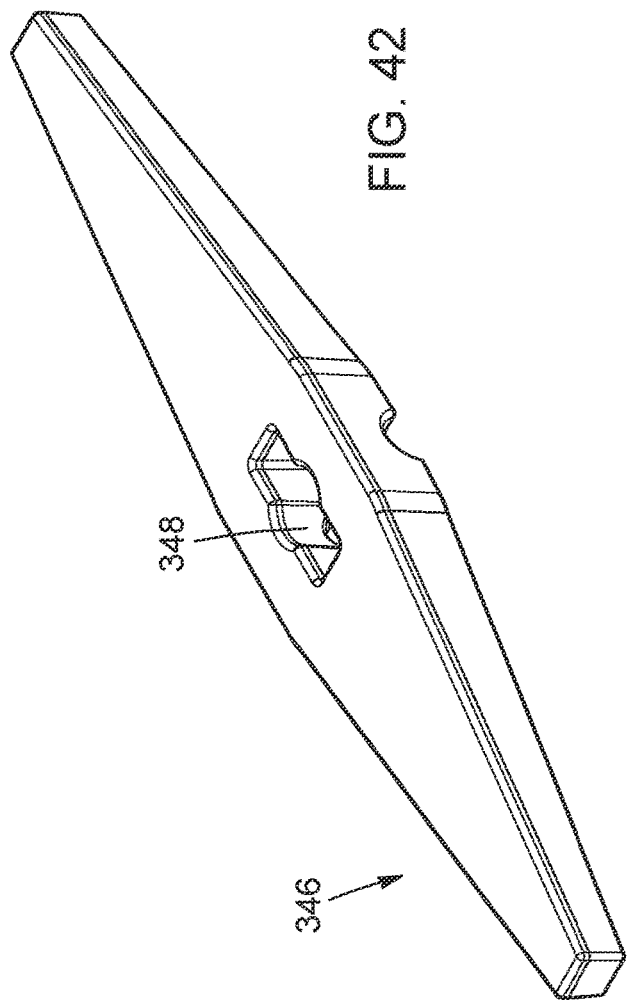
FIG. 42 is a top perspective view of another transverse component of a retention mechanism of the anchor assembly.
Figure 43:
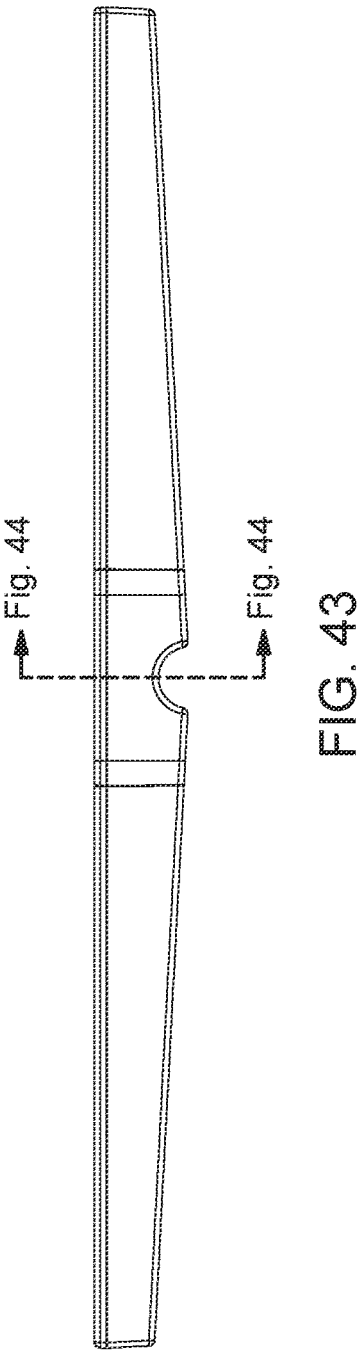
FIG. 43 is a side view of the transverse component of FIG. 42.
Figure 44:
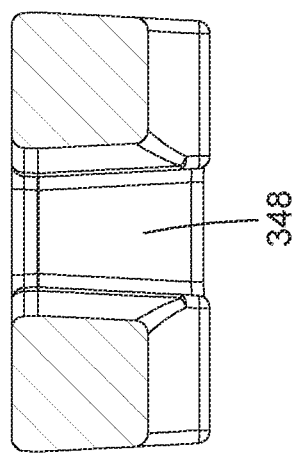
FIG. 44 is a cross-sectional view of the transverse component of FIG. 43 along line BB.

In the implementation illustrated in FIGS. 37 to 41, the transverse component 34 is a transverse pin 340. The transverse pin 340 can be tapered at each end 342 thereof, having a flat top surface for abutment with the lower surface of the anchor base (not shown) and having a beveled lower surface. Referring to FIGS. 38 and 40, the transverse pin 340 further includes a narrowing central portion 344 defining a groove that is adapted to retain the hooking portion of the proximal connection component. FIGS. 48 to 51 show a transverse pin 340 inserted into the hooking portion 26 of the proximal connection component 10, with the proximal connection component 10 being nested within the groove defined by the narrowing portion 344 of the pin 340. One can see from the comparison of FIG. 48 and FIG. 49 that a length of the narrowing portion 344 of the pin 340 can vary such that the proximal connection component 10 can slide along the narrowing portion 344 (FIG. 48) or be maintained snug within the groove defined by the narrowing portion 344 (FIG. 49).

Figure 45:
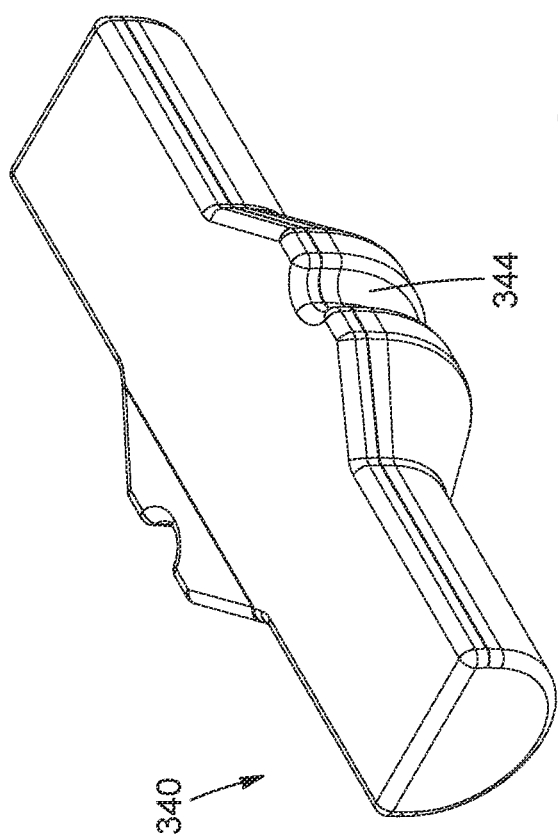
FIG. 45 is a top perspective view of another transverse component of a retention mechanism of the anchor assembly.

As seen in FIGS. 45 to 47, the transverse pin 340 can be designed differently as long as the transverse pin 340 includes a narrowing portion 344 defining a groove where the hooking portion of the proximal connection component can be nested. As mentioned above, the grooved pin as illustrated in FIG. 38 or 45 is designed to cooperate with a proximal connection component having a hooking portion defining a loop (such as a D-shaped hook or C-shaped hook).

In the implementations shown in FIGS. 42 to 44 and 52 to 60, the transverse component 34 can be a slotted pin 346 being designed to cooperate with the proximal connection component having a pin hook design, as illustrated in FIGS. 61, 75 and 82 for example. More specifically, the slotted pin 346 can include a secondary slot 348 defined in a central portion 350 of the slotted pin 346. One can see from the comparison of FIG. 42 and FIG. 52 that the general shape of the slotted pin 346 can vary. It is generally noted that the central portion 350 of the slotted pin 346 can be made wider than end portions 352 thereof to allow the presence of the secondary slot 348. One can also see from the comparison of FIGS. 52 and 55 that the shape and size of the secondary slot 348 itself can vary.

Figure 65:
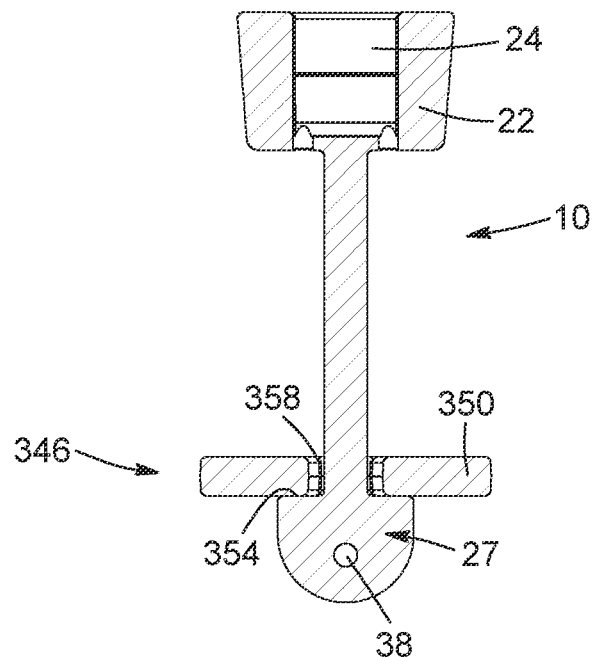
FIG. 65 is a cross-sectional view of the transverse component of FIG. 64 along dotted line.

Referring to FIG. 65, the size of the slot 348 can indeed be made complementary to the design of the distal end 27 of the hooking portion 26 of the pin hook 10 that is inserted in the slot 348. The distal end 27 is insertable into the slotted pin 346 upon alignment of the distal end 27 with the slot 348 via rotation of the slotted pin 346. Once the distal end 27 of the hooking portion 26 has gone through the slot 348, the slotted pin 346 is further rotated such that the distal end 27 abuts at least a portion of a lower surface 354 of the slotted pin 346.

Figure 63:
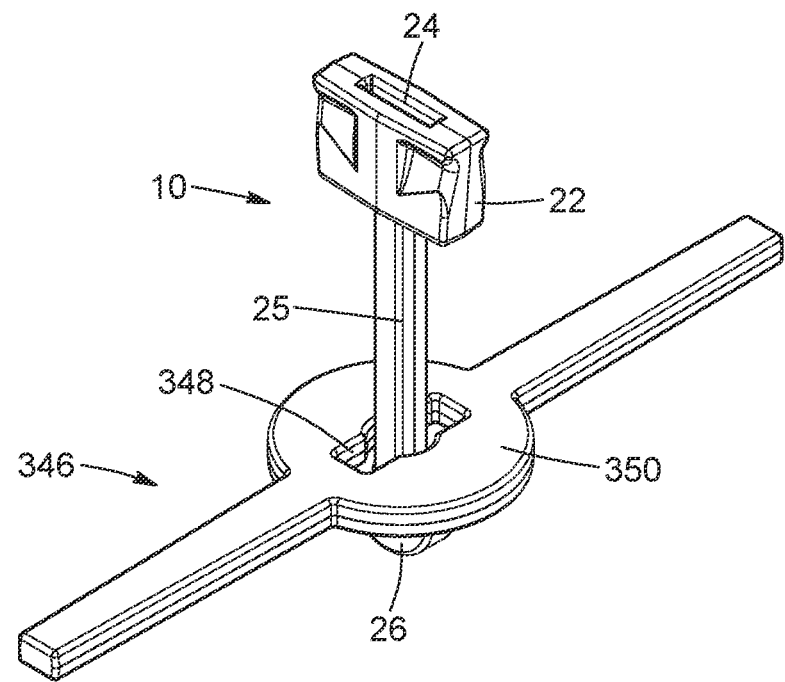
FIG. 63 is a top perspective view of the connection component of FIG. 61 inserted into a slotted pin of the anchor assembly.
Figure 64:
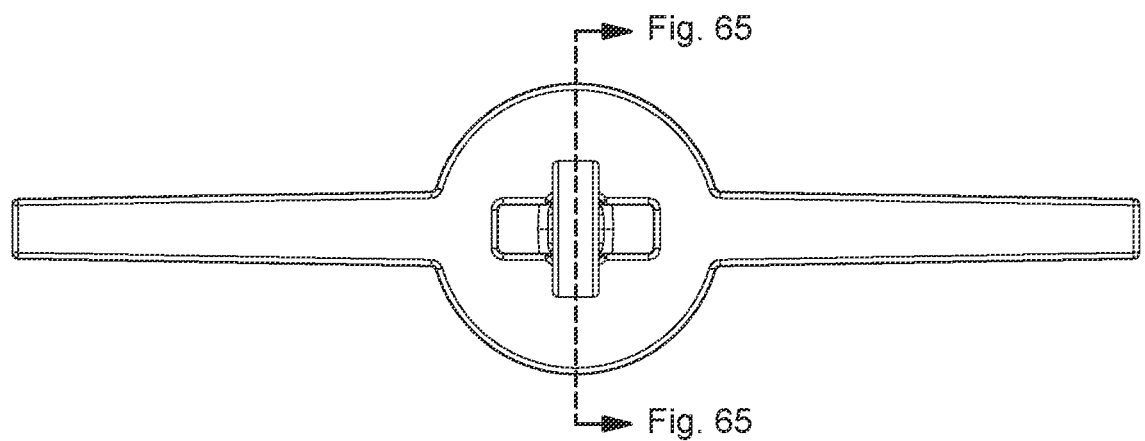
FIG. 64 is a bottom view of the construction of FIG. 63.
Figure 68:
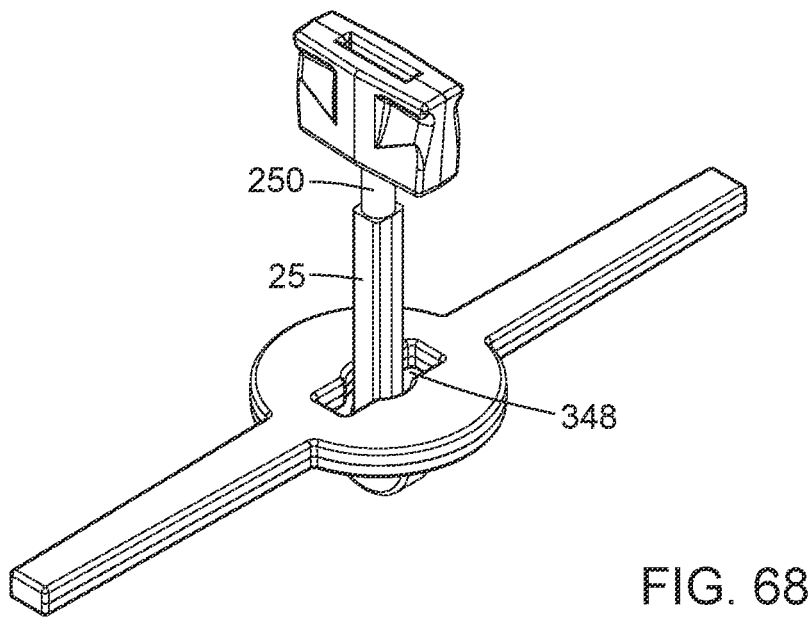
FIG. 68 is a top perspective view of another implementation of a pin hook inserted into a slotted pin of the anchor assembly.

It should be noted that the shape of the slot 348 of the slotted pin 346 should allow rotation of the slotted pin 346 with respect to the central portion 25 of the pin hook 10. For example, as seen in FIG. 63, as the central portion 25 of the pin hook 10 has a rectangular cross-section, the slot 348 includes a circular aperture to allow rotation of the slotted pin 346 with respect to the central portion 25 of the pin hook 10. Alternatively, the shape of the cross-section of at least a portion of the central portion 25 of the pin hook 10 should allow rotation of the slotted pin 346 with respect to the central portion 25 of the pin hook 10. For example, as seen in FIG. 68, the central portion 25 of the pin hook 10 includes a portion 250 having a narrower and circular section to ease rotation of the slotted pin 346 with respect to the portion 250 of the pin hook 10.

Figure 91:
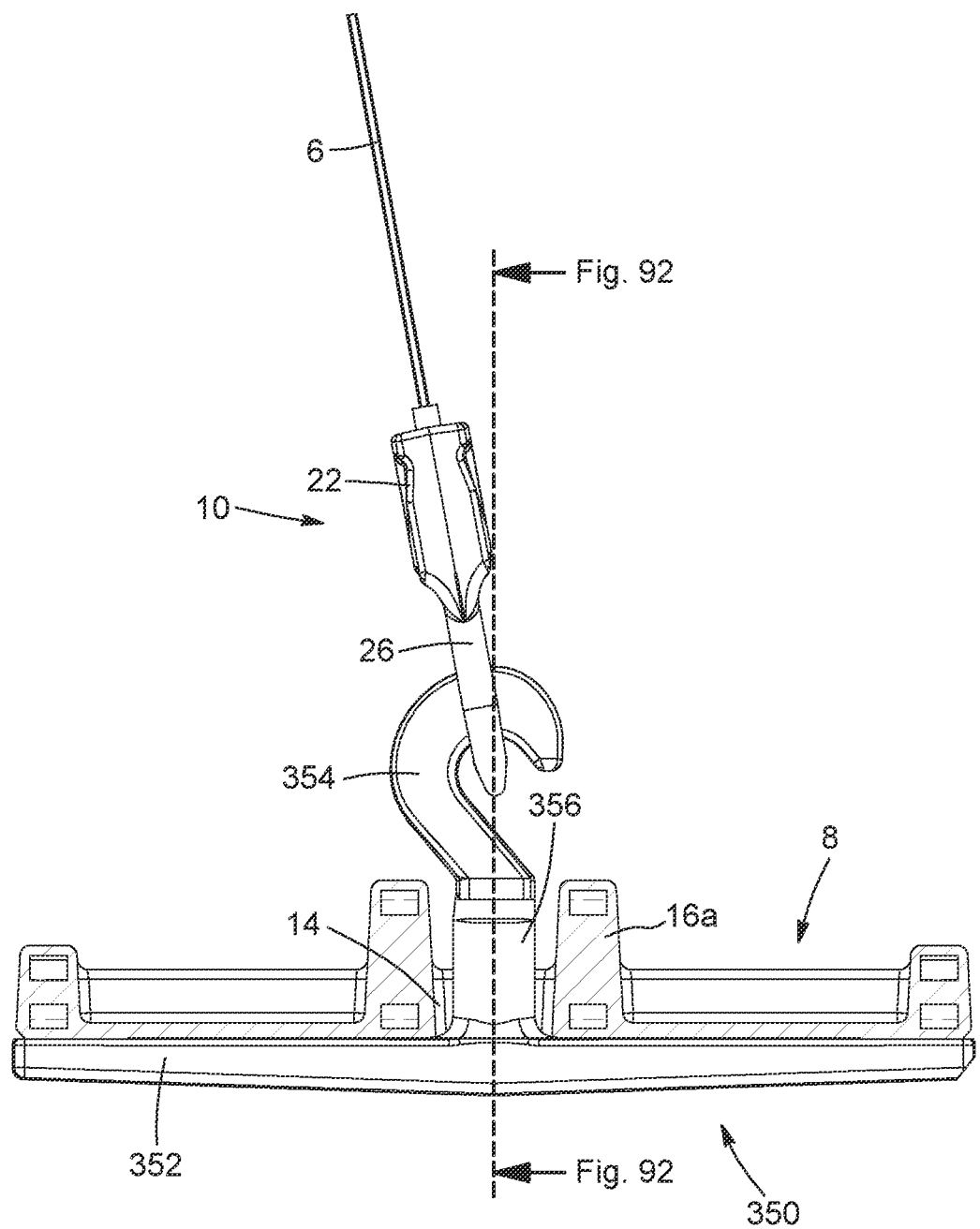
FIG. 91 is a cross-sectional view of portion A of FIG. 90.
Figure 92:
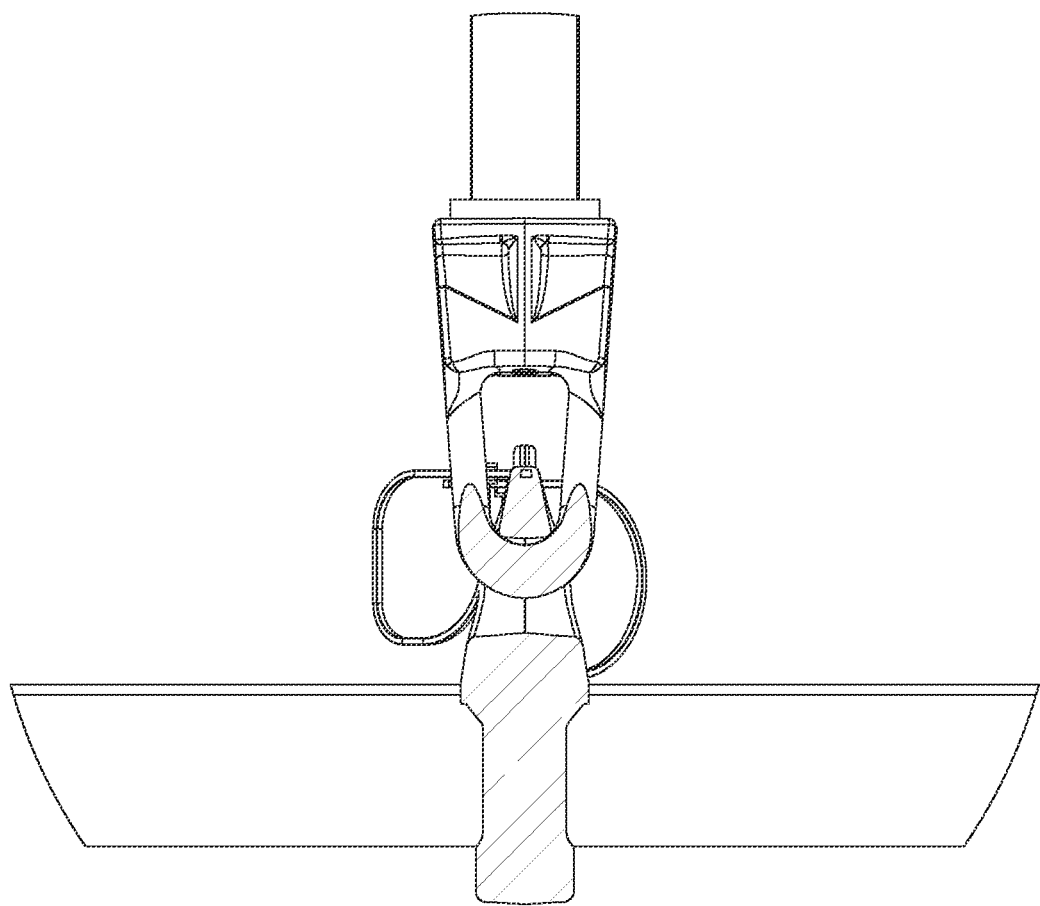
FIG. 92 is a cross-sectional view along line FF of FIG. 91.
Figure 93:
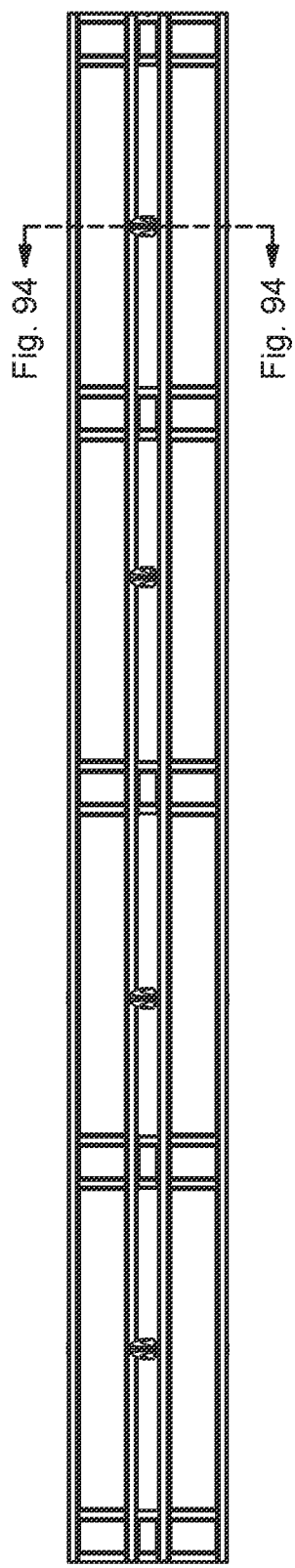
FIG. 93 is a top view of the anchor assembly of FIG. 89.
Figure 94:
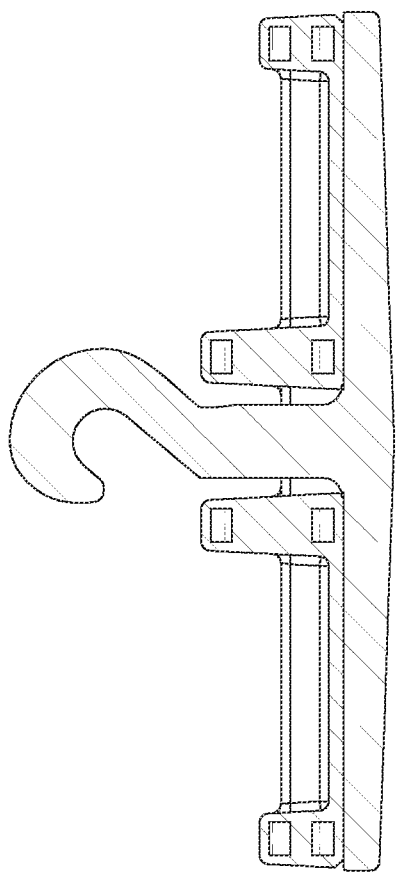
FIG. 94 is a cross-sectional view along line CC of FIG. 93.
Figure 95:
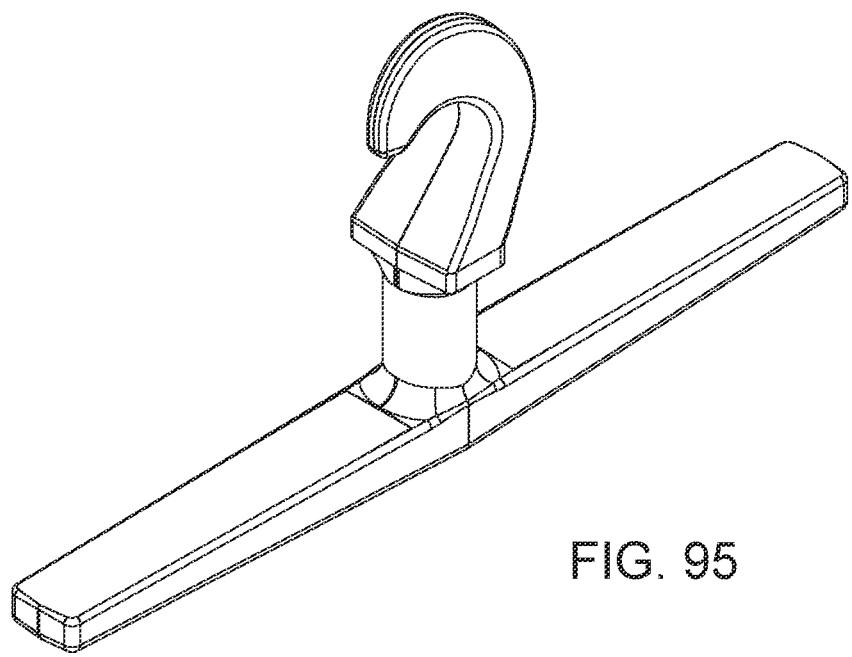
FIG. 95 is a top perspective view of another implementation of a transverse component including a C-hook member.
Figure 96:
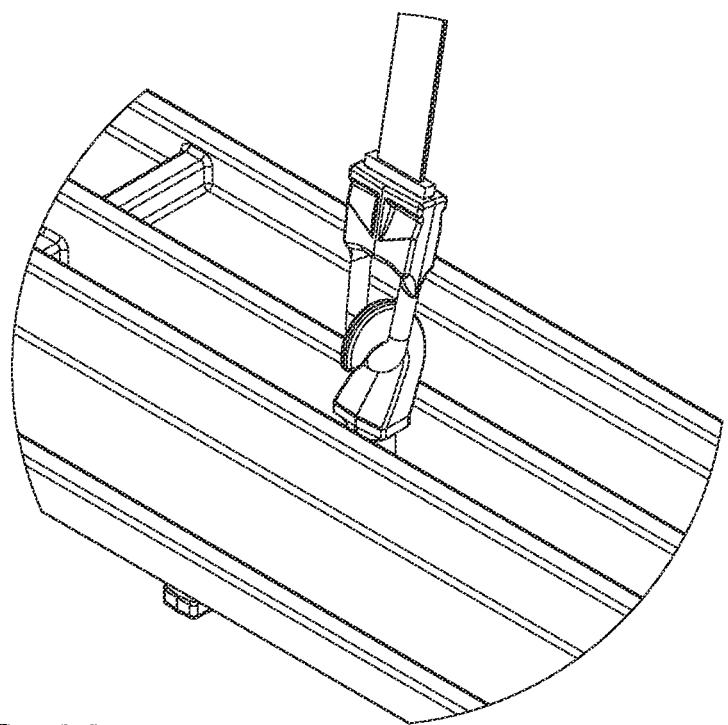
FIG. 96 is a top perspective view of the transverse component of FIG. 95 inserted within a hooking portion of a D-shaped hook.

In the implementations shown in FIGS. 89 to 98, the retention mechanism 350 can further include a C-hook portion 354 that protrudes above a top surface of the anchor base 8 and readily available for hooking the proximal connection component of a strap assembly. Referring to FIG. 91, the transverse component 352 is positionable in the transverse direction of the anchor base 8 and generally below the slot 14 of the anchor base 8, and the C-hook portion 354 extends upwardly from a central region of the transverse component 352. The retention mechanism 350 can be rotated with respect to the anchor base 8 such that the C-hook portion 354 can be inserted into the slot 14. The C-hook portion 354 is thereby positioned within the slot 14 with a distal end of the C-hook portion 354 being accessible to engage the hooking portion 26 of the proximal connection component 10 of the strap. The C-hook portion 354 can include an elongated neck 356 being sized according to a height of the anchor base 8 (e.g., of the longitudinal walls 16*a*), so as to put a C-hook region of the C-hook portion 354 generally above the slot 14. It should be noted that the C-hook portion 354 can be welded, screwed and/or glued to the transverse component 352. Alternatively, the C-hook portion 354 and the transverse component 352 can be integrally made as a one-piece structure.

Figure 97:
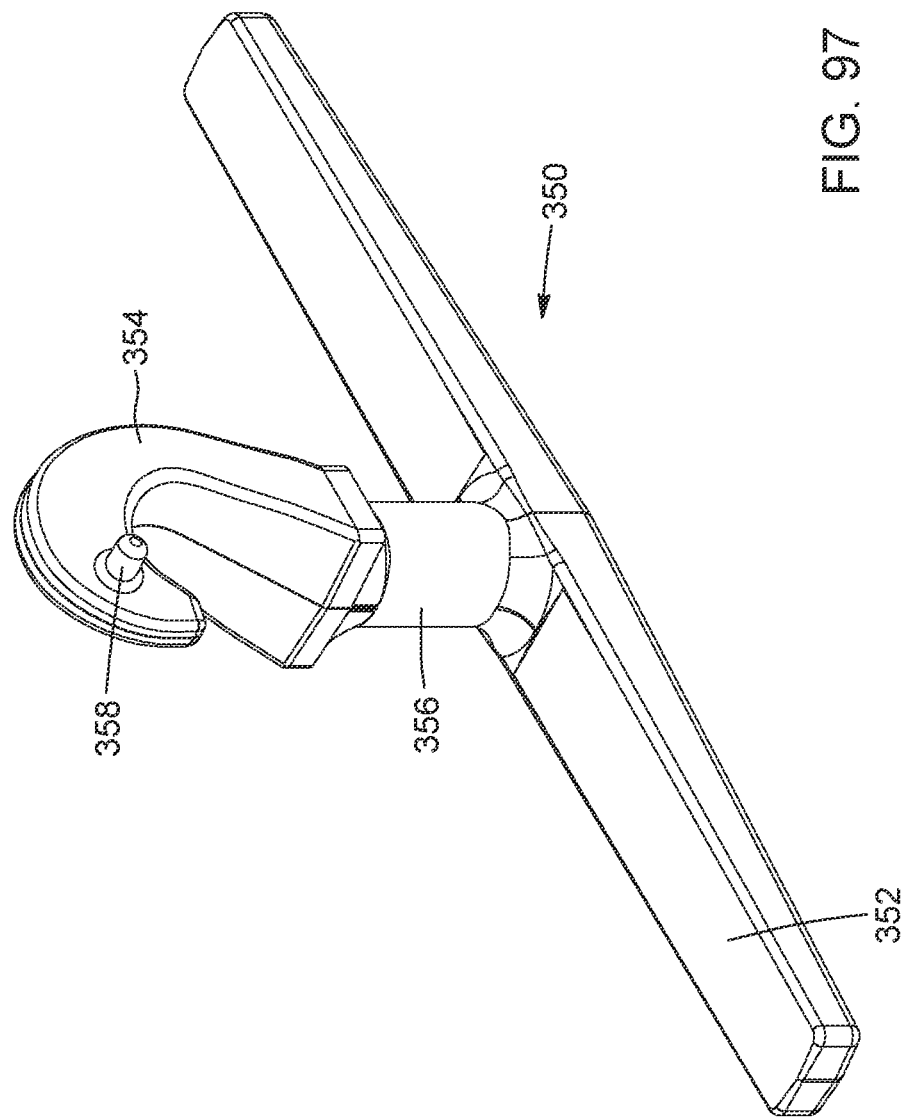
FIG. 97 is a top perspective view of another implementation of a transverse component including a C-hook member and an abutment pin.
Figure 98:
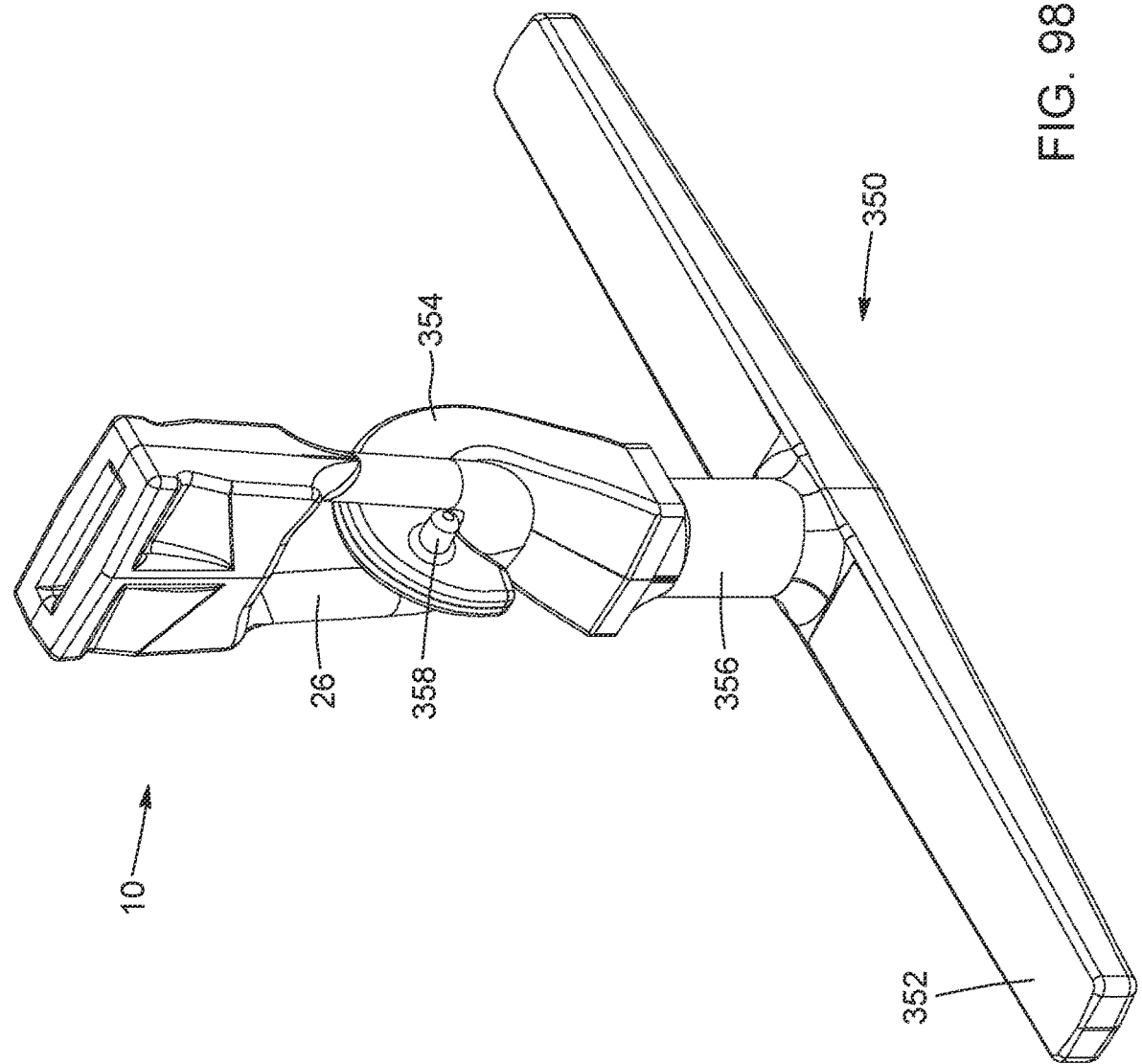
FIG. 98 is a top perspective view of the transverse component of FIG. 97 inserted within a hooking portion of a D-shaped hook.

In the implementation illustrated in FIGS. 97 and 98, the retention mechanism can further include an abutment pin 358 protruding outwardly from at least one side of the C-hook portion 354 of the retention mechanism 350. Referring to FIG. 98, the abutment pin 358 can retain the hooking portion 26 of the proximal connection component 10 of the strap within the loop defined by the C-hook portion 354. The proximal connection component 10 can be retained at a specific angle to ensure that the strap under stretching will not rupture the C-hook portion 354.

In another implementation which is not illustrated in the Figures, the retention mechanism can include a D-hook component including a D-hook portion extending upwardly from a central region of the transverse component. The hooking portion of the proximal connection component can be adapted to be retained to the D-hook portion of the retention mechanism.

The retention mechanism can further include at least one additional locking component that further prevents the proximal connection component of the strap from being released from the retention mechanism when the proximal connection component is anchored to the anchor base. Indeed, while the proximal connection component of the strap can easily be maintained engaged with the transverse component when the elongated strap component is in tension over the tank, difficulties can arise when the elongated strap component becomes loose during installation or maintenance. Thus, the locking component of the retention mechanism ensures that the proximal connection component remains locked to the transverse component in all situations. In some implementations, one or more locking component(s) of same or different type can be used. Various implementations of the possible locking component(s) are illustrated in FIGS. 50, 66, 72, 79, 87 and 99.

Figure 50:
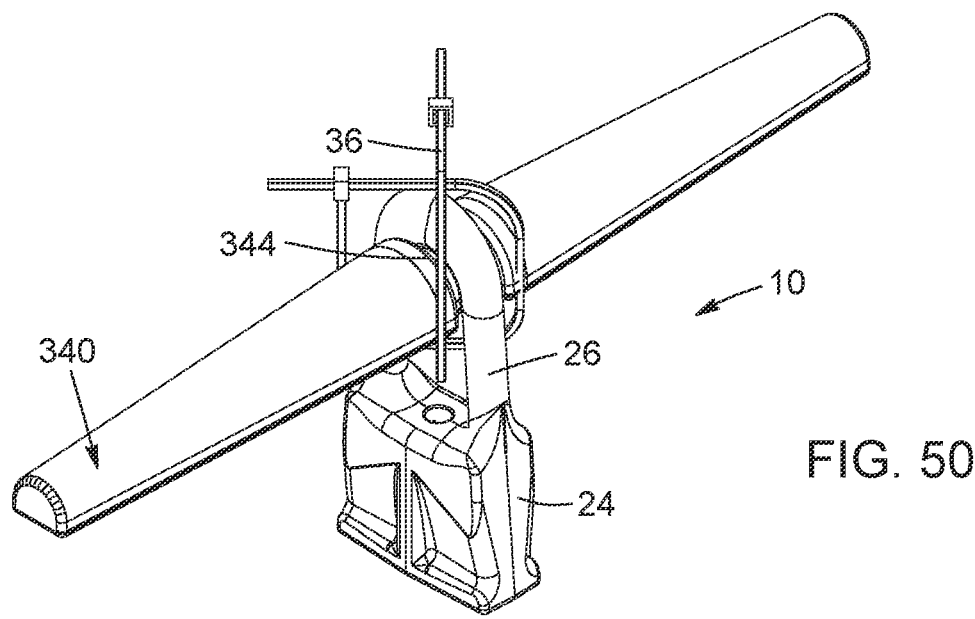
FIG. 50 is a top perspective view of another implementation of a transverse component inserted into short D-shaped hooking portion of a connection component of the anchor assembly.
Figure 51:
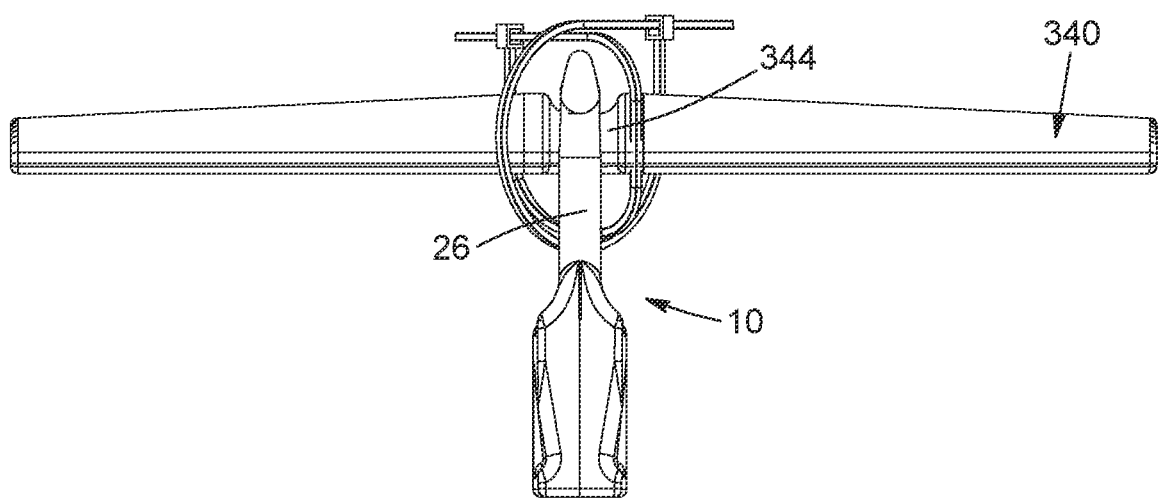
FIG. 51 is a side view of the construction of FIG. 50.
Figure 52:
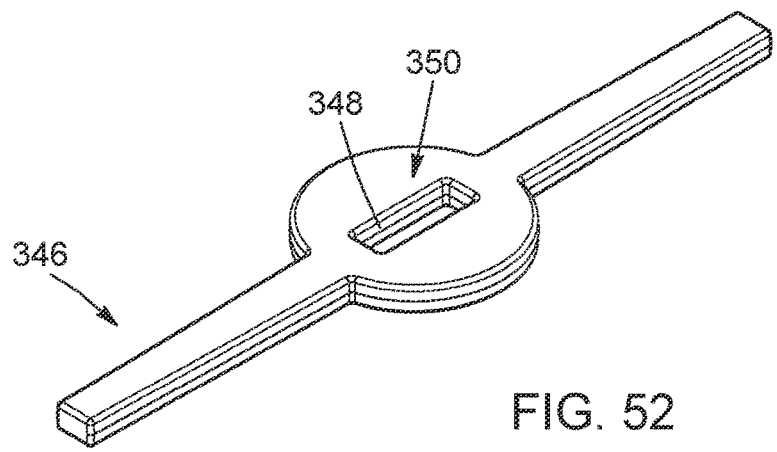
FIG. 52 is a top perspective view of another transverse component of a retention mechanism of the anchor assembly.
Figure 53:
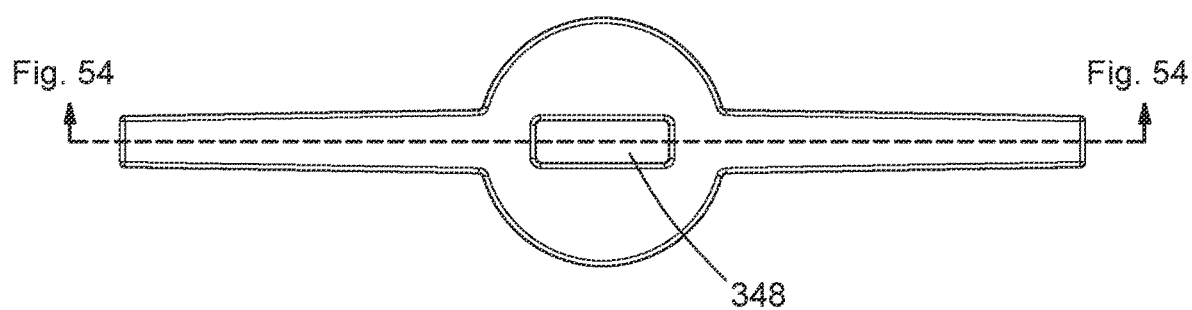
FIG. 53 is a bottom view of the transverse component of FIG. 52.
Figure 54:
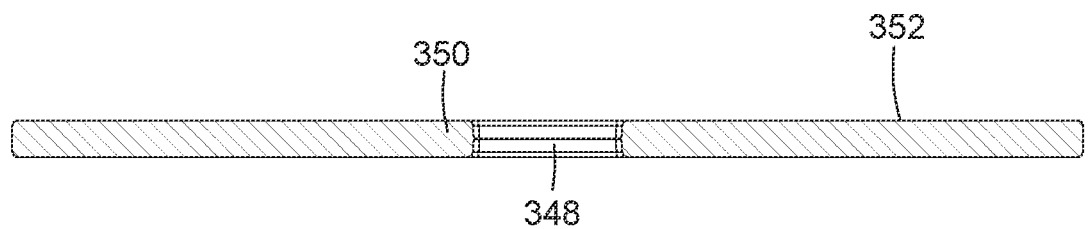
FIG. 54 is a cross-sectional view of the transverse component of FIG. 53 along line AA.
Figure 55:
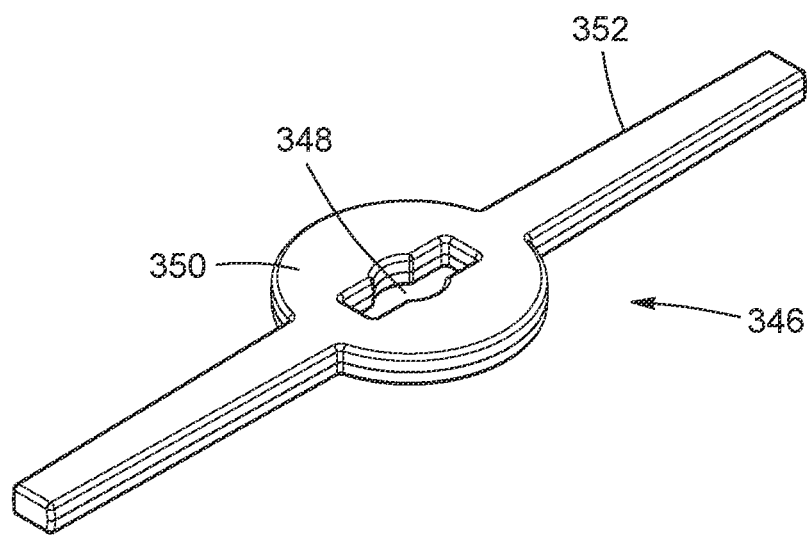
FIG. 55 is a top perspective view of another transverse component of a retention mechanism of the anchor assembly.
Figure 58:
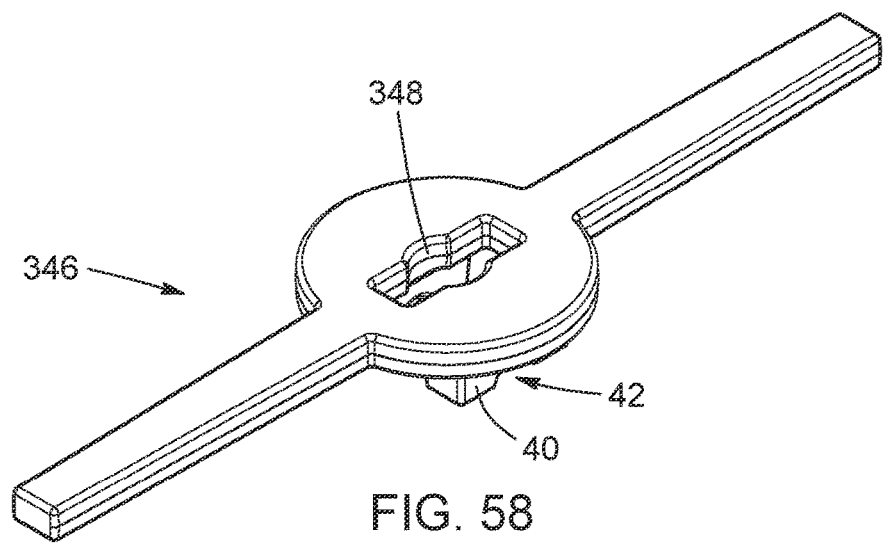
FIG. 58 is a top perspective view of another transverse component of a retention mechanism of the anchor assembly.
Figure 59:
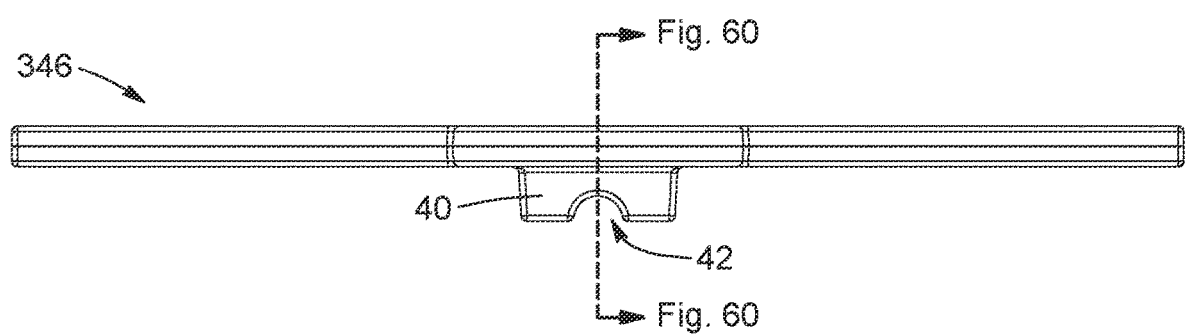
FIG. 59 is a side view of the transverse component of FIG. 58.
Figure 60:
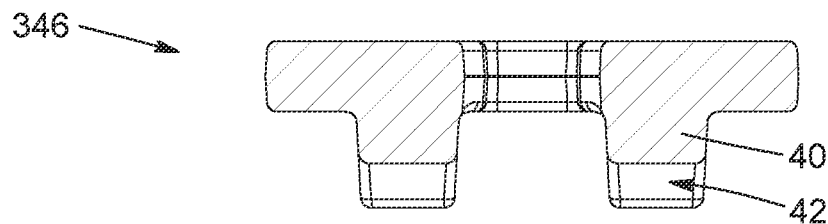
FIG. 60 is a cross-sectional view of the transverse component of FIG. 59 along line BB.
Figure 66:
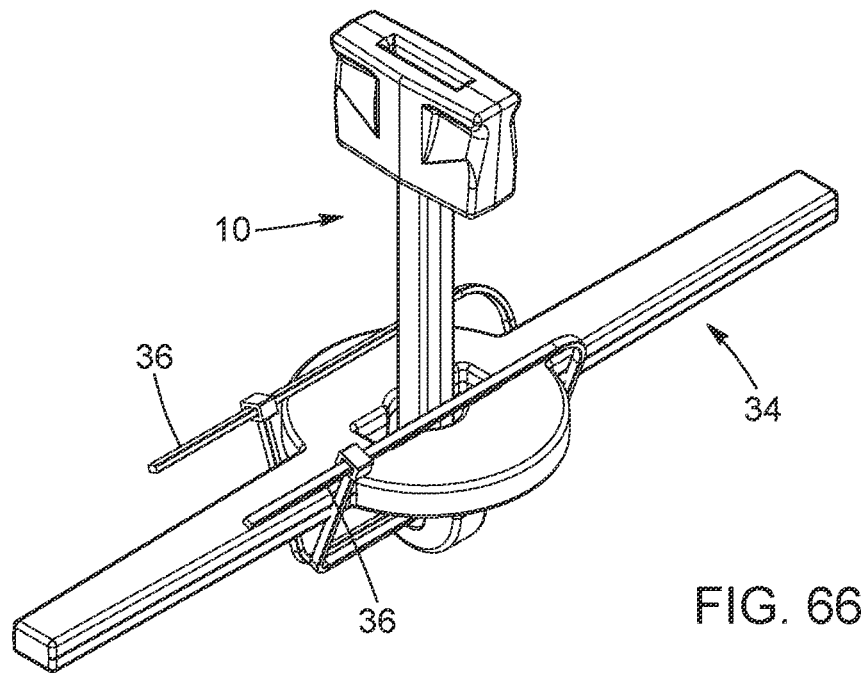
FIG. 66 is a top perspective view of a pin hook inserted into a slotted pin of the anchor assembly and further secured therein by a pair of tie wraps.
Figure 67:
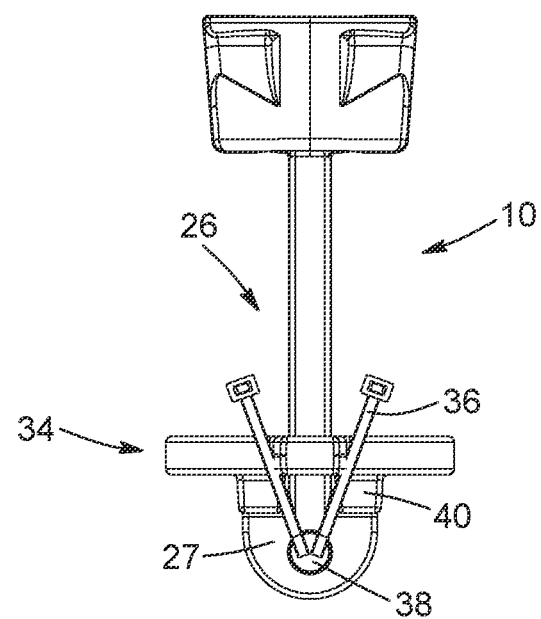
FIG. 67 is a side view of the construction of FIG. 66.

In the implementation illustrated in FIGS. 50, 66 and 67, the locking component can be at least one elongated fastener 36, such as tie wrap a rope, a cable, that is attached to a side of the proximal connection component 10. To that effect and as seen in FIG. 67, the distal end 27 of the hooking portion 26 of the proximal connection component 10 can include a channel 38 through which the elongated fastener 36 can be inserted to surround both hooking portion 26 and transverse component 34 when engaged, so as to lock the proximal connection component in place and prevent rotation of the transverse component 34.

Figure 69:
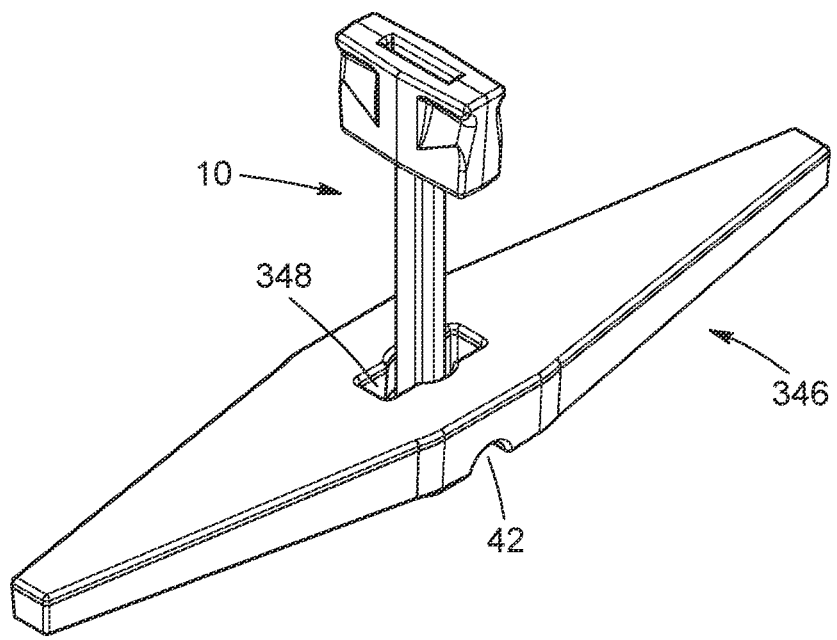
FIG. 69 is a top perspective view of another implementation of a pin hook inserted into a slotted pin of the anchor assembly.
Figure 70:
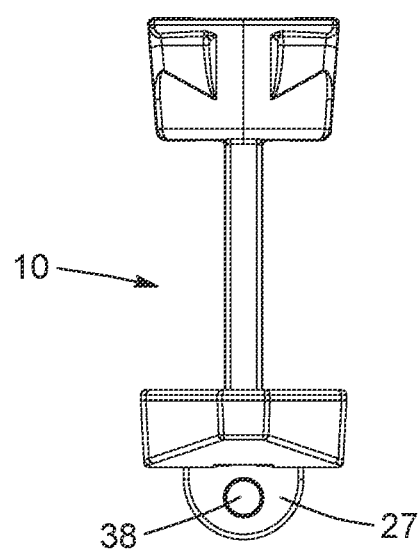
FIG. 70 is a side view of the construction of FIG. 69.
Figure 71:
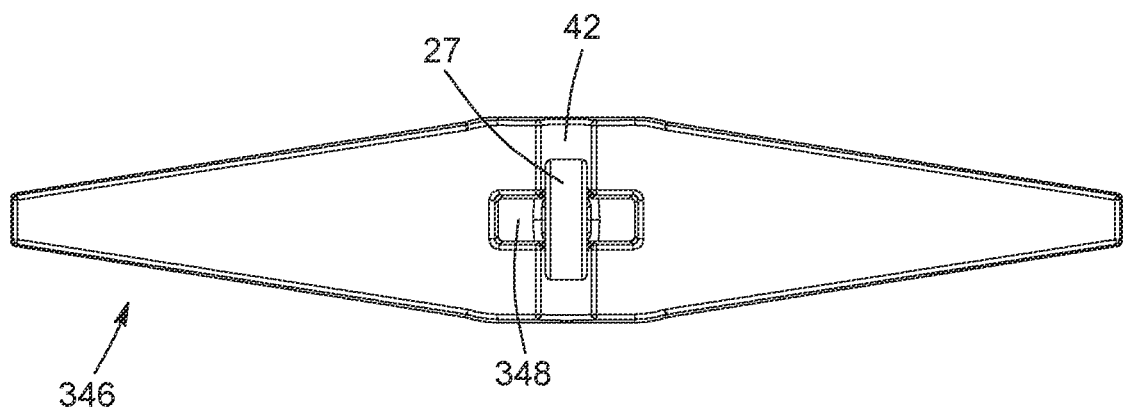
FIG. 71 is a bottom view of the construction of FIG. 69.
Figure 72:
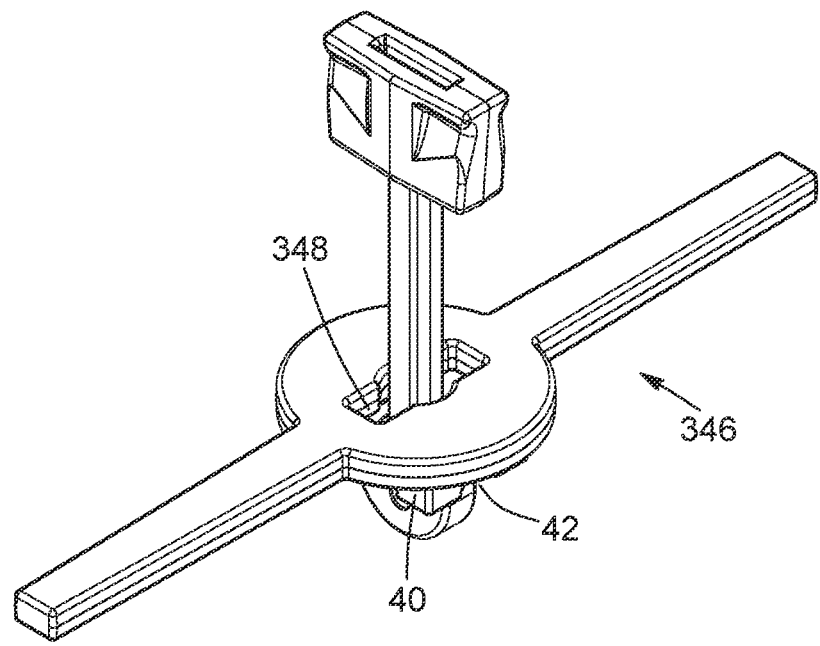
FIG. 72 is a top perspective view of another implementation of a pin hook inserted into a slotted pin of the anchor assembly, the slotted pin including a pair of locking protrusions.
Figure 73:
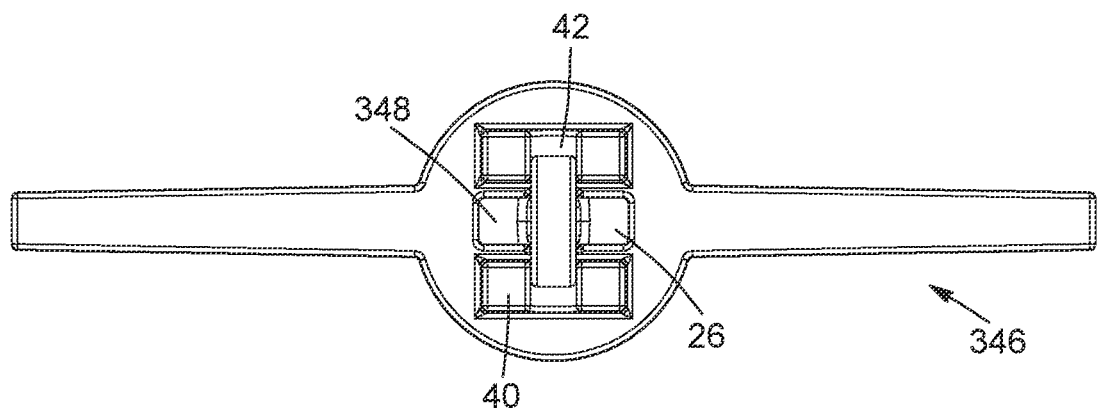
FIG. 73 is a bottom view of the construction of FIG. 72.
Figure 74:
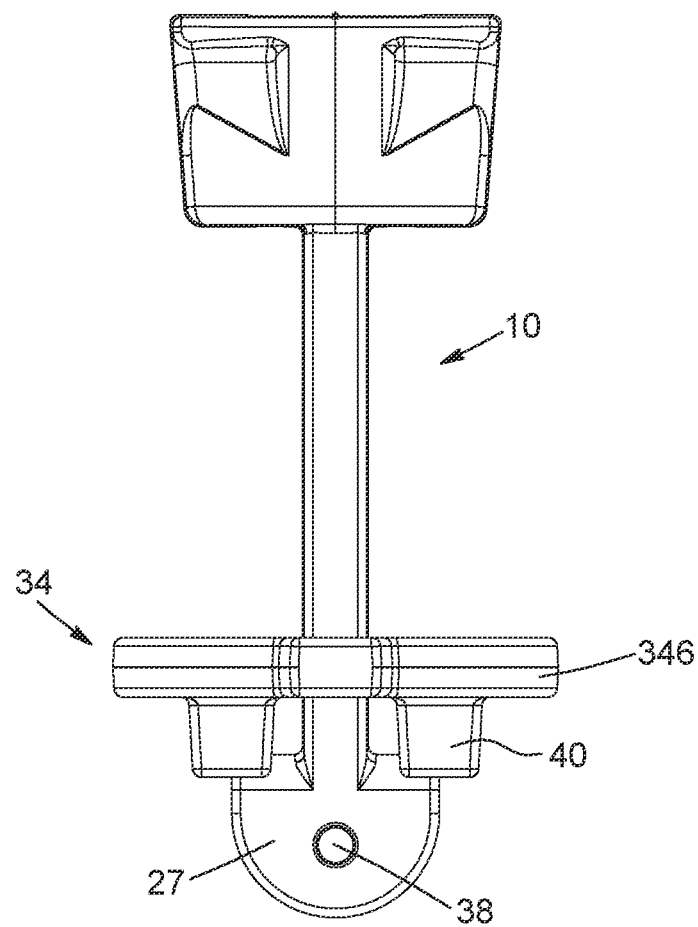
FIG. 74 is a side view of the construction of FIG. 72.

In another implementation illustrated in FIGS. 58 to 60 and 72 to 74, the locking component can be a pair of locking protrusions 40 extending downwardly from a lower surface of the transverse component (slotted pin) 346 at two opposed sides of the secondary slot 348. The locking protrusion 40 defines a recess 42 that can be used to maintain the hooking portion of the connection component and to prevent rotation of the slotted pin 346 with respect to the anchor base (that would lead to releasing the proximal connection component from the slot of the slotted pin and then the slot of the anchor base). It should be noted, as seen in FIGS. 69 and 71 that the lower surface of the slotted pin 346 itself can include the recess 42 into which the distal end 27 of the hooking portion 26 is received once inserted in the slot 348 of the slotted pin 346 to prevent the connection component 10 from being released upon rotation thereof. It should be noted that an additional locking component could be used in combination with the locking protrusions 40. For example, referring to FIG. 74, a rod (nor shown) could be inserted in the aperture 38 of the distal end 27 of the pin hook 10 to further ensure that the distal end 27 does not slide back into the slot of the slotted transverse component 346.

Figure 81:
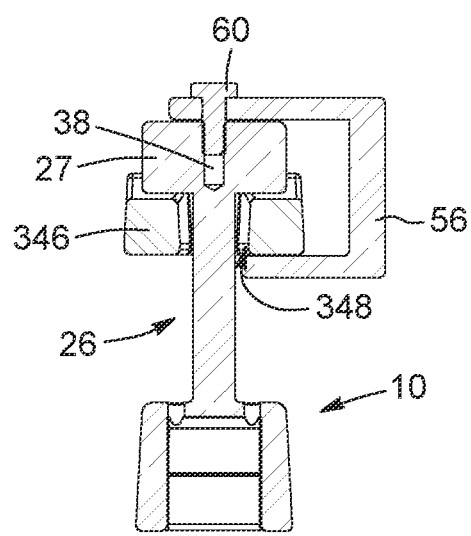
FIG. 81 is a cross-sectional view of the assembly of FIG. 80 along line EE.

In another implementation illustrated in FIGS. 78 to 81, the locking component can be a locking bracket 56 being shaped complementary to at least a portion of the distal end 27 of the proximal connection component (pin hook) 10 and the transverse component (slotted pin) 346. As better seen in FIG. 78, one end of the locking bracket 56 can have an aperture 58 so as to receive a fastener 60 that can be further secured in channel 38 of the distal end 27 of the pin hook 10 as shown in FIG. 81. The opposed end of the bracket can thereby be held abutted against a top surface of the slotted pin 346.

Figure 85:
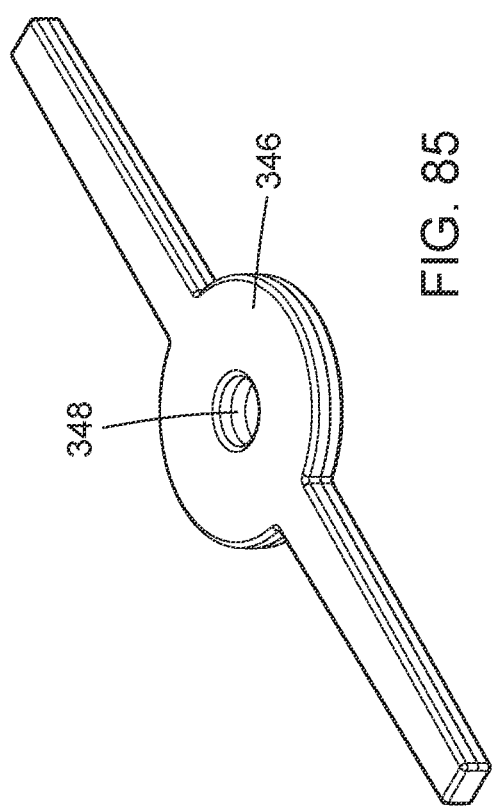
FIG. 85 is a top perspective view of another implementation of a transverse component of the anchor assembly.
Figure 86:
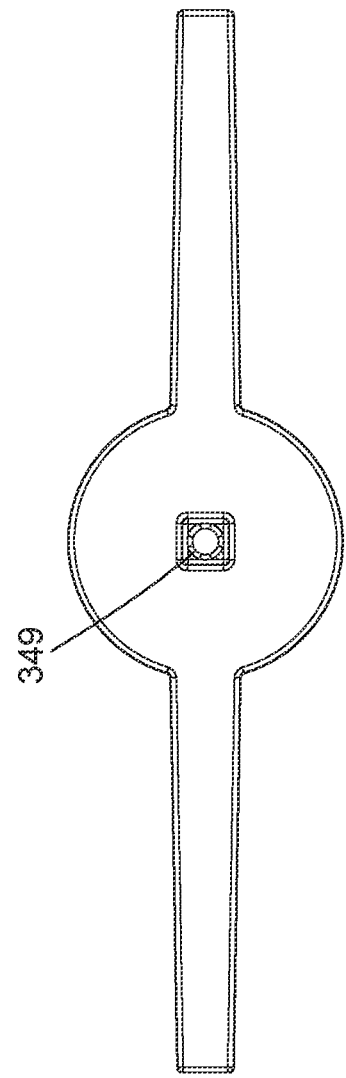
FIG. 86 is a bottom view of the transverse component of FIG. 85.
Figure 87:
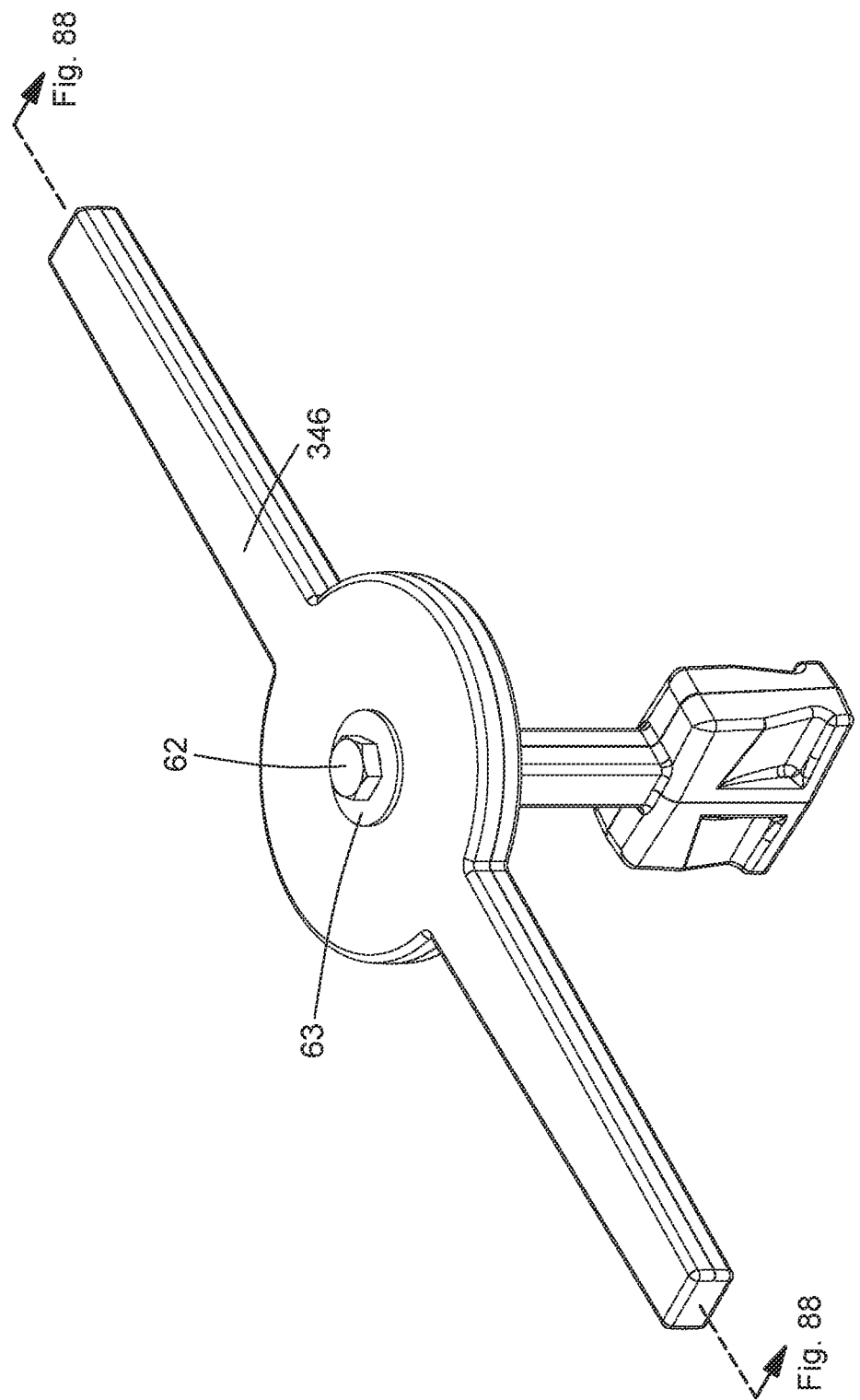
FIG. 87 is a bottom perspective view of the transverse component of FIG. 85 engaged with a pin hook of FIG. 82 according to an implementation of the anchor assembly.
Figure 88:
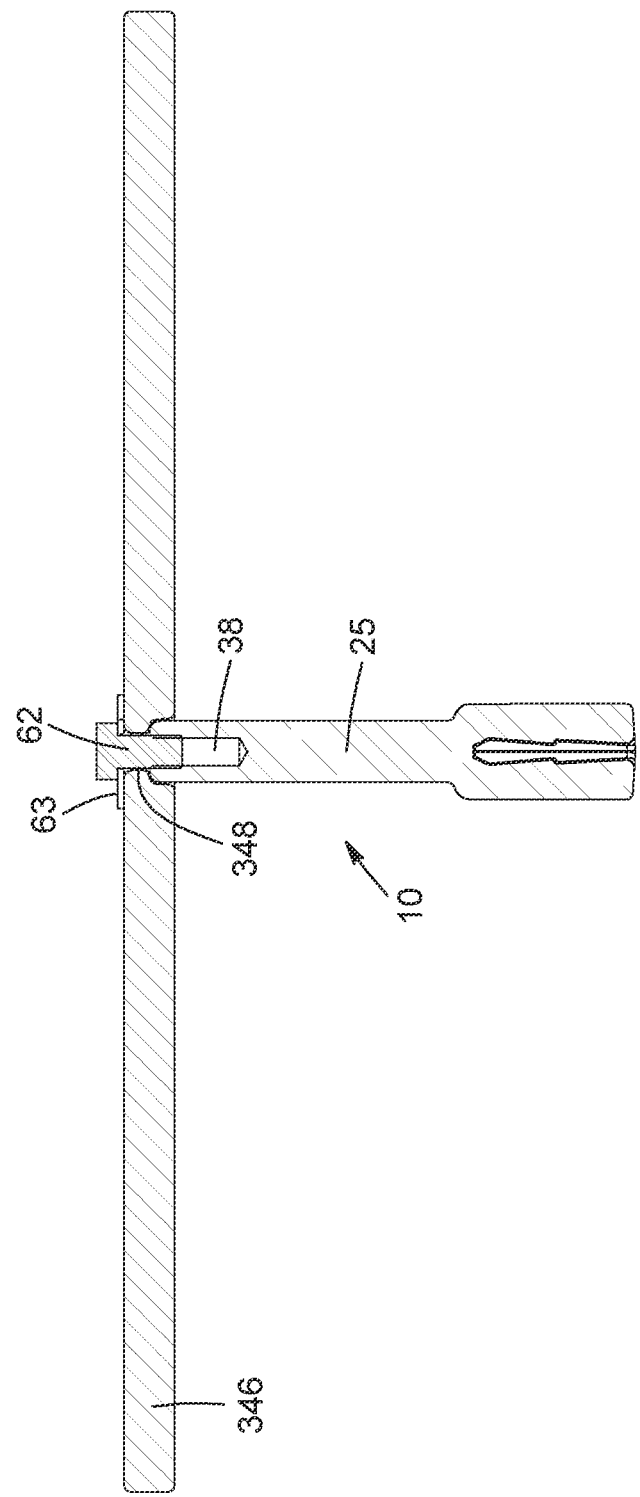
FIG. 88 is a cross-sectional view of the assembly of FIG. 87.
Figure 89:
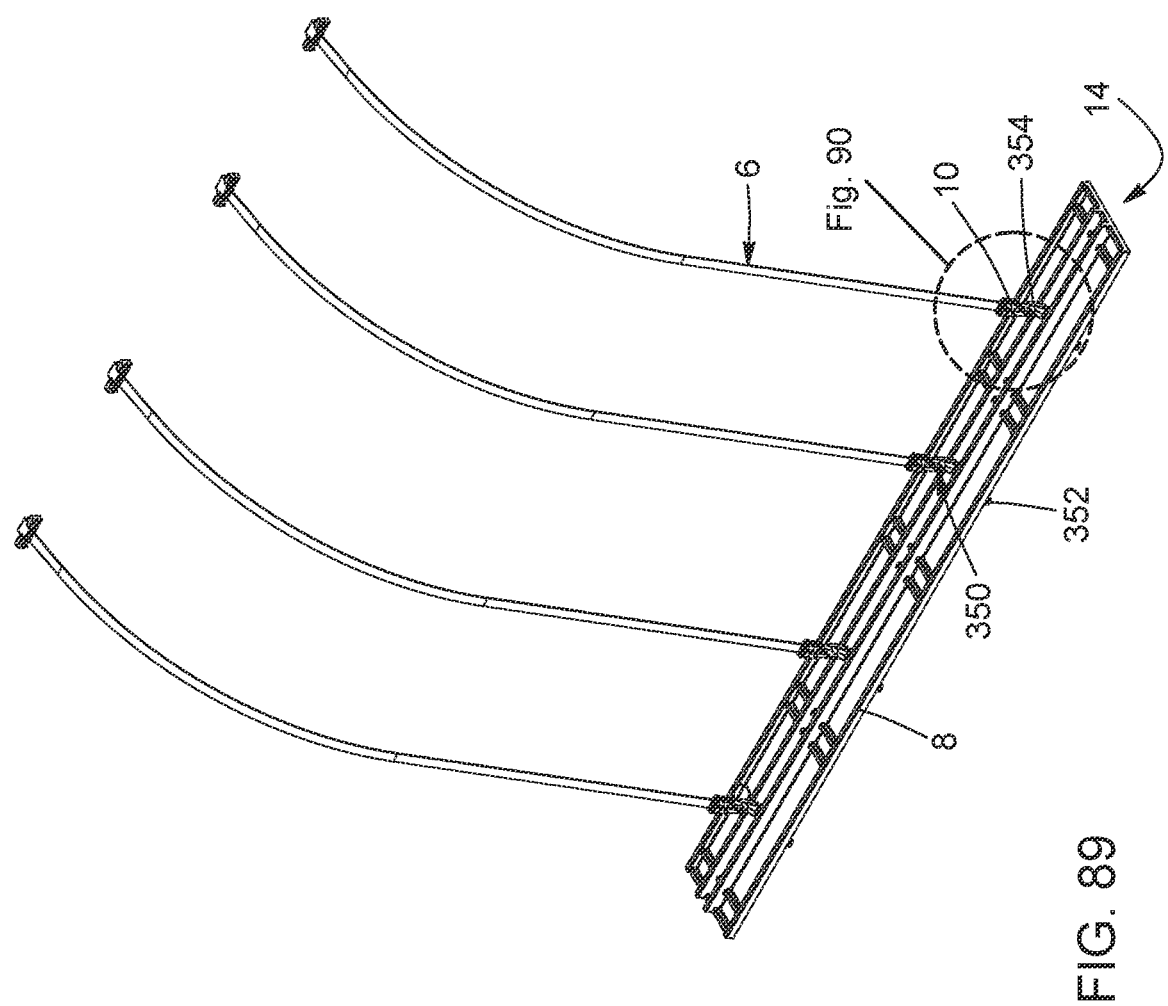
FIG. 89 is a top perspective view of another implementation of an anchor assembly.
Figure 90:
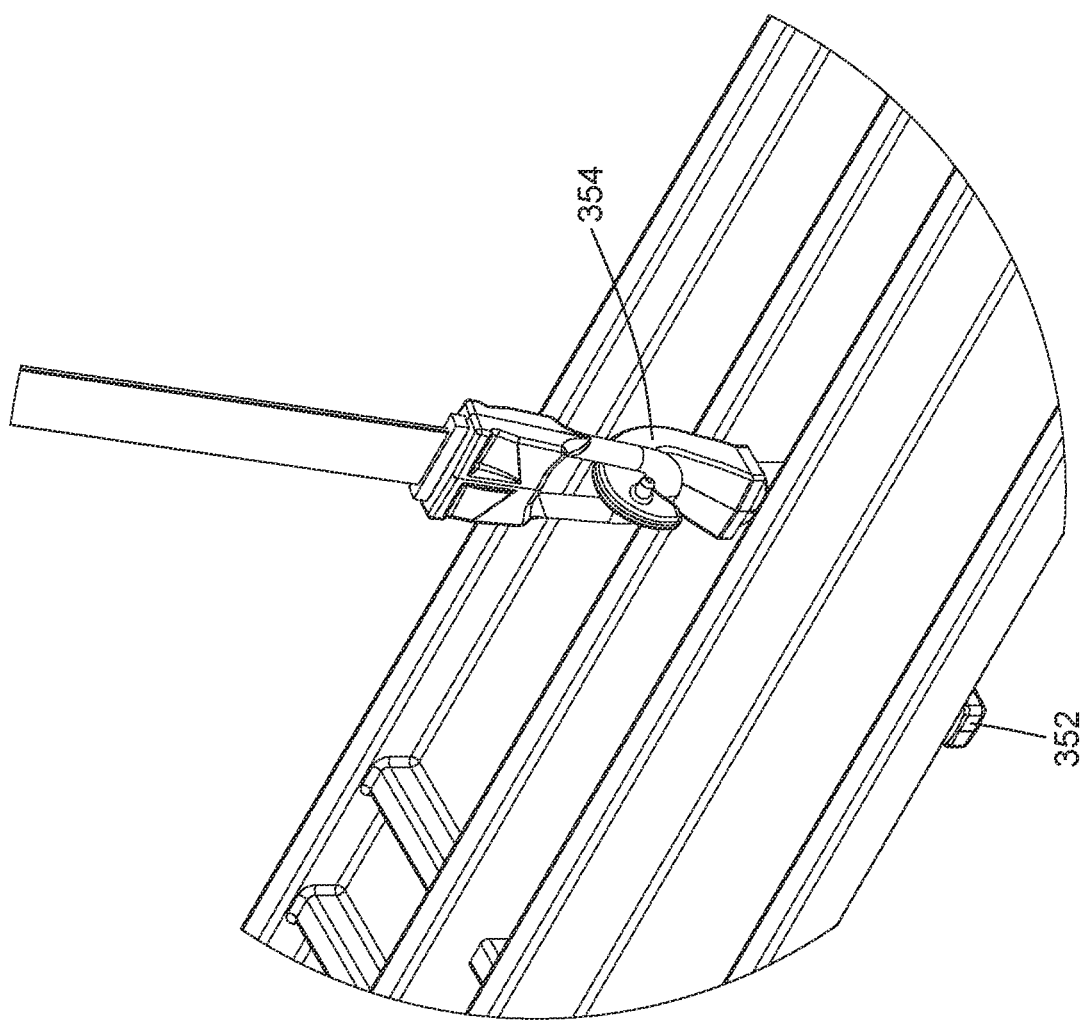
FIG. 90 is a zoomed view of portion A of FIG. 89.

In yet another implementation, as illustrated in FIGS. 87 and 88, the locking component can simply be a bolt 62 and nut 63 fastener. Referring to FIGS. 85 and 86, the slot 348 of the slotted pin 346 can define a channel including recesses (349 in FIG. 86) which are complementary to the bolt and nut fastener shape. As better seen in FIG. 88, the bolt 62 is inserted in channel 38 of the rod portion 25 of the pin hook 10 so as to sandwich the nut 63 and slotted pin 346 in between.

In the implementation illustrated in FIG. 49, the locking element of the retention mechanism can be a pair of abutment rods 44 which extend outwardly from a side of the transverse component (grooved pin) 340. Particularly, the abutment rods 44 can extend from each side of the narrowing portion 344. The abutment rods 44 can prevent the D-shaped hooking portion 26 of the connection component 10 to slide away from the groove of the narrowing portion 344 and prevent further movement of the grooved pin 340.

Figure 99:
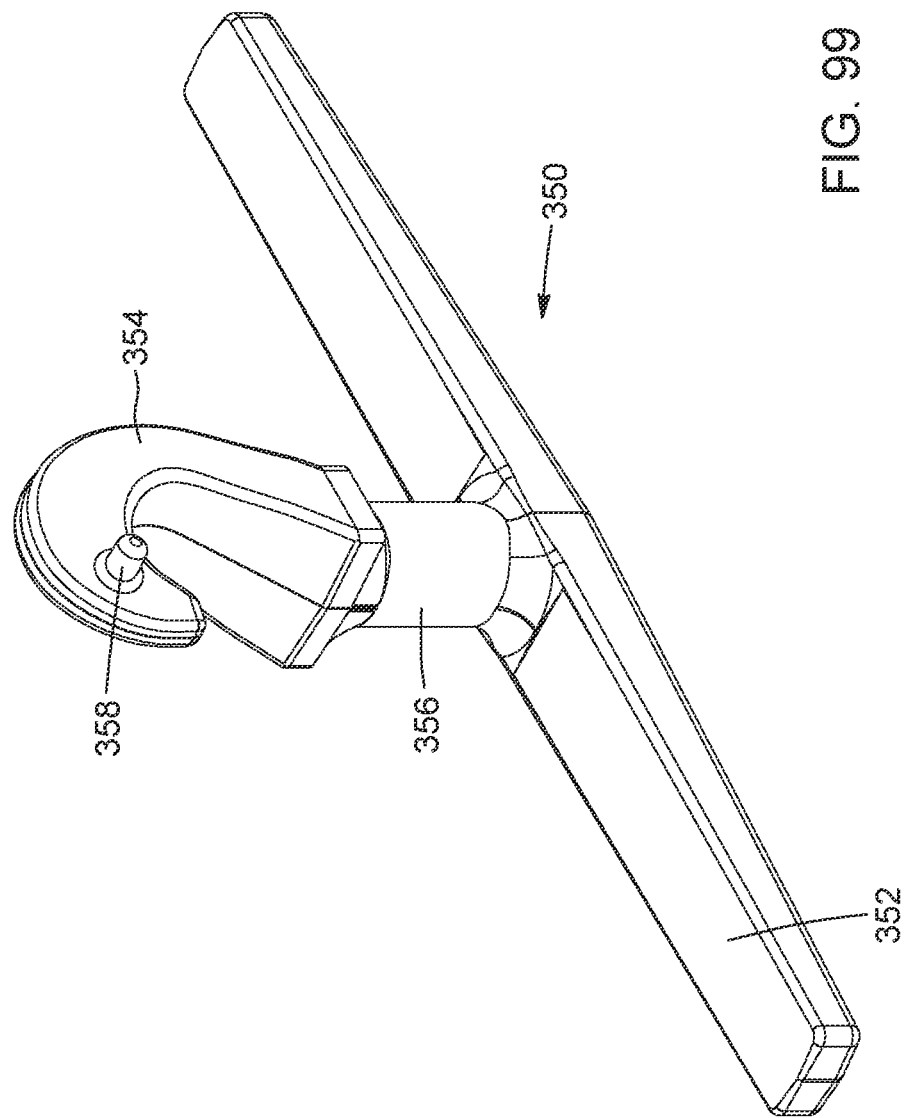
FIG. 99 is a top perspective view of another implementation of a transverse C-hook component.

In yet another implementation, the retention mechanism can include a ring defining a channel serving as eyelet to attach the proximal connection component to the transverse component via a fastener securable through the ring. Referring to FIG. 99, the retention mechanism 350 can include the ring 360 protruding from an edge of the C-hook portion 354. The ring 360 can receive a fastener, such as a tie wrap, to secure the proximal connection component onto the C-hook portion of the retention mechanism. As mentioned, providing additional options for securing the proximal connection component to the retention mechanism can be very useful, especially during steps of installation or maintenance.

Figure 9:
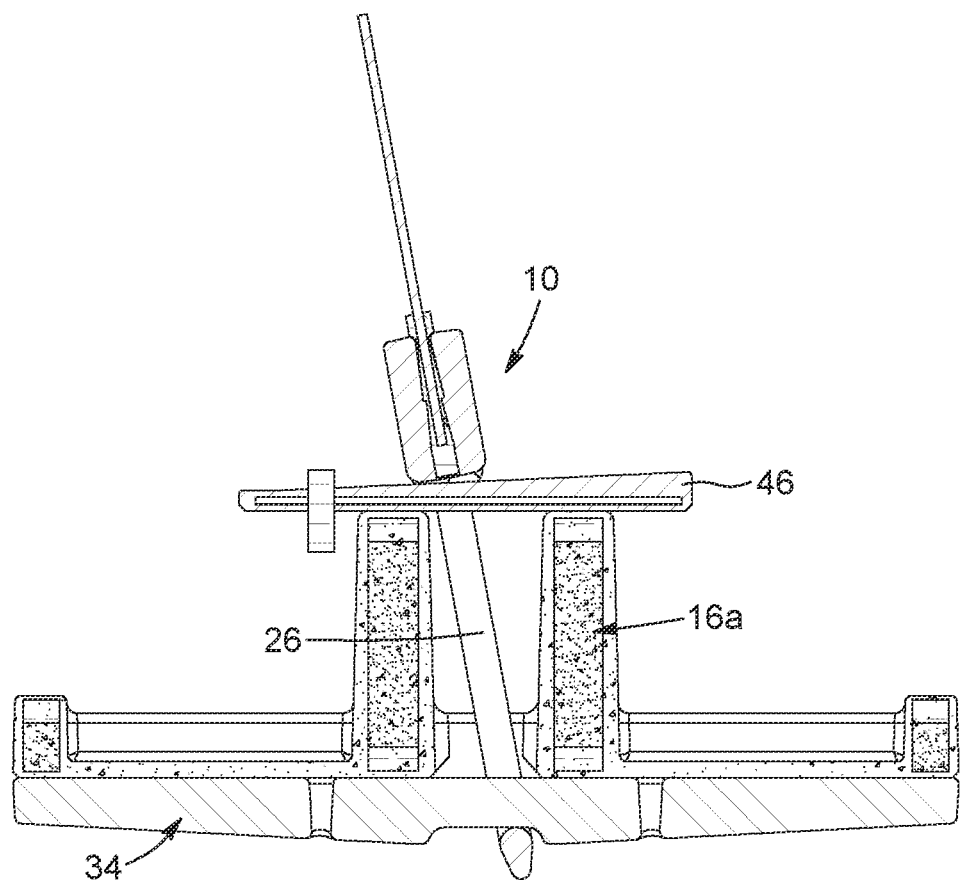
FIG. 9 is a cross-sectional view of the anchor assembly of FIG. 7 along the dotted line.

In some implementations, the retention mechanism can include a secondary locking component that prevent, at least temporarily, the proximal connection component from moving along the slot of the anchor base. Referring to FIGS. 2 and 9, the secondary locking component can be an additional and upper transverse component 46 abutting a top surface of the central reinforced longitudinal walls 16a and positioned in a transverse direction of the anchor base 8. For example, the upper transverse component 46 is inserted in the loop defined by the hooking portion 26 of the proximal connection component 10 and further secured to the top surface of each opposed central reinforced longitudinal walls 16a.

It is noted that the retention mechanism can include a combination of one or more of the locking components and secondary locking component that are described above. For example, the transverse component could include locking protrusions and tie wraps could additionally be secured around the connection component when engaged with the transverse component.

Additional Implementations of the Anchor Assembly

The anchor assembly can include at least one spacing bar that can be required to maintain a distance between two anchor assemblies provided at each side of the tank. The spacing bars can be connected to each anchor base of the two anchor assemblies. The spacing bars are advantageously used when the system including at least one strap assembly and the two opposed anchor assembly are installed over the tank outside of the excavation pit, for example on the transport truck. By using the spacing bars that maintain a given distance between the anchor assemblies, the whole system can be lifted and then lowered into the excavation pit below ground level while remaining over the tank in a single operation. For example, the spacing bars avoid the anchor bases to slide below the tank when the tank is being lowered into the pit.

Figure 3:
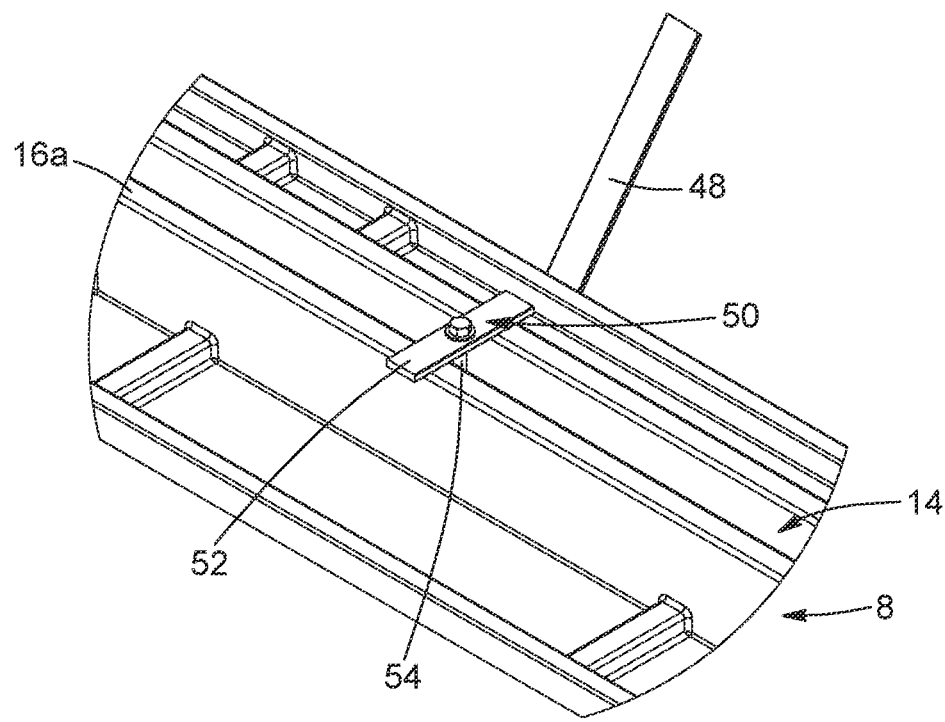
FIG. 3 is a top perspective view of a zoomed portion J of FIG. 1.
Figure 16:
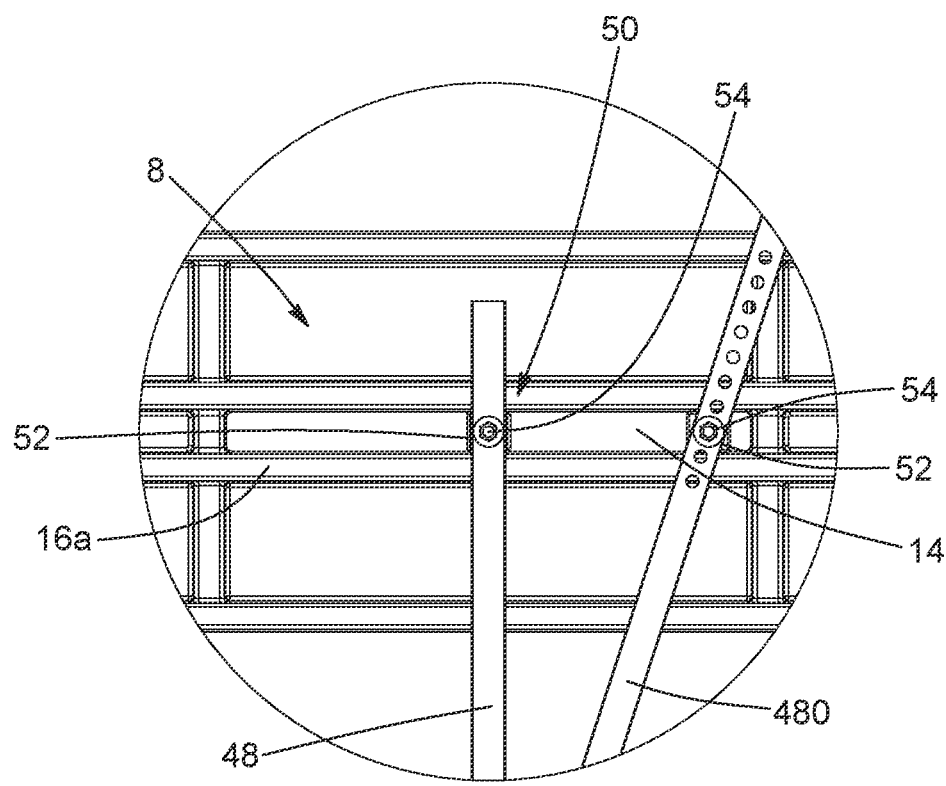
FIG. 16 is a zoomed view of portion F of FIG. 15.
Figure 17:
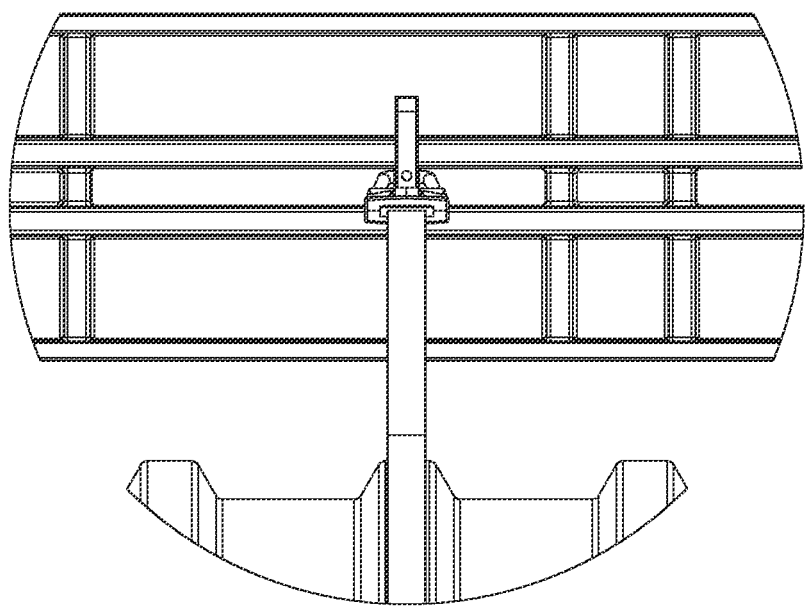
FIG. 17 is a zoomed view of portion E of FIG. 15.
Figure 18:
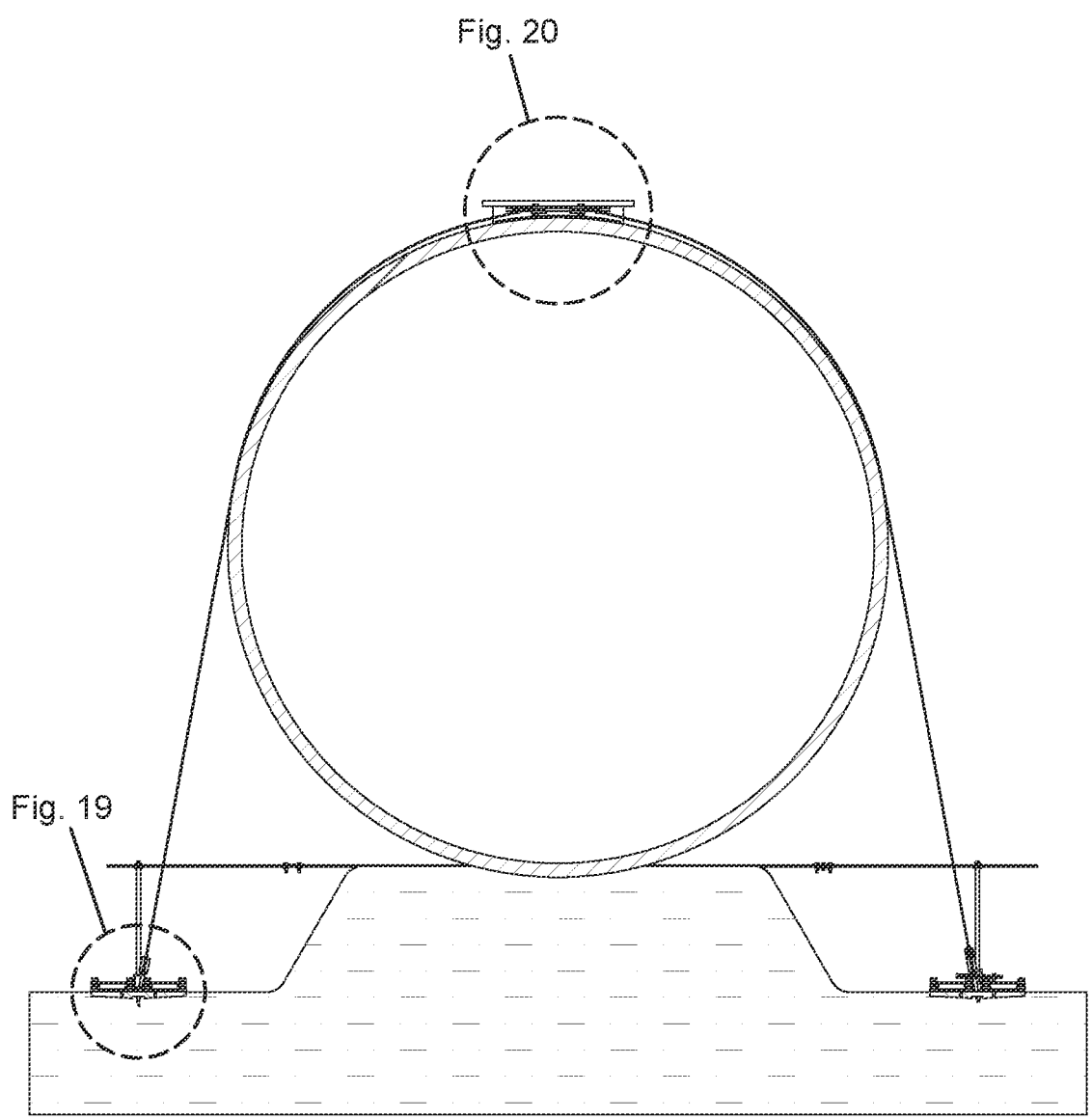
FIG. 18 is a cross-sectional view of the anchor assemblies and UST of FIG. 15 along the dotted line.
Figure 19:
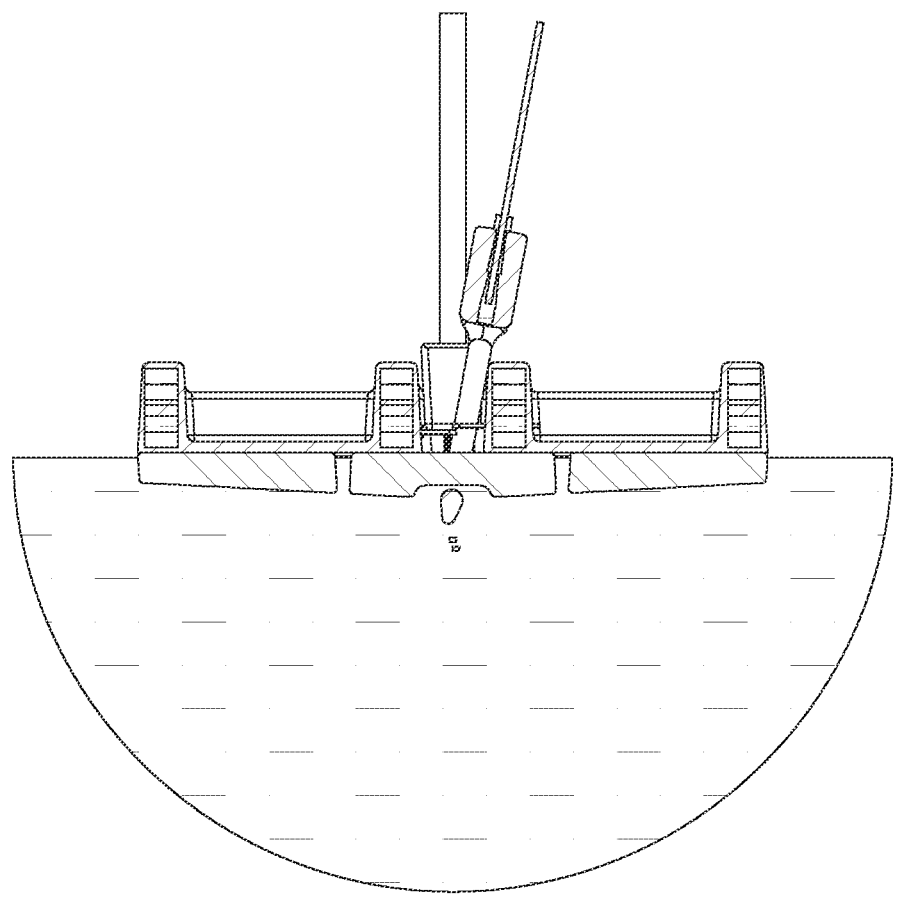
FIG. 19 is a zoomed view of portion Q of FIG. 18.

FIGS. 1 and 3 show spacing bars 48 that are connectable to the anchor base 8 via a fastening mechanism 50 when the tank is held at the same level than the anchor base 8. FIGS. 14 to 18 show an implementation where spacing bars are used to maintain the system during operation when the tank is held above the anchor base. Referring to FIGS. 3 and 16, the fastening mechanism 50 includes a transverse component 52 that can abut a surface of the anchor base 8 in the transverse direction and a fastener 54 that can fasten each spacing bar 48 to one transverse component 52. The configuration of the fastening mechanism can be adapted to level of the tank with respect to the anchor base. For example, as seen in FIG. 3 corresponding to a configuration where the tank is at the same level as the anchor base, each spacing bar 48 is positioned below the anchor base 8 and the transverse component 52 abuts a top surface of the central reinforced longitudinal walls 16a above the slot 14. The fastener 54 can include an elongated threaded bolt that is inserted into a hole of the spacing bar 48 through the slot 14 and towards the transverse component 52. The fastener 54 further includes a nut to secure the elongated threaded bolt into a corresponding hole of the transverse component 52. In another example, as seen in FIG. 16 corresponding to a configuration where the tank is supported below ground level and above the anchor base, each spacing bar 48 is positioned above the anchor base 8 and the transverse component 52 abuts a lower surface of the anchor base 8. Secondary branch bars 480 can stem from the main spacing bars 48 to offer multiple anchorage locations to the anchor base 8. In that configuration, as seen on FIG. 14, the elongated bolt of the fastener 54 can extend from the transverse component (not shown and below the anchor base 8) to the spacing bar 48/branch bar 480 via the slot 14 with adequate nut(s) securing each spacing bar 48/branch bar 480 to one transverse component 52.

The invention claimed is:

1. An anchor assembly for anchoring an underground tank below a ground in cooperation with a strap assembly including an elongated strap member and a proximal connection component provided at one end of the elongated strap member, the anchor assembly comprising:
   an anchor base comprising a main body defining a slot that is oriented in a longitudinal direction of the anchor base, and that is accessible to the proximal connection component of the strap assembly;
   a retention mechanism movable with respect to the anchor base along the slot for securing the strap to the anchor base via the proximal connection component, the retention mechanism comprising a transverse component that is positionable in a transverse direction of the anchor base in abutment with a surface of the anchor base and generally across the slot.

2. The anchor assembly of claim 1, wherein the transverse component is slidable along a lower surface of the anchor base to guide the proximal connection component of the strap assembly along and within the slot.

3. The anchor assembly of claim 2, wherein the transverse component is a transverse pin.

4. The anchor assembly of claim 1, wherein the transverse component has a narrowing central portion defining a groove that is adapted to retain the proximal connection component.

5. The anchor assembly of claim 4, wherein the groove is sized and shaped to maintain the proximal connection component snug within the groove defined by the narrowing portion.

6. The anchor assembly of claim 1, wherein the transverse component comprises a secondary slot being designed to cooperate with a pin-type hook portion of the proximal connection component.

7. The anchor assembly of claim 6, wherein the secondary slot is defined in a central portion of the transverse component.

8. The anchor assembly of claim 1, wherein the retention mechanism comprises a C-hook portion extending upwardly from the transverse component and through the slot to engage the proximal connection component of the strap assembly.

9. The anchor assembly of claim 8, wherein the C-hook portion has an elongated neck that is sized according to a height of the anchor base to put a C-hook region thereof generally above the slot of the anchor base.

10. The anchor assembly of claim 1, wherein the retention mechanism further comprises a locking component to prevent the proximal connection component from being released from the retention mechanism once attached thereto.

11. The anchor assembly of claim 10, wherein the locking component comprises an elongated fastener insertable in a channel of the proximal connection component and surrounding the transverse component.

12. The anchor assembly of claim 10 or 11, wherein the locking component comprises a pair of locking protrusions extending downwardly from a lower surface of the transverse component thereby defining a recess that maintains the proximal connection component engaged to the transverse component.

13. The anchor assembly of claim 10, wherein the locking component comprises a locking bracket being complementary shaped to at least a portion of the distal end of the proximal connection component and the transverse component to maintain the proximal connection component and the transverse component together.

14. The anchor assembly of claim 10, wherein the locking component comprises a fastener that is insertable in a channel defined in the distal end of the proximal connection component.

15. The anchor assembly of claim 10, wherein the locking component comprises an abutment rod extending outwardly from a side of the transverse component.

16. The anchor assembly of claim 10, wherein the anchor base further comprises at least one reinforcing component embedded in the anchor base.

17. The anchor assembly of claim 16, wherein the at least one reinforcing component is a reinforcing rebar that is oriented in the longitudinal direction or the transverse direction of the anchor base.

18. The anchor assembly of claim 17, wherein the at least one reinforcing component comprises a plurality of reinforcing rebars that are embedded in the anchor base to define a pair of central reinforced longitudinal walls and a plurality of reinforced transverse walls extending upwardly from a main upper surface of the anchor base.

19. The anchor assembly of claim 18, wherein the slot of the anchor base is surrounded by two opposed reinforced longitudinal walls and two opposed reinforced transverse walls.

20. The anchor assembly of claim 1, wherein the anchor base comprises a plurality of slots provided along a longitudinal direction of the anchor base to offer multiple available locations for inserting the proximal connection component of multiple strap assemblies.

* * * * *